United States Patent
Takata

(10) Patent No.: US 10,358,602 B2
(45) Date of Patent: Jul. 23, 2019

(54) LIQUID CRYSTAL COMPOUND HAVING POLYFLUORO-2-BUTENOXY GROUP, LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventor: Akihiro Takata, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 62 days.

(21) Appl. No.: 15/649,803

(22) Filed: Jul. 14, 2017

(65) Prior Publication Data

US 2018/0030351 A1   Feb. 1, 2018

(30) Foreign Application Priority Data

Jul. 28, 2016   (JP) ................. 2016-148920

(51) Int. Cl.
| | |
|---|---|
| G02F 1/1333 | (2006.01) |
| C09K 19/44 | (2006.01) |
| C09K 19/04 | (2006.01) |
| C09K 19/06 | (2006.01) |
| C09K 19/12 | (2006.01) |
| C09K 19/32 | (2006.01) |
| C09K 19/18 | (2006.01) |
| C09K 19/30 | (2006.01) |
| C09K 19/34 | (2006.01) |

(52) U.S. Cl.
CPC .............. *C09K 19/44* (2013.01); *C09K 19/04* (2013.01); *C09K 19/066* (2013.01); *C09K 19/12* (2013.01); *C09K 19/322* (2013.01); *C09K 2019/0444* (2013.01); *C09K 2019/0466* (2013.01); *C09K 2019/181* (2013.01); *C09K 2019/301* (2013.01); *C09K 2019/304* (2013.01); *C09K 2019/308* (2013.01); *C09K 2019/3009* (2013.01); *C09K 2019/3016* (2013.01); *C09K 2019/3019* (2013.01); *C09K 2019/3021* (2013.01); *C09K 2019/3042* (2013.01); *C09K 2019/3077* (2013.01); *C09K 2019/3422* (2013.01); *C09K 2019/3425* (2013.01)

(58) Field of Classification Search
CPC ...... C09K 19/04; C09K 19/44; C09K 19/066; C09K 19/12; C09K 19/322; C09K 2019/0444; C09K 2019/0466; C09K 2019/181; C09K 2019/301; C09K 2019/3009; C09K 2019/3016; C09K 2019/3019; C09K 2019/3021; C09K 2019/304; C09K 2019/3042; C09K 2019/3077; C09K 2019/308; C09K 2019/3422; C09K 2019/3425; G02F 1/1333
USPC .................................................... 252/299.61
See application file for complete search history.

(56) References Cited

U.S. PATENT DOCUMENTS 9,951,277 B2 * 4/2018 Takata ................. C09K 19/20
2016/0362605 A1   12/2016 Takata et al.

FOREIGN PATENT DOCUMENTS

| JP | 2007-277127 | 10/2007 |
| WO | 2015/129540 | 9/2015 |

* cited by examiner

*Primary Examiner* — Geraldina Visconti
(74) *Attorney, Agent, or Firm* — Wenderoth, Lind & Ponack, L.L.P.

(57) ABSTRACT

Provided are a liquid crystal compound having larger dielectric anisotropy and superb heating reliability in comparison with a similar compound, a liquid crystal composition containing the compound and a liquid crystal display device including the composition. A compound is represented by formula (1).

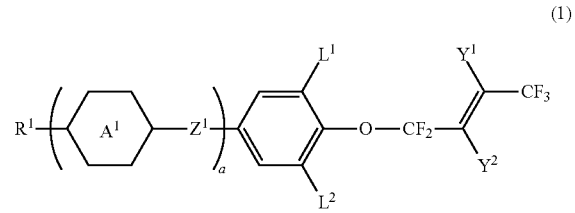

(1)

In formula (1), for example, $R^1$ is alkyl having 1 to 15 carbons, ring $A^1$ is 1,4-cyclohexylene, 1,4-cyclohexenylene, 1,4-phenylene, 1,4-phenylene in which at least one hydrogen is replaced by halogen or tetrahydropyran-2,5-diyl; $Z^1$ is a single bond or $-CF_2O-$; $L^1$ and $L^2$ are hydrogen or halogen; $Y^1$ and $Y^2$ are hydrogen or halogen; and a is an integer from 1 to 4.

14 Claims, No Drawings

LIQUID CRYSTAL COMPOUND HAVING POLYFLUORO-2-BUTENOXY GROUP, LIQUID CRYSTAL COMPOSITION AND LIQUID CRYSTAL DISPLAY DEVICE

TECHNICAL FIELD

The invention relates to a liquid crystal compound, a liquid crystal composition and a liquid crystal display device. More specifically, the invention relates to a liquid crystal compound having a polyfluoro-2-butenoxy group, a liquid crystal composition containing the compound and having a nematic phase, and a liquid crystal display device including the composition.

BACKGROUND ART

A liquid crystal display device has been widely utilized in a display of a personal computer, a television or the like. The device utilizes physical properties such as optical anisotropy and dielectric anisotropy of a liquid crystal compound. An operating mode of the liquid crystal display device includes such a mode as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode, a fringe field switching (FFS) mode and a polymer sustained alignment (PSA) mode. In the device having the PSA mode, a liquid crystal composition containing a polymer is used. In the composition, alignment of liquid crystal molecules can be controlled by the polymer.

In such a liquid crystal display device, a liquid crystal composition having suitable physical properties is used. In order to further improve characteristics of the device, the liquid crystal compound contained in the composition preferably has physical properties described in (1) to (8) below. (1) High stability to heat and light, (2) a high clearing point, (3) low minimum temperature of a liquid crystal phase, (4) small viscosity (η), (5) suitable optical anisotropy (Δn), (6) large dielectric anisotropy (Δε), (7) a suitable elastic constant (K), and (8) excellent compatibility with other liquid crystal compounds.

An effect of the physical properties of the liquid crystal compound on the characteristics of the device is as described below. A compound having the high stability to heat and light as described in (1) increases a voltage holding ratio of the device. Therefore, a service life of the device becomes long. A compound having the high clearing point as described in (2) extends a temperature range in which the device can be used. A compound having the low minimum temperature of the liquid crystal phase such as the nematic phase and a smectic phase as described in (3), in particular, a compound having the low minimum temperature of the nematic phase also extends the temperature range in which the device can be used. A compound having the small viscosity as described in (4) shortens a response time of the device.

A compound having the suitable optical anisotropy, namely the compound having large optical anisotropy or small optical anisotropy is required according to design of the device. When the response time is shortened by decreasing a cell gap of the device, a compound having the large optical anisotropy is suitable. A compound having the large dielectric anisotropy as described in (6) decreases a threshold voltage of the device. Thus, an electric power consumption of the device is decreased. On the other hand, a compound having the small dielectric anisotropy shortens the response time of the device by decreasing the viscosity of the composition. The compound extends the temperature range in which the device can be used by increasing the maximum temperature of the nematic phase.

With regard to (7), a compound having a large elastic constant decreases the response time of the device. A compound having a small elastic constant decreases the threshold voltage of the device. Therefore, the suitable elastic constant is required according to characteristics to be desirably improved. A compound having the excellent compatibility with other liquid crystal compounds as described in (8) is preferred. The reason is that the physical properties of the composition are adjusted by mixing liquid crystal compounds having different physical properties.

A variety of liquid crystal compounds each having the large dielectric anisotropy have so far been synthesized. A variety of liquid crystal compounds having the large optical anisotropy have also so far been synthesized because good physical properties that are not found in the conventional compounds are expected for a new compound, or because the new product provides at least two physical properties with a suitable balance in the composition in several cases. Under such circumstances, desire has been expressed for a compound having excellent physical properties and the suitable balance regarding the physical properties (1) to (8) described above.

In order to prepare a liquid crystal compound having an excellent characteristic balance, an attempt has been so far made on forming a molecular terminal into a special structure, and Patent literature No. 1 describes compound (S-1) having a perfluoroallyloxy group. Moreover, Patent literature No. 2 describes compound (S-2) having a 1,1,3,3-tetrafluoroallyloxy group in a similar structure.

Formula 1

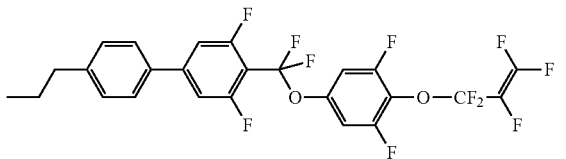
(S-1)

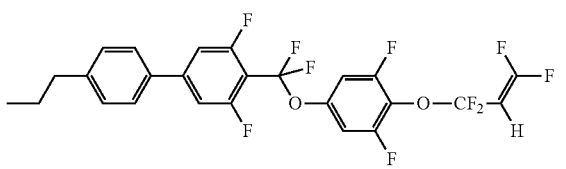
(S-2)

CITATION LIST

Patent Literature

Patent literature No. 1: JP 2007-277127 A.
Patent literature No. 2: WO 2015/129540 A.

SUMMARY OF INVENTION

Technical Problem

A first object of the invention is to provide a compound having larger dielectric anisotropy and superb heating reliability in comparison with a similar compound. A second object of the invention is to provide a liquid crystal composition containing the compound, and satisfying at least one of physical properties such as high stability to heat and light, a high maximum temperature of a nematic phase, a low minimum temperature of the nematic phase, small viscosity, suitable optical anisotropy, large dielectric anisotropy, large specific resistance and a suitable elastic constant. The objective is to provide a liquid crystal composition having a suitable balance regarding at least two of the physical properties.

Solution to Problem

The invention concerns a liquid crystal compound represented by formula (1), a liquid crystal composition containing the compound and a liquid crystal display device including the composition:

Formula 2

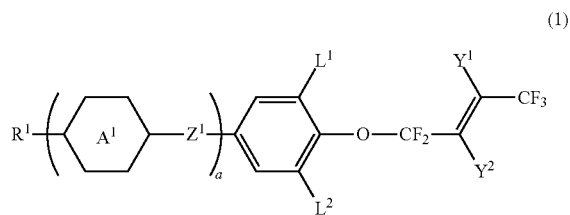

(1)

wherein, in formula (1), $R^1$ is alkyl having 1 to 15 carbons, and in the $R^1$, at least one piece of —$CH_2$— may be replaced by —O— or —S—, at least one piece of —$CH_2CH_2$— may be replaced by —CH=CH— or —C≡C—, and at least one hydrogen may be replaced by halogen;

ring $A^1$ is 1,4-cyclohexylene, 1,4-cyclohexenylene, 1,4-phenylene, 1,4-phenylene in which at least one hydrogen is replaced by halogen, tetrahydropyran-2,5-diyl, 1,3-dioxane-2,5-diyl, 2,6,7-trioxabicyclo[2.2.2]octane-1,4-diyl, pyrimidine-2,5-diyl or pyridine-2,5-diyl, and at least one hydrogen directly bonded to the rings may be replaced by halogen;

$Z^1$ is a single bond, —$CH_2CH_2$—, —C≡C—, —CH=CH—, —CF=CF—, —$CF_2O$—, —$OCF_2$—, —$CH_2O$—, —$OCH_2$—, —COO— or —OCO—;

$L^1$ and $L^2$ are independently hydrogen or halogen;

$Y^1$ and $Y^2$ are independently hydrogen or halogen; and a is 1, 2, 3 or 4.

Advantageous Effects of Invention

A first advantage of the invention is to provide a compound having larger dielectric anisotropy and superb heating reliability in comparison with a similar compound (see Comparative Example 1). A second advantage of the invention is to provide a liquid crystal composition containing the compound, and satisfying at least one of physical properties such as high stability to heat and light, a high maximum temperature of a nematic phase, a low minimum temperature of the nematic phase, small viscosity, suitable optical anisotropy, large dielectric anisotropy, large specific resistance and a suitable elastic constant. The advantage is to provide a liquid crystal composition having a suitable balance regarding at least two of the physical properties.

DESCRIPTION OF EMBODIMENTS

Usage of terms herein is as described below. Terms "liquid crystal compound," "liquid crystal composition" and "liquid crystal display device" may be occasionally abbreviated as "compound," "composition" and "device," respectively. "Liquid crystal compound" is a generic term for a compound having a liquid crystal phase such as a nematic phase and a smectic phase, and a compound having no liquid crystal phase but to be added for the purpose of adjusting physical properties of a composition, such as a maximum temperature, a minimum temperature, viscosity and dielectric anisotropy. The compound has a six-membered ring such as 1,4-cyclohexylene and 1,4-phenylene, and has rod-like molecular structure. "Liquid crystal display device" is a generic term for a liquid crystal display panel and a liquid crystal display module. "Polymerizable compound" includes a compound to be added to the composition for the purpose of forming a polymer in the composition.

The liquid crystal composition is prepared by mixing a plurality of liquid crystal compounds. An additive is added to the composition for the purpose of further adjusting the physical properties. The additive such as the polymerizable compound, a polymerization initiator, a polymerization inhibitor, an optically active compound, an antioxidant, an ultraviolet light absorber, a light stabilizer, a heat stabilizer, a dye and an antifoaming agent is added when necessary. The liquid crystal compound and the additive are mixed according to such a procedure. A proportion (content) of the liquid crystal compounds is expressed in terms of weight percent (% by weight) based on the weight of the liquid crystal composition containing no additive, even after the additive has been added. A proportion (amount of addition) of the additive is expressed in terms of weight percent (% by weight) based on the weight of the liquid crystal composition containing no additive. Weight parts per million (ppm) may be occasionally used. A proportion of the polymerization initiator and the polymerization inhibitor is exceptionally expressed based on the weight of the polymerizable compound.

"Clearing point" is a transition temperature between a liquid crystal phase and an isotropic phase in the liquid crystal compound. "Minimum temperature of the liquid crystal phase" is a transition temperature between a solid and the liquid crystal phase (the smectic phase, the nematic phase or the like) in the liquid crystal compound. "Maximum temperature of the nematic phase" is a transition temperature between the nematic phase and the isotropic phase in a mixture of the liquid crystal compound and a base liquid crystal or in the liquid crystal composition, and may be occasionally abbreviated as "maximum temperature." "Minimum temperature of the nematic phase" may be occasionally abbreviated as "minimum temperature." An expression "increase the dielectric anisotropy" means that a value of dielectric anisotropy positively increases in a liquid crystal composition having positive dielectric anisotropy, and the value of dielectric anisotropy negatively increases in a liquid crystal composition having negative dielectric anisotropy. An expression "having a large voltage holding ratio" means that the composition has a large voltage holding ratio at room temperature and also at a temperature close to the maximum temperature in an initial stage, and the composition has the large voltage holding ratio at room temperature and also at a temperature close to the maximum temperature even after the device has been used for along period of time. In the composition or the device, the characteristics may be occasionally examined before and after a temporal change test (including an accelerated deterioration test).

A compound represented by formula (1) may be occasionally abbreviated as compound (1). At least one compound selected from the group of compounds represented by formula (1) may be occasionally abbreviated as "compound (1)." "Compound (1)" means one compound, a mixture of two compounds or a mixture of three or more compounds represented by formula (1). A same rule applies also to any other compound represented by any other formula. In formulas (1) to (15), a symbol such as $A^1$, $B^1$ and $C^1$ surrounded by a hexagonal shape corresponds to a ring such as ring $A^1$, ring $B^1$ and ring $C^1$, respectively. The hexagonal shape represents a six-membered ring such as cyclohexane and benzene. The hexagonal shape may occasionally represents a fused ring such as naphthalene or a bridged ring such as adamantane.

In formulas of component compounds, a symbol of a terminal group $R^{11}$ is used in a plurality of compounds. In the compounds, two groups represented by two of arbitrary $R^{11}$ may be identical or different. For example, in one case, $R^{11}$ of compound (2) is ethyl and $R^{11}$ of compound (3) is ethyl. In another case, $R^{11}$ of compound (2) is ethyl and $R^{11}$ of compound (3) is propyl. A same rule applies also to symbols such as $R^{12}$, $R^{13}$ and $Z^{11}$. In compound (8), when i is 2, two of rings $D^1$ exist. In the compound, two groups represented by two of rings $D^1$ may be identical or different. A same rule applies also to two of arbitrary rings $D^1$ when i is larger than 2. A same rule applies also to other symbols.

An expression "at least one piece of 'A'" means that the number of 'A' is arbitrary. An expression "at least one piece of 'A' may be replaced by 'B'" means that, when the number of 'A' is 1, a position of 'A' is arbitrary, and also when the number of 'A' is 2 or more, positions thereof can be selected without limitation. A same rule applies also to an expression "at least one piece of 'A' is replaced by 'B'." An expression "at least one piece of 'A' may be replaced by 'B', 'C' or 'D'" includes a case where arbitrary 'A' is replaced by 'B', a case where arbitrary 'A' is replaced by 'C', and a case where arbitrary 'A' is replaced by 'D', and also a case where a plurality of pieces 'A' are replaced by at least two pieces of 'B', 'C' and/or 'D'. For example, "alkyl in which at least one piece of —$CH_2$— may be replaced by —O— or —CH=CH—" includes alkyl, alkoxy, alkoxyalkyl, alkenyl, alkoxyalkenyl and alkenyloxyalkyl. In addition, a case where replacement of two successive —$CH_2$— by —O— results in forming —O—O— is not preferred. In the alkyl or the like, a case where replacement of —$CH_2$— of a methyl part (—$CH_2$—H) by —O— results in forming —O—H is not preferred, either.

An expression "$R^{11}$ and $R^{12}$ are independently alkyl having 1 to 10 carbons or alkenyl having 2 to 10 carbons, and in the alkyl and the alkenyl, at least one piece of —$CH_2$— may be replaced by —O—, and in the groups, at least one hydrogen may be replaced by fluorine" may be occasionally used. In the expression, "in the groups" may be literally construed. In the expression, "the groups" means alkyl, alkenyl, alkoxy, alkenyloxy or the like. More specifically, "the groups" represents all of the groups described before the term "in the groups." The commonsense construe applies also to the term "in the monovalent group" or the term "in the divalent group." For example, "the monovalent group" represents all of the groups described before the term "in the monovalent group."

Halogen means fluorine, chlorine, bromine and iodine. Preferred halogen is fluorine or chlorine. Further preferred halogen is fluorine. Alkyl of the liquid crystal compound is straight-chain alkyl or branched-chain alkyl, but includes no cyclic alkyl. In general, straight-chain alkyl is preferred to branched-chain alkyl. A same rule applies also to a terminal group such as alkoxy and alkenyl. With regard to a configuration of 1,4-cyclohexylene, trans is preferred to cis for increasing the maximum temperature. Then, 2-fluoro-1,4-phenylene means two divalent groups described below. In a chemical formula, fluorine may be leftward (L) or rightward (R). A same rule also applies to an asymmetrical divalent group formed by removing two hydrogens from a ring, such as tetrahydropyran-2,5-diyl.

Formula 3

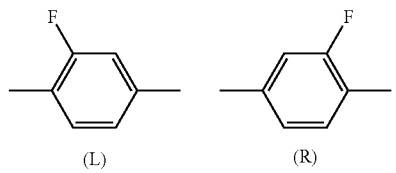

(L)    (R)

The invention includes items 1 to 14 described below.

Item 1. A liquid crystal compound, represented by formula (1):

Formula 4

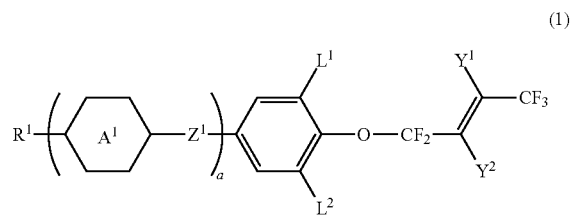

(1)

wherein, in formula (1), $R^1$ is alkyl having 1 to 15 carbons, and in the $R^1$, at least one piece of —$CH_2$— may be replaced by —O— or —S—, at least one piece of —$CH_2CH_2$— may be replaced by —CH=CH— or —C≡C—, and at least one hydrogen may be replaced by halogen;

ring $A^1$ is 1,4-cyclohexylene, 1,4-cyclohexenylene, 1,4-phenylene, 1,4-phenylene in which at least one hydrogen is replaced by halogen, tetrahydropyran-2,5-diyl, 1,3-dioxane-2,5-diyl, 2,6,7-trioxabicyclo[2.2.2]octane-1,4-diyl, pyrimidine-2,5-diyl or pyridine-2,5-diyl, and at least one hydrogen directly bonded to the rings may be replaced by halogen;

$Z^1$ is a single bond, —$CH_2CH_2$—, —C≡C—, —CH=CH—, —CF=CF—, —$CF_2O$—, —$OCF_2$—, —$CH_2O$—, —$OCH_2$—, —COO— or —OCO—;

$L^1$ and $L^2$ are independently hydrogen or halogen;

$Y^1$ and $Y^2$ are independently hydrogen or halogen; and a is 1, 2, 3 or 4.

Item 2. The compound according to item 1, wherein, in formula (1), $R^1$ is alkyl having 1 to 15 carbons, alkenyl having 2 to 15 carbons, alkoxy having 1 to 14 carbons or alkenyloxy having 2 to 14 carbons.

Item 3. The compound according to item 1 or 2, wherein, in formula (1), $Z^1$ is independently a single bond, —$CH_2CH_2$—, —C≡C—, —CH=CH—, —$CF_2O$— or —COO—.

Item 4. The compound according to any one of items 1 to 3, represented by any one of formulas (1-1) to (1-4):

Formula 5

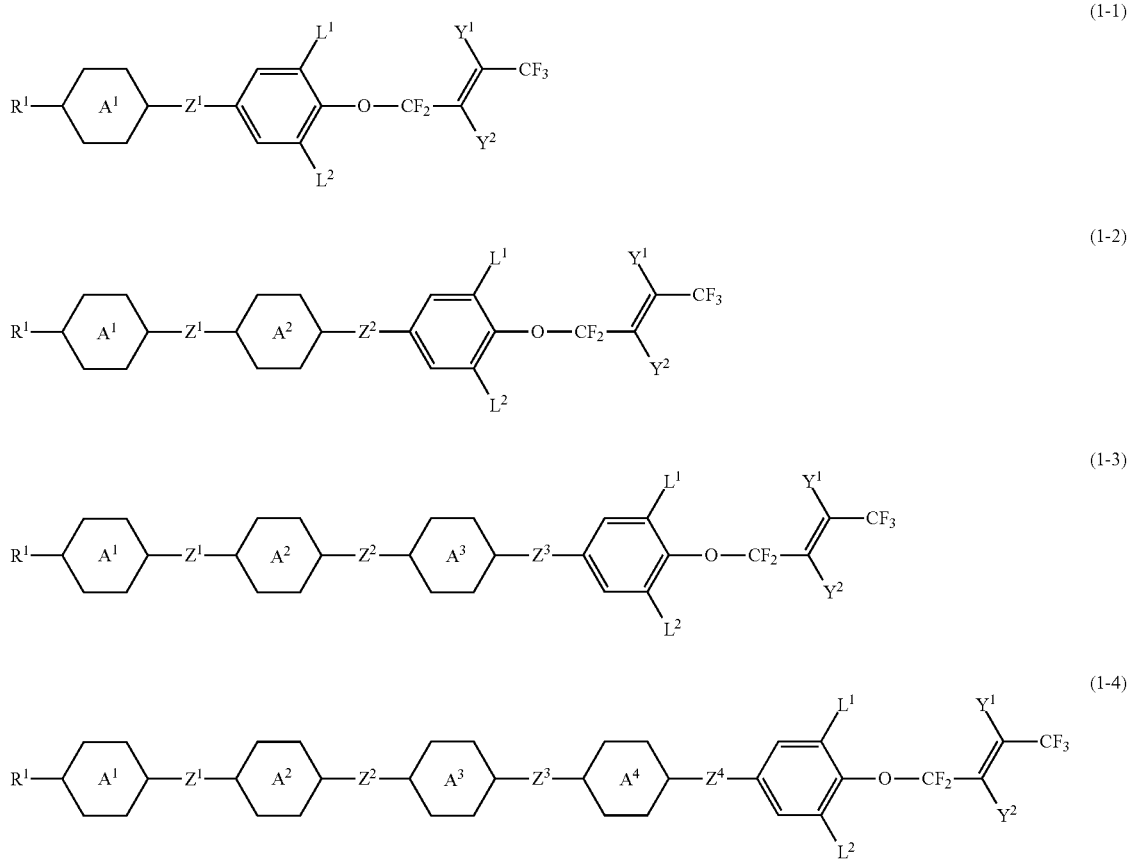

wherein, in formulas (1-1) to (1-4), ring $A^1$, ring $A^2$, ring $A^3$ and ring $A^4$ are independently 1,4-cyclohexylene, 1,4-phenylene, 1,4-phenylene in which at least one hydrogen is replaced by halogen, tetrahydropyran-2,5-diyl, 1,3-dioxane-2,5-diyl or 2,6,7-trioxabicyclo[2.2.2]octane-1,4-diyl;

$Z^1$, $Z^2$, $Z^3$ and $Z^4$ are independently a single bond, —CH$_2$CH$_2$—, —CH=CH—, —CF$_2$O— or —COO—;

$R^1$ is alkyl having 1 to 10 carbons or alkenyl having 2 to 10 carbons;

$L^1$ and $L^2$ are independently hydrogen, fluorine or chlorine; and $Y^1$ and $Y^2$ are independently hydrogen, fluorine or chlorine.

Item 5. The compound according to item 4, wherein, in formulas (1-1) to (1-4), ring $A^1$, ring $A^2$, ring $A^3$ and ring $A^4$ are independently 1,4-cyclohexylene, 1,4-phenylene, 1,4-phenylene in which at least one hydrogen is replaced by fluorine or chlorine, tetrahydropyran-2,5-diyl or 1,3-dioxane-2,5-diyl;

$Z^1$, $Z^2$, $Z^3$ and $Z^4$ are independently a single bond, —CH$_2$CH$_2$—, —CH=CH— or —CF$_2$O—;

$R^1$ is alkyl having 1 to 10 carbons or alkenyl having 2 to 10;

$L^1$ and $L^2$ are independently hydrogen or fluorine; and $Y^1$ and $Y^2$ are independently hydrogen or fluorine.

Item 6. The compound according to any one of items 1 to 5, represented by any one of formulas (1-5) to (1-12):

Formula 6

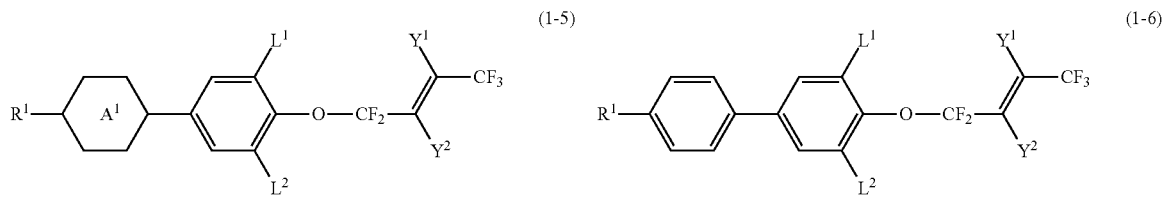

-continued (1-7)
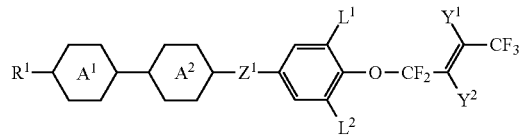

(1-8)
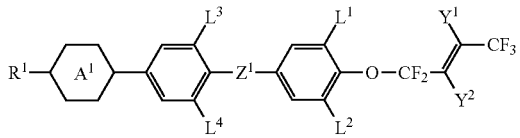

(1-9)
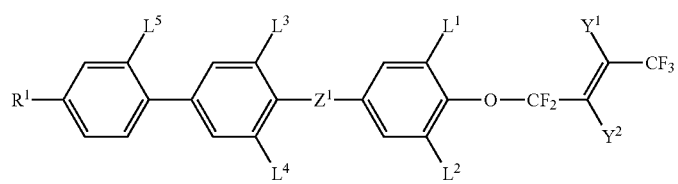

(1-10)
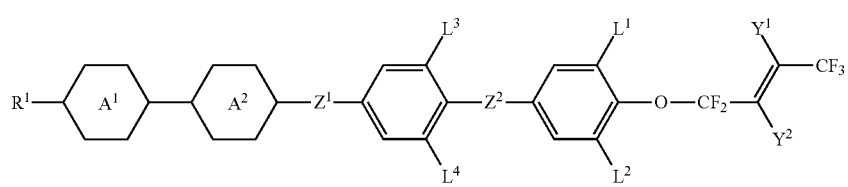

(1-11)
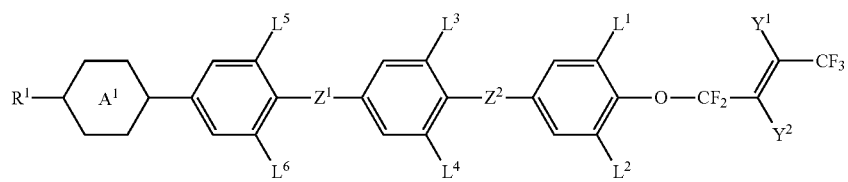

(1-12)
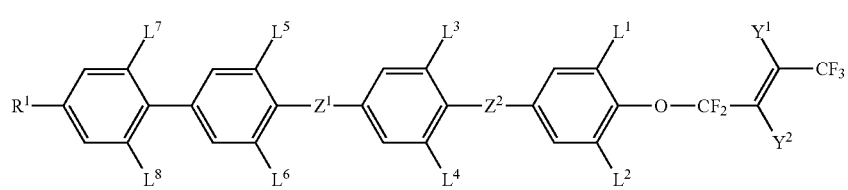

wherein, in formulas (1-5) to (1-12), ring $A^1$ and ring $A^2$ are independently 1,4-cyclohexylene, tetrahydropyran-2,5-diyl or 1,3-dioxane-2,5-diyl;

$Z^1$ and $Z^2$ are independently a single bond or —CF$_2$O—;

$R^1$ is alkyl having 1 to 10 carbons or alkenyl having 2 to 10 carbons;

$L^1$, $L^2$, $L^3$, $L^4$, $L^5$, $L^6$, $L^7$ and $L^8$ are independently hydrogen or fluorine; and $Y^1$ and $Y^2$ are independently hydrogen or fluorine.

Item 7. The compound according to any one of items 1 to 6, represented by any one of formulas (1-13) to (1-23):

Formula 7

(1-13)
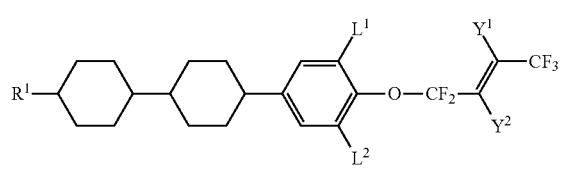

(1-14)
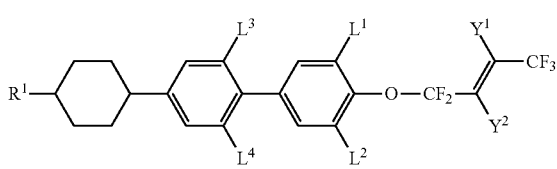

(1-15)
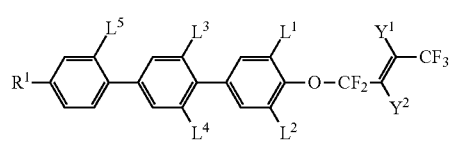

(1-16)
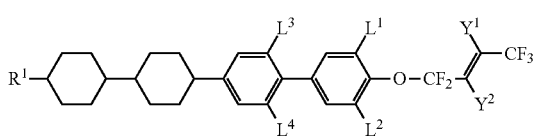

-continued (1-17)
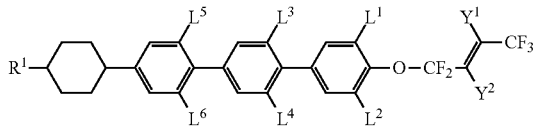

(1-18)
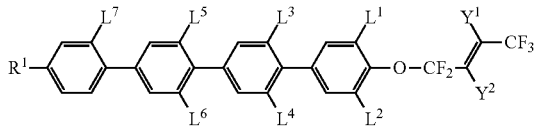

(1-19)
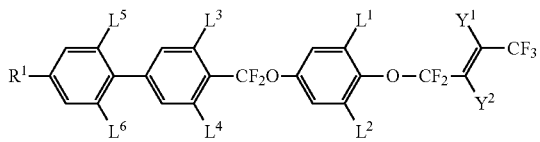

(1-20)
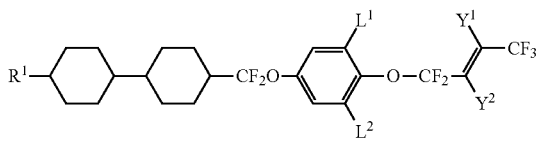

(1-21)
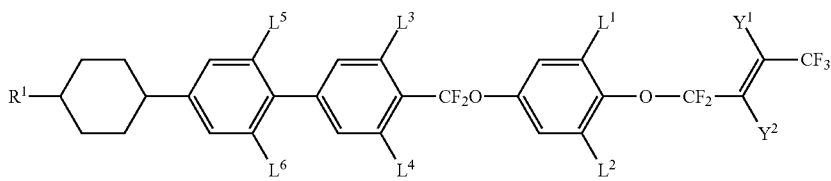

(1-22)
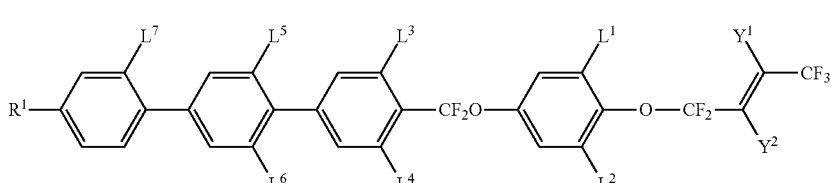

(1-23)
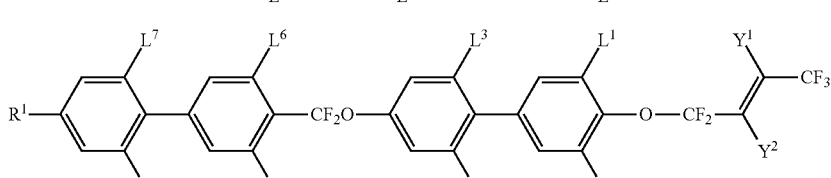

wherein, in formulas (1-13) to (1-23), $R^1$ is alkyl having 1 to 10 carbons or alkenyl having 2 to 10 carbons;

$L^1$, $L^2$, $L^3$, $L^4$, $L^5$, $L^6$, $L^7$ and $L^8$ are independently hydrogen or fluorine; and $Y^1$ and $Y^2$ are independently hydrogen or fluorine.

Item 8. A liquid crystal composition, containing at least one compound according to any one of items 1 to 7.

Item 9. The liquid crystal composition according to item 8, further containing at least one compound selected from the group of compounds represented by formulas (2) to (4):

Formula 8

(2)
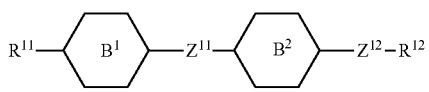

(3)
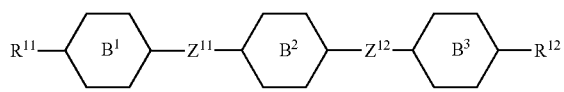

(4)
$$R^{11}-B^1-Z^{11}-B^2-Z^{12}-B^3-Z^{13}-B^4-R^{12}$$

wherein, in formulas (2) to (4), $R^{11}$ and $R^{12}$ are independently alkyl having 1 to 10 carbons or alkenyl having 2 to 10 carbons, and in the groups, at least one piece of —$CH_2$— may be replaced by —O—, and in the groups, at least one hydrogen may be replaced by fluorine;

ring $B^1$, ring $B^2$, ring $B^3$ and ring $B^4$ are independently 1,4-cyclohexylene, 1,4-phenylene, 2-fluoro-1,4-phenylene, 2,5-difluoro-1,4-phenylene or pyrimidine-2,5-diyl; and $Z^{11}$, $Z^{12}$ and $Z^{13}$ are independently a single bond, —COO—, —$CH_2CH_2$—, —CH=CH— or —C≡C—.

Item 10. The liquid crystal composition according to item 8 or 9, further containing at least one compound selected from the group of compounds represented by formulas (5) to (7):

Formula 9

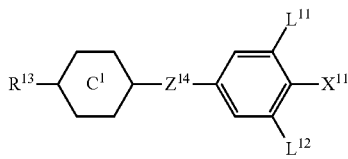
(5)

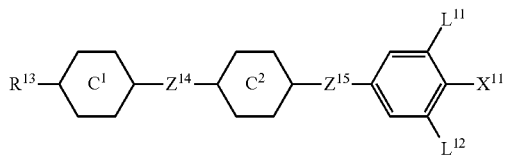
(6)

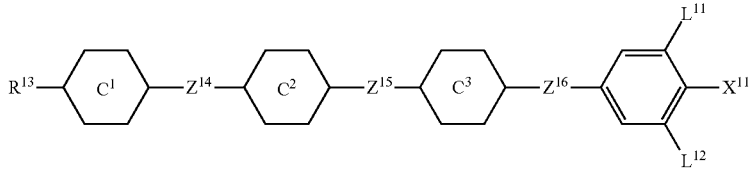
(7)

wherein, in formulas (5) to (7), $R^{13}$ is alkyl having 1 to 10 carbons or alkenyl having 2 to 10 carbons, and in the groups, at least one piece of —CH$_2$— may be replaced by —O—, and at least one hydrogen may be replaced by fluorine;

$X^{11}$ is fluorine, chlorine, —OCF$_3$, —OCHF$_2$, —CF$_3$, —CHF$_2$, —CH$_2$F, —OCF$_2$CHF$_2$ or —OCF$_2$CHFCF$_3$;

ring $C^1$, ring $C^2$ and ring $C^3$ are independently 1,4-cyclohexylene, 1,4-phenylene, 1,4-phenylene in which at least one hydrogen is replaced by fluorine, tetrahydropyran-2,5-diyl, 1,3-dioxane-2,5-diyl or pyrimidine-2,5-diyl;

$Z^{14}$, $Z^{15}$ and $Z^{16}$ are independently a single bond, —COO—, —OCO—, —CH$_2$O—, —OCH$_2$—, —CF$_2$O—, —OCF$_2$—, —CH$_2$CH$_2$—, —CH=CH—, —C≡C— or —(CH$_2$)$_4$—; and $L^{11}$ and $L^{12}$ are independently hydrogen or fluorine.

Item 11. The liquid crystal composition according to any one of items 8 to 10, further containing a compound represented by formulas (8):

Formula 10

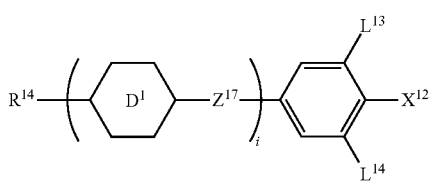
(8)

wherein, in formula (8), $R^{14}$ is alkyl having 1 to 10 carbons or alkenyl having 2 to 10 carbons, and in the groups, at least one piece of —CH$_2$— may be replaced by —O—, and at least one hydrogen may be replaced by fluorine;

$X^{12}$ is —C≡N or —C≡C—C≡N;

ring $D^1$ is 1,4-cyclohexylene, 1,4-phenylene, 1,4-phenylene in which at least one hydrogen is replaced by fluorine, tetrahydropyran-2,5-diyl, 1,3-dioxane-2,5-diyl or pyrimidine-2,5-diyl;

$Z^{17}$ is a single bond, —COO—, —OCO—, —CH$_2$O—, —OCH$_2$—, —CF$_2$O—, —OCF$_2$—, —CH$_2$CH$_2$— or —C≡C—;

$L^{13}$ and $L^{14}$ are independently hydrogen or fluorine; and i is 1, 2, 3 or 4.

Item 12. The liquid crystal composition according to anyone of items 8 to 11, further containing at least one compound selected from the group of compounds represented by formulas (9) to (15):

Formula 11

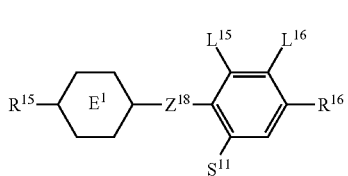
(9)

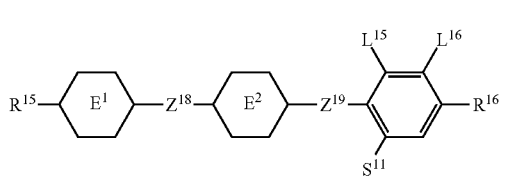
(10)

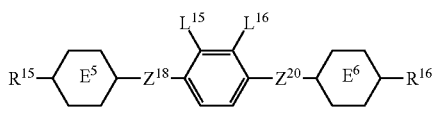
(11)

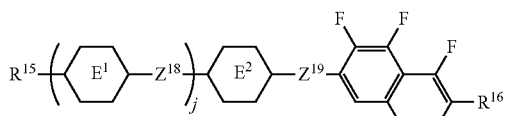
(12)

-continued

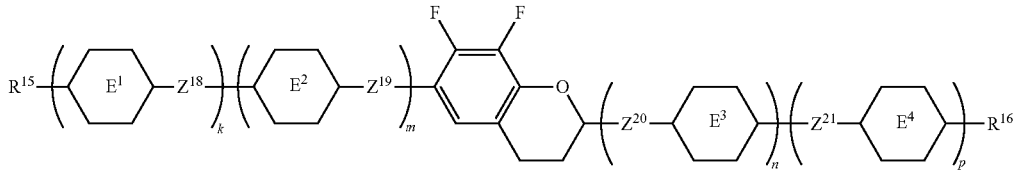

(13)

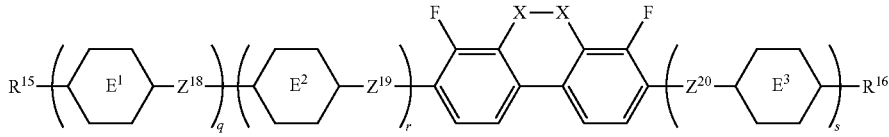

(14)

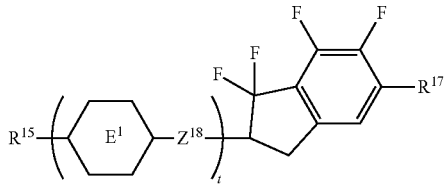

(15)

wherein, in formulas (9) to (15), $R^{15}$, $R^{16}$ and $R^{17}$ are independently alkyl having 1 to 10 carbons or alkenyl having 2 to 10 carbons, and in the groups, at least one piece of —CH$_2$— may be replaced by —O—, at least one hydrogen may be replaced by fluorine, and $R^{17}$ may be hydrogen or fluorine;

ring $E^1$, ring $E^2$, ring $E^3$ and ring $E^4$ are independently 1,4-cyclohexylene, 1,4-cyclohexenylene, 1,4-phenylene, 1,4-phenylene in which at least one hydrogen is replaced by fluorine, tetrahydropyran-2,5-diyl or decahydronaphthalene-2,6-diyl;

ring $E^5$ and ring $E^6$ are independently 1,4-cyclohexylene, 1,4-cyclohexenylene, 1,4-phenylene, tetrahydropyran-2,5-diyl, or decahydronaphthalene-2,6-diyl;

$Z^{18}$, $Z^{19}$, $Z^{20}$ and $Z^{21}$ are independently a single bond, —COO—, —OCO—, —CH$_2$O—, —OCH$_2$—, —CF$_2$O—, —OCF$_2$—, —CH$_2$CH$_2$—, —CF$_2$OCH$_2$CH$_2$— or —OCF$_2$CH$_2$CH$_2$—;

$L^{15}$ and $L^{16}$ are independently fluorine or chlorine;

$S^{11}$ is hydrogen or methyl;

X is —CHF— or —CF$_2$—; and j, k, m, n, p, q, r and s are independently 0 or 1, a sum of k, m, n and p is 1 or 2, a sum of q, r and s is 0, 1, 2 or 3, and t is 1, 2 or 3.

Item 13. The liquid crystal composition according to anyone of items 8 to 12, further containing at least one additive selected from the group of a polymerizable compound, a polymerization initiator, a polymerization inhibitor, an optically active compound, an antioxidant, an ultraviolet light absorber, a light stabilizer, a heat stabilizer, a dye and an antifoaming agent.

Item 14. A liquid crystal display device, including the liquid crystal composition according to any one of items 8 to 13.

An aspect of compound (1), a synthesis method of compound (1), the liquid crystal composition and the liquid crystal display device will be described in the order.

1. Aspect of Compound (1)

Compound (1) of the invention has a structure of a polyfluoro-2-butenoxy group. Compound (1) has features of having larger dielectric anisotropy and superb heating reliability in comparison with a similar compound (see Comparative Example 1). A preferred example of compound (1) will be described. Preferred examples of terminal group $R^1$, ring $A^1$, bonding group $Z^1$, substituents $L^1$ and $L^2$ and substituents $Y^1$ and $Y^2$ in compound (1) apply also to a subordinate formula of compound (1). In compound (1), physical properties can be arbitrarily adjusted by suitably combining the above groups. Compound (1) may contain an isotope such as $^2$H (deuterium) and $^{13}$C in an amount larger than an amount of natural abundance because no significant difference is in the physical properties of the compound. In addition, definitions of symbols of compound (1) are as described in item 1.

Compound (1) of the invention has the larger dielectric anisotropy and the excellent heating reliability in comparison with the similar compound as described above, and in addition thereto, is expected to satisfy at least one of physical properties such as high stability to heat and light, a high clearing point (or a high maximum temperature of a nematic phase), a low minimum temperature of the liquid crystal phase, small viscosity, suitable optical anisotropy, large dielectric anisotropy, a suitable elastic constant and good compatibility with other liquid crystal compounds.

Formula 12

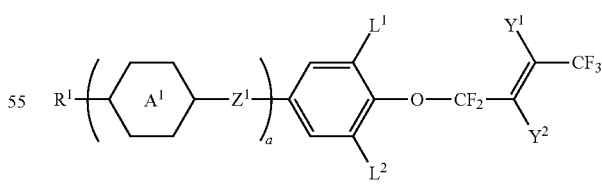

(1)

In formula (1), $R^1$ is alkyl having 1 to 15 carbons, and in the $R^1$, at least one piece of —CH$_2$— may be replaced by —O— or —S—, at least one piece of —CH$_2$CH$_2$— may be replaced by —CH=CH— or —C≡C—, and at least one hydrogen may be replaced by halogen.

Examples of $R^1$ include alkyl, alkoxy, alkoxyalkyl, alkoxyalkoxy, alkenyl, alkenyloxy, alkenyloxyalkyl, alkoxyalkenyl, alkylthio, alkylthioalkyl, alkenylthio, alkenylthioalkyl and alkylthioalkenyl. Preferred $R^1$ is alkyl, alkoxy, alkoxyalkyl, alkoxyalkoxy, alkenyl, alkenyloxy, alkenyloxyalkyl or alkoxyalkenyl. Further preferred $R^1$ is alkyl, alkoxy, alkoxyalkyl, alkenyl or alkenyloxy. Particularly preferred $R^1$ is alkyl or alkenyl. Most preferred $R^1$ is alkyl.

In $R^1$, preferred alkyl is —$CH_3$, —$C_2H_7$, —$C_3H_7$, —$C_4H_9$, —$O_5H_{11}$, —$C_6H_{13}$ or —$C_7H_{15}$.

In $R^1$, preferred alkoxy is —$OCH_3$, —$OC_2H_5$, —$OC_3H_7$, —$OC_4H_9$, —$OC_5H_{11}$, —$Oc_6H_{13}$ or —$OC_7H_{15}$.

In $R^1$, preferred alkoxyalkyl is —$CH_2OCH_3$, —$CH_2OC_2H_5$, —$CH_2OC_3H_7$, —$(CH_2)_2$—$OCH_3$, —$(CH_2)_2$—$OC_2H_5$, —$(CH_2)_2$—$OC_3H_7$, —$(CH_2)_3$—$OCH_3$, —$(CH_2)_4$—$OCH_3$ or —$(CH_2)_5$—$OCH_3$.

In $R^1$, preferred alkenyl is —$CH$=$CH_2$, —$CH$=$CHCH_3$, —$CH_2CH$=$CH_2$, —$CH$=$CHC_2H_5$, —$CH_2CH$=$CHCH_3$, —$(CH_2)_2$—$CH$=$CH_2$, —$CH$=$CHC_3H_7$, —$CH_2CH$=$CHC_2H_5$, —$(CH_2)_2$—$CH$=$CHCH_3$ or —$(CH_2)_3$—$CH$=$CH_2$—.

In $R^1$, preferred alkenyloxy is —$OCH_2CH$=$CH_2$, —$OCH_2CH$=$CHCH_3$ or —$OCH_2CH$=$CHC_2H_5$.

Particularly preferred $R^1$ is —$CH_3$, —$C_2H_5$, —$C_3H_7$, —$C_4H_9$, —$O_5H_{11}$, —$C_6H_{13}$, —$OCH_3$, —$OC_2H_5$, —$OC_3H_7$, —$OC_4H_9$, —$OC_5H_{11}$, —$CH_2OCH_3$, —$CH$=$CH_2$, —$CH$=$CHCH_3$, —$(CH_2)_2$—$CH$=$CH_2$, —$CH_2CH$=$CHC_2H_5$, —$(CH_2)_2$—$CH$=$CHCH_3$, —$OCH_2CH$=$CH_2$, —$OCH_2CH$=$CHCH_3$ or —$OCH_2CH$=$CHC_2H_5$. Most Preferred $R^1$ is —$C_3H_7$, —$C_4H_9$, —$O_5H_{11}$, —$C_6H_{13}$, —$(CH_2)_2$—$CH$=$CH_2$ or —$(CH_2)_2$—$CH$=$CHCH_3$.

When $R^1$ has a straight chain, a temperature range of the liquid crystal phase is wide and the viscosity is small. When $R^1$ has a branched chain, the compatibility with other liquid crystal compounds is good. A compound in which $R^1$ is optically active is useful as a chiral dopant. A reverse twisted domain to be generated in the liquid crystal display device can be prevented by adding the compound to the composition. A compound in which $R^1$ is not an optically active is useful as a component of the composition. When $R^1$ is alkenyl, a preferred configuration depends on a position of a double bond. An alkenyl compound having the preferred configuration has the small viscosity, the high maximum temperature or a wide temperature range of the liquid crystal phase.

A preferred configuration of —$CH$=$CH$— in the alkenyl depends on a position of the double bond. In alkenyl having the double bond in an odd-numbered position, such as —$CH$=$CHCH_3$, —$CH$=$CHC_2H_5$, —$CH$=$CHC_3H_7$, —$CH$=$CHC_4H_9$, —$C_2H_4CH$=$CHCH_3$ and —$C_2H_4CH$=$CHC_2H_5$, a trans configuration is preferred. In alkenyl having the double bond in an even-numbered position, such as —$CH_2CH$=$CHCH_3$, —$CH_2CH$=$CHC_2H_5$ and —$CH_2CH$=$CHC_3H_7$, a cis configuration is preferred. An alkenyl compound having the preferred configuration has a high clearing point or the wide temperature range of the liquid crystal phase. A detailed description is found in Mol. Cryst. Liq. Cryst., 1985, 131, 109 and Mol. Cryst. Liq. Cryst., 1985, 131 and 327.

In formula (1), ring $A^1$ is 1,4-cyclohexylene, 1,4-cyclohexenylene, 1,4-phenylene, tetrahydropyran-2,5-diyl, 1,3-dioxane-2,5-diyl, 2,6,7-trioxabicyclo[2.2.2]octane-1,4-diyl, pyrimidine-2,5-diyl or pyridine-2,5-diyl, and at least one hydrogen directly bonded to the rings may be replaced by halogen.

Preferred examples of ring $A^1$ are 1,4-cyclohexylene, 1,4-phenylene, 1,4-phenylene in which at least one hydrogen is replaced by halogen, tetrahydropyran-2,5-diyl, 1,3-dioxane-2,5-diyl and 2,6,7-trioxabicyclo[2.2.2]octane-1,4-diyl. Cis and trans configurations exist in 1,4-cyclohexylene. From a viewpoint of the high maximum temperature, a trans configuration is preferred. Preferred examples of 1,4-phenylene in which at least one hydrogen is replaced by halogen include rings (A-1) to (A-17).

Formula 13

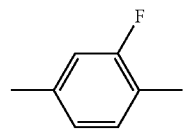 (A-1)

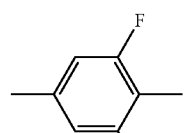 (A-2)

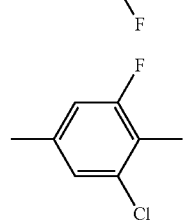 (A-3)

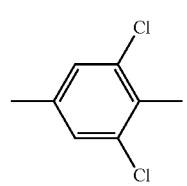 (A-4)

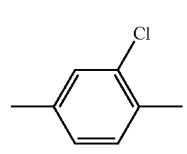 (A-5)

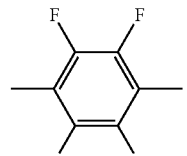 (A-6)

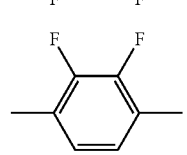 (A-7)

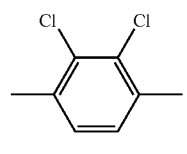 (A-8)

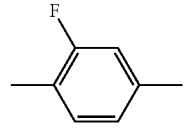 (A-9)

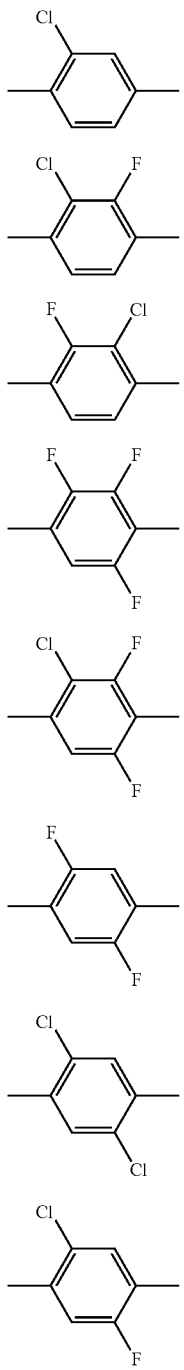

Then, 2-fluoro-1,4-phenylene (A-1) is left-right asymmetrical. In a chemical formula thereof, a case where fluorine is positioned on a side of a left-terminal group (leftward), and a case where fluorine is positioned on a side of a right-terminal group (rightward) exist. Preferred 2-fluoro-1,4-phenylene is rightward (A-1) in order to increase the dielectric anisotropy. A same rule applies to 2,6-difluoro-1,4-phenylene or the like. More specifically, groups (A-1) to (A-5) are further preferred.

Further preferred examples of 1,4-phenylene in which at least one hydrogen is replaced by halogen are 2-fluoro-1,4-phenylene, 2,6-difluoro-1,4-phenylene, 2-chloro-6-fluoro-1, 4-phenylene, 2,6-dichloro-1,4-phenylene, and 2-chloro-1,4-phenylene. Most preferred examples of 1,4-phenylene in which at least one hydrogen is replaced by halogen are 2-fluoro-1,4-phenylene and 2,6-difluoro-1,4-phenylene.

Further preferred examples of ring $A^1$ are 1,4-cyclohexylene, 1,4-phenylene, 2-fluoro-1,4-phenylene, 2,6-difluoro-1,4-phenylene, tetrahydropyran-2,5-diyl and 1,3-dioxane-2,5-diyl.

When all of $A^1$ rings are 1,4-cyclohexylene, the clearing point is high and the viscosity is small. When at least one of rings $A^1$ is 1,4-phenylene, or 1,4-phenylene in which at least one hydrogen is replaced by halogen, the optical anisotropy is comparatively large and an orientational order parameter is comparatively large. When at least one of rings $A^1$ is 1,4-phenylene in which at least one hydrogen is replaced by halogen, tetrahydropyran-2,5-diyl, pyrimidine-2,5-diyl, pyridine-2,5-diyl, 1,3-dioxane-2,5-diyl or 2,6,7-trioxabicyclo[2.2.2]octane-1,4-diyl, the dielectric anisotropy is large.

In formula (1), $Z^1$ is a single bond, —CH$_2$CH$_2$—, —C≡C—, —CH=CH—, —CF=CF—, —CF$_2$O—, —OCF$_2$—, —CH$_2$O—, —OCH$_2$—, —COO— or —OCO—.

Preferred examples of $Z^1$ are a single bond, —CH$_2$CH$_2$—, —CH=CH—, —CF=CF—, —COO— and —CF$_2$O—. Further preferred examples of $Z^1$ are a single bond and —CF$_2$O—.

When bonding group $Z^1$ is a single bond, —CH$_2$CH$_2$—, —CH=CH— or —CF$_2$O—, the viscosity is small. When $Z^1$ is —CH=CH— or —CH$_2$O—, the temperature range of the liquid crystal phase is wide, and an elastic constant (K) is large. When $Z^1$ is —CH=CH— or —C≡C—, the optical anisotropy is large. When $Z^1$ is —CF$_2$O— or —COO—, the dielectric anisotropy is large. When $Z^1$ is a single bond, —CH$_2$CH$_2$—, —CF$_2$O— or —CH$_2$O—, chemical stability is high.

In formula (1), $L^1$ and $L^2$ are independently hydrogen or halogen. Preferred halogen is fluorine or chlorine. Further preferred halogen is fluorine. As a preferred combination of $L^1$ and $L^2$, one of $L^1$ and $L^2$ is hydrogen, and the other is fluorine. As a further preferred combination of $L^1$ and $L^2$, both $L^1$ and $L^2$ are fluorine.

When one of $L^1$ or $L^2$ is fluorine, the dielectric anisotropy is large. When both $L^1$ and $L^2$ are fluorine, the dielectric anisotropy is particularly large.

In formula (1), $Y^1$ and $Y^2$ are independently hydrogen or halogen. Preferred halogen is fluorine or chlorine. Further preferred halogen is fluorine. As a preferred combination of $Y^1$ and $Y^2$, one of $Y^1$ or $Y^2$ is hydrogen, and the other is fluorine. As a further preferred combination of $Y^1$ and $Y^2$, $Y^1$ is hydrogen or fluorine and $Y^2$ is fluorine. When $Y^2$ is fluorine, the dielectric anisotropy is particularly large.

In formula (1), a is 1, 2, 3 or 4. Preferred a is 2, 3 or 4. Further preferred a is 2 or 3. From a viewpoint of the small viscosity, preferred a is 2. From a viewpoint of the high maximum temperature, preferred a is 3.

Examples of preferred compound (1) include any of compounds (1-1) to (1-4) described in item 4 and item 5. Examples of further preferred compound (1) include compounds (1-5) to (1-12) described in item 6. Examples of most preferred compound (1) include compounds (1-13) to (1-23) described in item 7.

Compounds (1-13) to (1-15) and compounds (1-19) to (1-20) are preferred from viewpoints of the high stability to heat and light and the small viscosity. Compounds (1-21) to (1-23) are preferred from viewpoints of the high clearing point and the good compatibility. Compounds (1-16) to (1-18) are preferred from viewpoints of the high clearing point and the large optical anisotropy.

2. Synthesis of Compound (1)

A synthesis method of compound (1) will be described. Compound (1) can be prepared by suitably combining methods of synthetic organic chemistry. A method of introducing a terminal group, a ring and a bonding group needed into a starting material is described in books such as "Organic Syntheses" (John Wiley & Sons, Inc.), "Organic Reactions" (John Wiley & Sons, Inc.), "Comprehensive Organic Synthesis" (Pergamon Press) and "New Experimental Chemistry Course" (Shin Jikken Kagaku Koza in Japanese, Maruzen Co., Ltd.).

2-1. Formation of Bonding Group Z

With regard to methods of forming bonding groups $Z^1$ to $Z^4$, first, a scheme will be shown. Next, a reaction described in the scheme will be described by methods (1) to (11). In the scheme, MSG' (or $MSG^2$) is a monovalent organic group having at least one ring. The monovalent organic groups represented by a plurality of MSG' (or $MSG^2$) used in the scheme may be identical or different. Compounds (1A) to (1J) correspond to compound (1).

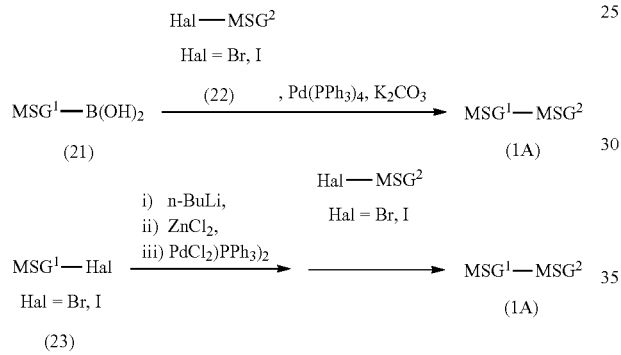

Formula 14

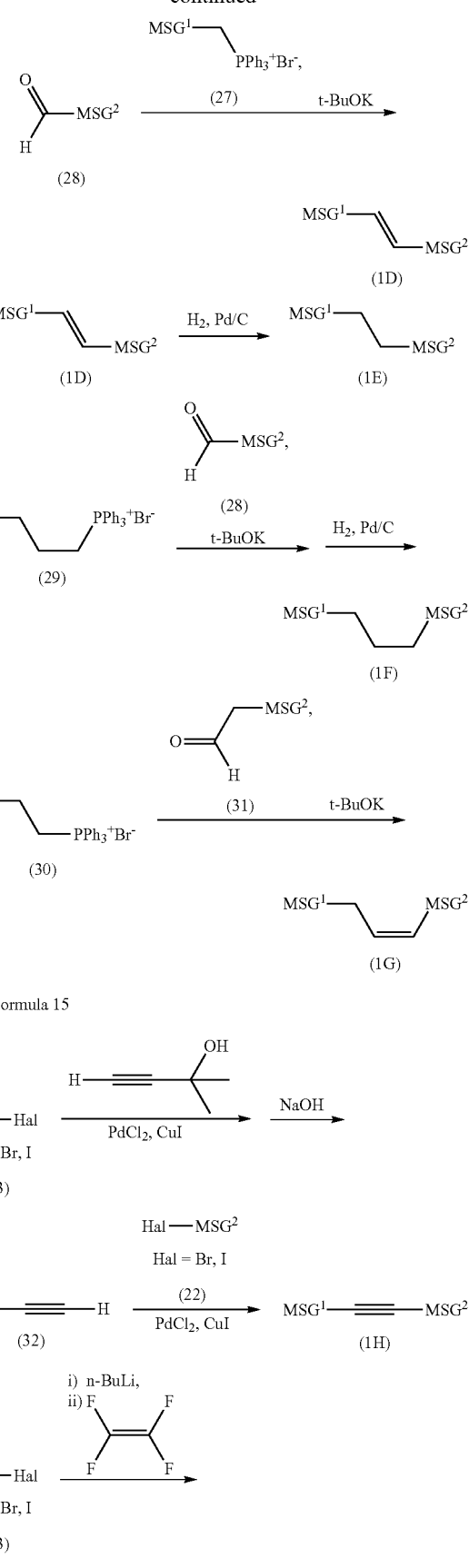

Formula 15

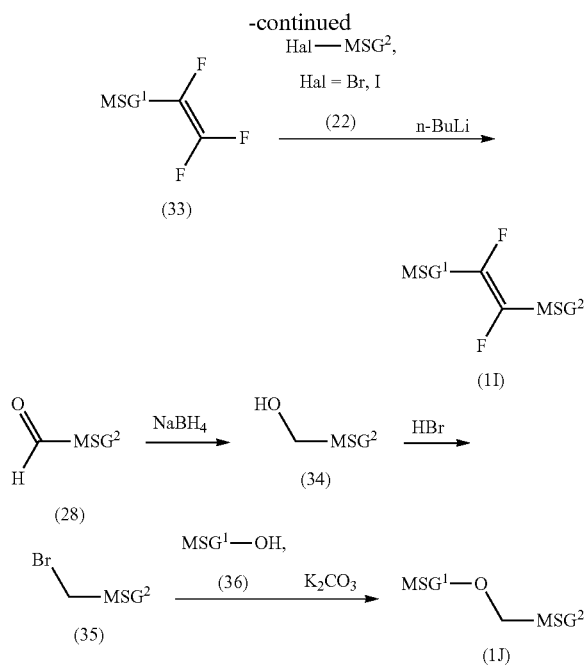

(1) Formation of a Single Bond

Compound (1A) is prepared by allowing aryl boronic acid (21) prepared according to a known method to react with halide (22), in the presence of carbonate and a catalyst such as tetrakis(triphenylphosphine)palladium. Compound (1A) is also prepared by allowing halide (23) prepared according to a known method to react with n-butyllithium and subsequently with zinc chloride, and further with halide (22) in the presence of a catalyst such as dichlorobis(triphenylphosphine)palladium.

(2) Formation of —COO—

Carboxylic acid (24) is obtained by allowing halide (23) to react with n-butyllithium and subsequently with carbon dioxide. Compound (1B) is prepared by dehydration of compound (25) prepared according to a known method and carboxylic acid (24) in the presence of 1,3-dicyclohexylcarbodiimide (DCC) and 4-dimethylaminopyridine (DMAP).

(3) Formation of —CF$_2$O—

Thionoester (26) is obtained by treating compound (1B) with a thiation reagent such as Lawesson's reagent. Compound (1C) is prepared by fluorinating thionoester (26) with a hydrogen fluoride-pyridine complex and N-bromosuccinimide (NBS). Refer to M. Kuroboshi et al., Chem. Lett., 1992, 827. Compound (1C) is also prepared by fluorinating thionoester (26) with (diethylamino)sulfur trifluoride (DAST). Refer to W. H. Bunnelle et al., J. Org. Chem. 1990, 55, 768. The bonding group can also be formed according to the method described in Peer. Kirsch et al., Angew. Chem. Int. Ed. 2001, 40, 1480.

(4) Formation of —CH=CH—

Aldehyde (28) is obtained by treating halide (22) with n-butyllithium and then allowing the treated halide to react with formamide such as N,N-dimethylformamide (DMF). Phosphorus ylide is generated by treating phosphonium salt (27) prepared according to a known method with a base such as potassium t-butoxide. Compound (1D) is prepared by allowing the phosphorus ylide to react with aldehyde (28). A cis isomer may be generated depending on reaction conditions, and the cis isomer is isomerized into a trans isomer according to a known method when necessary.

(5) Formation of —CH$_2$CH$_2$—

Compound (1E) is prepared by hydrogenating compound (1D) in the presence of a catalyst such as palladium on carbon.

(6) Formation of —(CH$_2$)$_4$—

A compound having —(CH$_2$)$_2$—CH=CH— is obtained by using phosphonium salt (29) in place of phosphonium salt (27) according to the method in method (4). Compound (1F) is prepared by performing catalytic hydrogenation of the compound obtained.

(7) Formation of —CH$_2$CH=CHCH$_2$—

Compound (1G) is prepared according to method (4) by using phosphonium salt (30) in place of phosphonium salt (27), and aldehyde (31) in place of aldehyde (28). A trans isomer may be generated depending on reaction conditions, and the trans isomer is isomerized to a cis isomer according to a known method when necessary.

(8) Formation of —C≡C—

Compound (32) is obtained by allowing halide (23) to react with 2-methyl-3-butyn-2-ol in the presence of a catalyst including dichloropalladium and copper halide, and then performing deprotection under basic conditions. Compound (1H) is prepared by allowing compound (32) to react with halide (22) in the presence of the catalyst including dichloropalladium and copper halide.

(9) Formation of —CF=CF—

Compound (33) is obtained by treating halide (23) with n-butyllithium and then allowing the treated halide to react with tetrafluoroethylene. Compound (1I) is prepared by treating halide (22) with n-butyllithium, and then allowing the treated halide to react with compound (33).

(10) Formation of —OCH$_2$—

Compound (34) is obtained by reducing aldehyde (28) with a reducing agent such as sodium borohydride. Bromide (35) is obtained by brominating compound (34) with hydrobromic acid or the like. Compound (1J) is prepared by allowing bromide (35) to react with compound (36) in the presence of a base such as potassium carbonate.

(11) Formation of —CF$_2$CF$_2$—

A compound having —(CF$_2$)$_2$— is obtained by fluorinating diketone (—COCO—) with sulfur tetrafluoride in the presence of a hydrogen fluoride catalyst according to the method described in J. Am. Chem. Soc., 2001, 123, 5414.

2-2. Formation of Ring A$^1$

With regard to rings such as 1,4-cyclohexylene, 1,4-phenylene, 2-fluoro-1,4-phenylene, 2,6-difluoro-1,4-phenylene, tetrahydropyran-2,5-diyl, 1,3-dioxane-2,5-diyl, pyrimidine-2,5-diyl, pyridine-2,5-diyl and 2,6,7-trioxabicyclo[2.2.2]octane-1,4-diyl, a starting material is commercially available, or a synthesis method is well-known.

2-3. Synthesis Example

An example of a method of preparing compound (1) is as described below. Compound (1) is prepared by allowing phenol (37) prepared by a publicly known method to react with polyfluoro-1-butene in THF at 0° C. for 2 hours in the presence of sodium hydroxide.

Formula 16

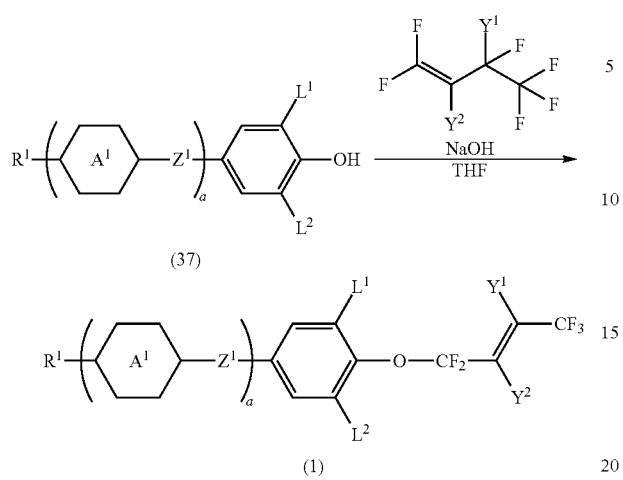

In the above compounds, definitions of $R^1$, rings $A^1$, $Z^1$, $L^1, L^2, Y^1, Y^2$ and a are identical to the definitions in formula (1) described in item 1.

3. Liquid Crystal Composition 3-1. Component Compound

A liquid crystal composition of the invention will be described. The composition contains at least one compound (1) as component A. The composition may contain two, three or more compounds (1). A component in the composition may be compound (1) only. In order to develop excellent physical properties, the composition preferably contains at least one of compounds (1) in the range of about 1% by weight to about 99% by weight. In a composition having positive dielectric anisotropy, a preferred content of compound (1) is in the range of about 5% by weight to about 60% by weight. In a composition having negative dielectric anisotropy, a preferred content of compound (1) is about 30% by weight or less. In a composition having negative dielectric anisotropy, a minimum content when compound (1) is contained is regularly about 1% by weight.

The composition contains compound (1) as component A, and preferably further contains a liquid crystal compound selected from components B, C, D and E shown below. Component B includes compounds (2) to (4). Component C includes compounds (5) to (7). Component D includes compound (8). Component E includes compounds (9) to (15). The composition may also contain other liquid crystal compounds different from compounds (2) to (15). The composition need not contain other liquid crystal compounds. When the composition is prepared, components B, C, D and E are preferably selected and contained by taking into account positive or negative dielectric anisotropy and magnitude of the dielectric anisotropy. The composition prepared by suitably selecting the components has the high stability to heat and light, the high maximum temperature, the low minimum temperature, the small viscosity, the suitable optical anisotropy (namely, the large optical anisotropy or the small optical anisotropy), the large dielectric anisotropy, large specific resistance and the suitable elastic constant (namely, a large elastic constant or a small elastic constant).

Component B includes a compound in which two terminal groups are alkyl or the like. Preferred examples of component B include compounds (2-1) to (2-11), compounds (3-1) to (3-19) and compounds (4-1) to (4-7). In the above compounds, $R^{11}$ and $R^{12}$ are independently alkyl having 1 to 10 carbons or alkenyl having 2 to 10 carbons, and in the groups, at least one piece of —$CH_2$— may be replaced by —O—, and in the monovalent groups, at least one hydrogen may be replaced by fluorine.

Formula 17

(2-1)
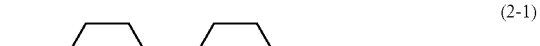

(2-2)

(2-3)

(2-4)

(2-5)

(2-6)

(2-7)
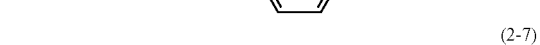

(2-8)

(2-9)

(2-10)

(2-11)

(3-1)

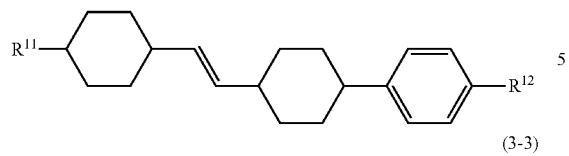
(3-2)
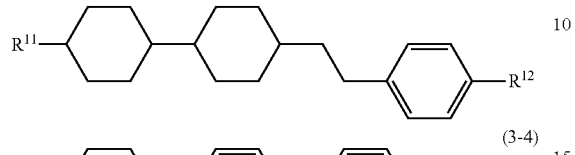
(3-3)
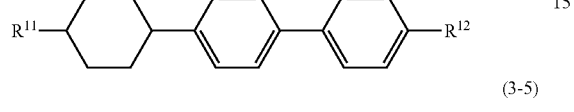
(3-4)
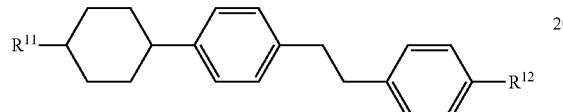
(3-5)
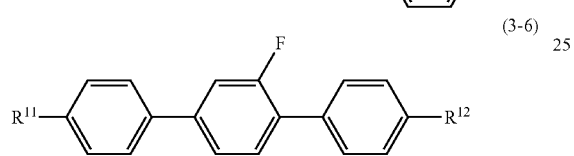
(3-6)
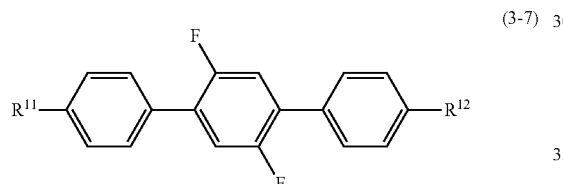
(3-7)
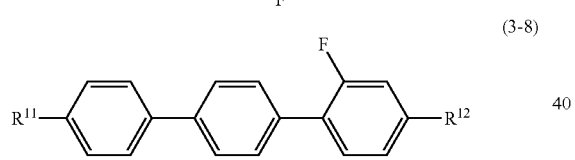
(3-8)
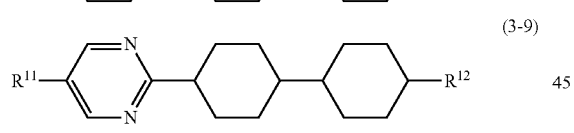
(3-9)
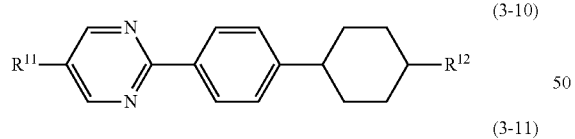
(3-10)
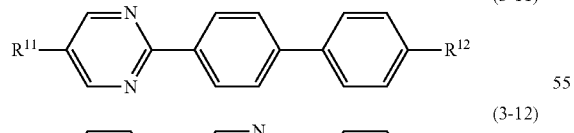
(3-11)
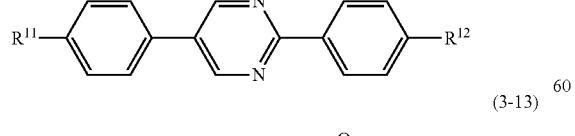
(3-12)
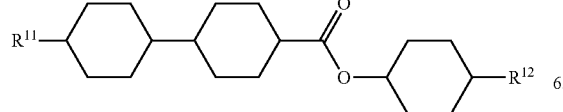
(3-13)
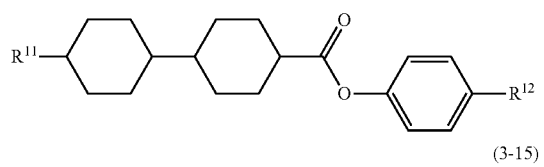
(3-14)
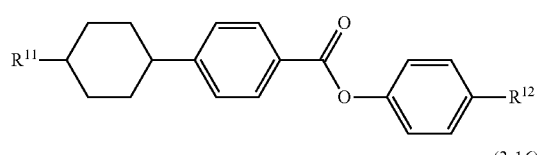
(3-15)
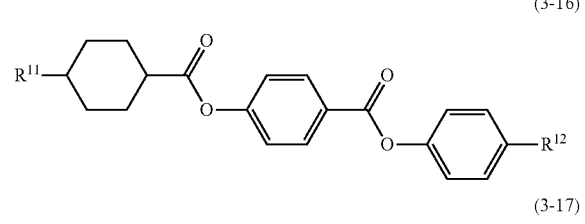
(3-16)
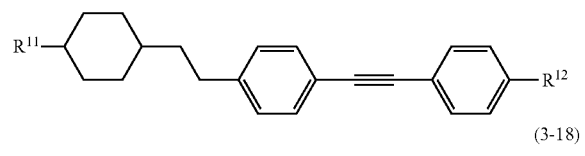
(3-17)
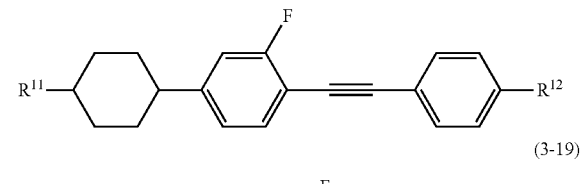
(3-18)
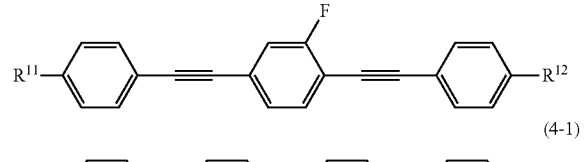
(3-19)
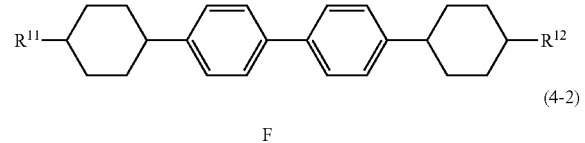
(4-1)
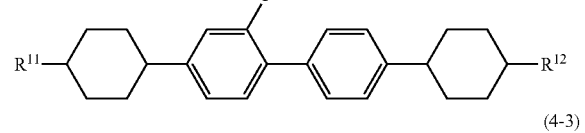
(4-2)
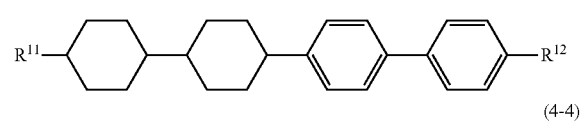
(4-3)
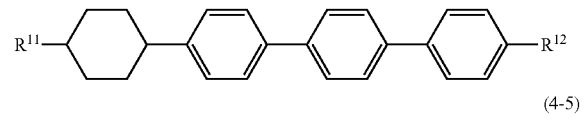
(4-4)
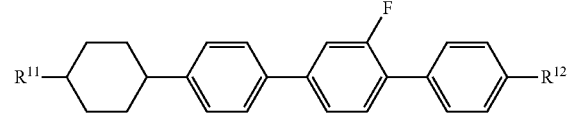
(4-5)

-continued (4-6)
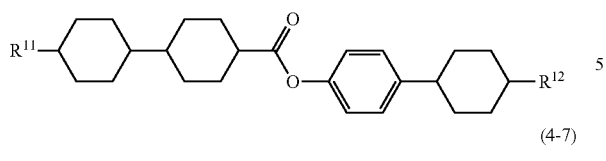

(4-7)
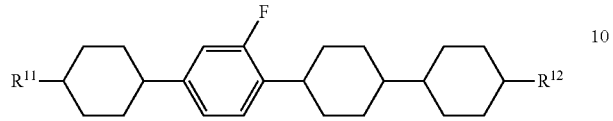

Component B has small dielectric anisotropy. Component B is close to neutrality. Compound (2) is effective in decreasing the viscosity or adjusting the optical anisotropy. Compounds (3) and (4) are effective in extending the temperature range of the nematic phase by increasing the maximum temperature, or in adjusting the optical anisotropy.

As a content of component B is increased, the viscosity of the composition is decreased, and the dielectric anisotropy is decreased. Thus, as long as a desired value of threshold voltage of the device is met, the content is preferably as large as possible. When a composition for the IPS mode, the VA mode or the like is prepared, the content of component B is preferably about 30% by weight or more, and further preferably about 40% by weight or more, based on the weight of the liquid crystal composition.

Component C is a compound having a halogen-containing group or a fluorine-containing group at a right terminal. Preferred examples of component C include compounds (5-1) to (5-16), compounds (6-1) to (6-113) and compounds (7-1) to (7-57). In the above compounds, $R^{13}$ is alkyl having 1 to 10 carbons or alkenyl having 2 to 10 carbons, and in the groups, at least one piece of —$CH_2$— may be replaced by —O—, and in the monovalent groups, at least one hydrogen may be replaced by fluorine; and $X^{11}$ is fluorine, chlorine, —$OCF_3$, —$OCHF_2$, —$CF_3$, —$CHF_2$, —$CH_2F$, —$OCF_2CHF_2$ or —$OCF_2CHFCF_3$.

Formua 18

(5-1)

(5-2)

(5-3)

(5-4)

-continued (5-5)
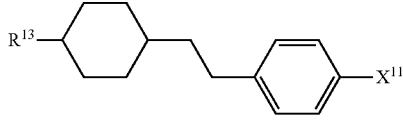

(5-6)
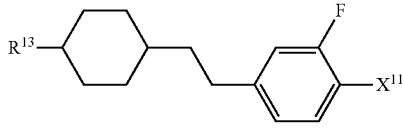

(5-7)
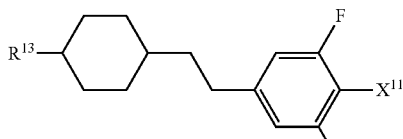

(5-8)
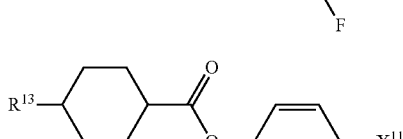

(5-9)
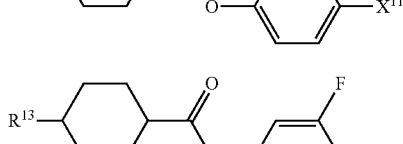

(5-10)
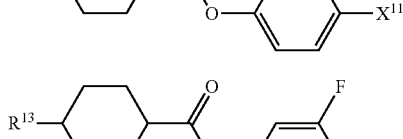

(5-11)
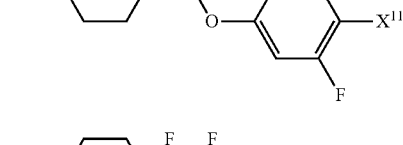

(5-12)
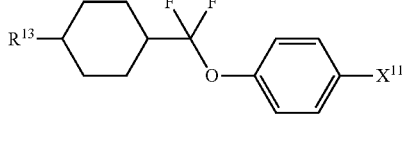

(5-13)
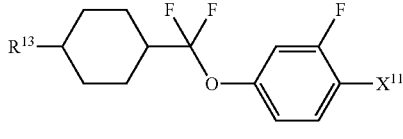

(5-14)

(5-15)
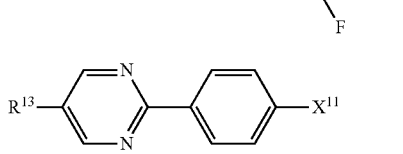

Formula 19

Formula 20
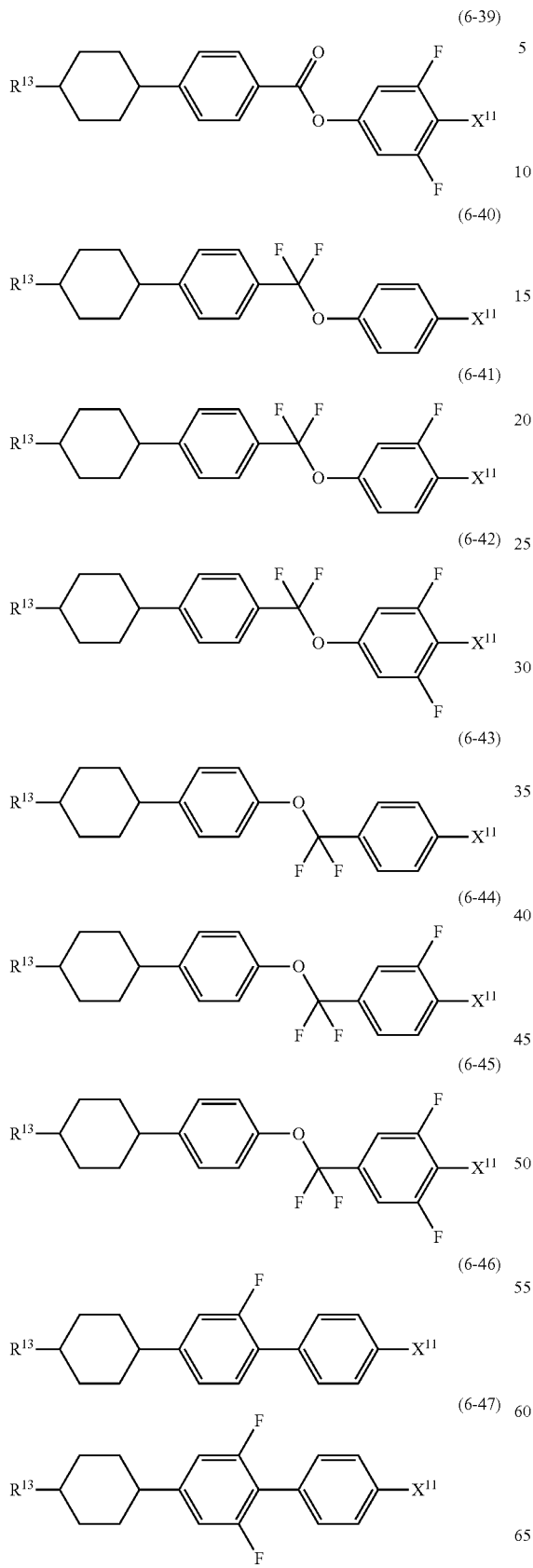
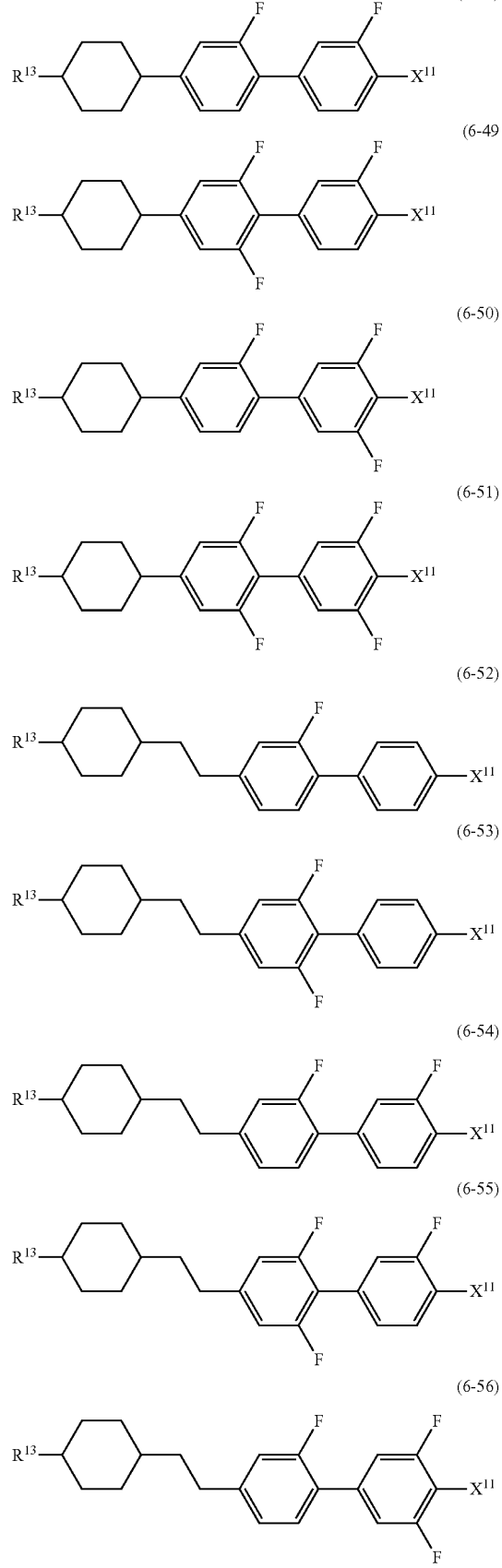

(6-57)
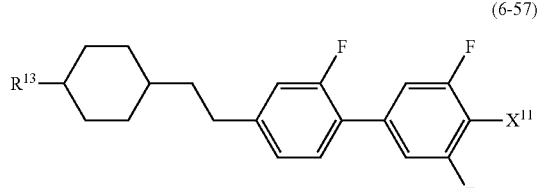
(6-58)
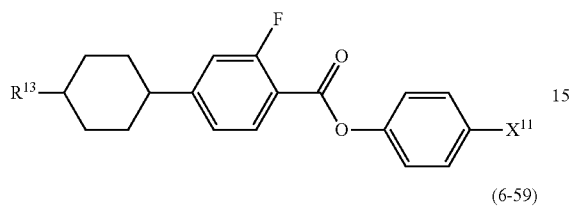
(6-59)
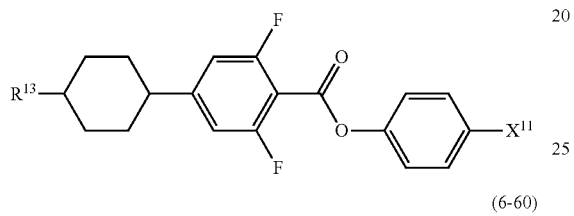
(6-60)
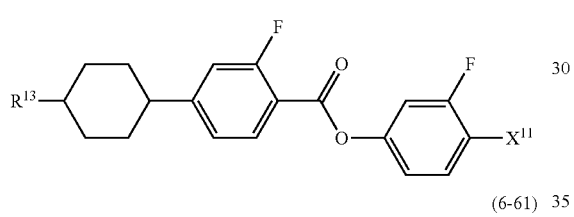
(6-61)
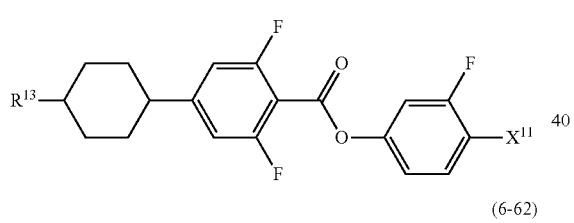
(6-62)
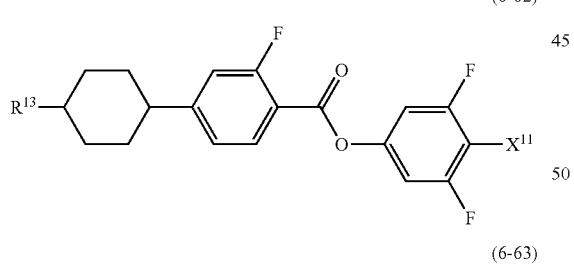
(6-63)
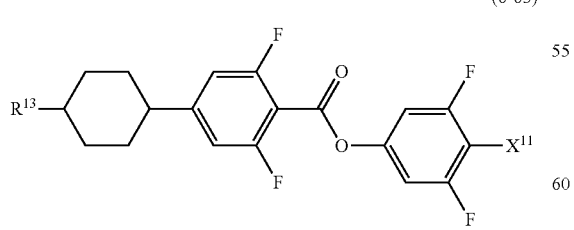
(6-64)
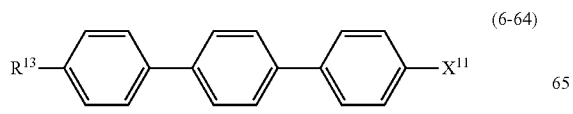
(6-65)
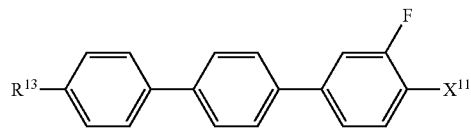
(6-66)
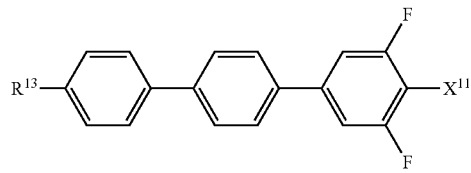
(6-67)
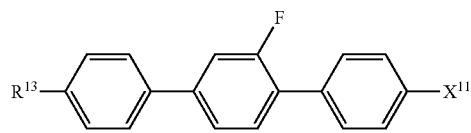
(6-68)
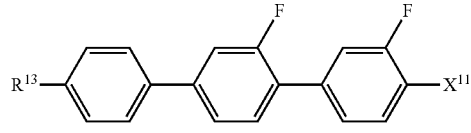
(6-69)
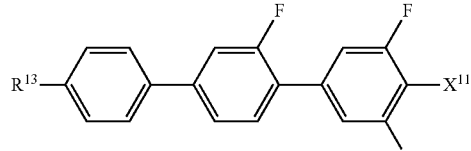
(6-70)
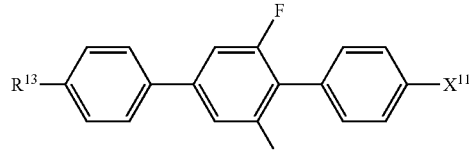
(6-71)
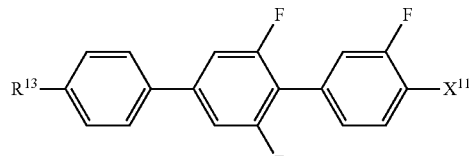
(6-72)
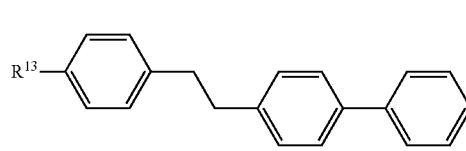
(6-73)
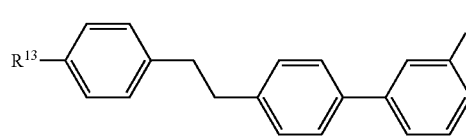

(6-74)
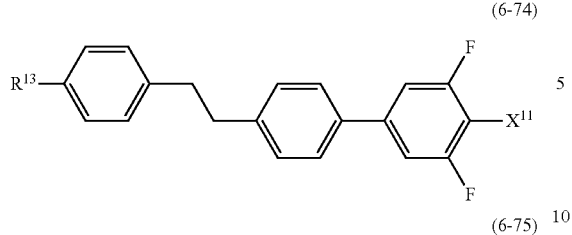
(6-75)
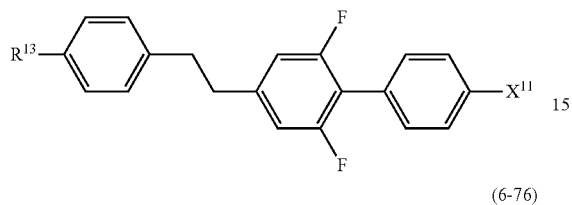
(6-76)
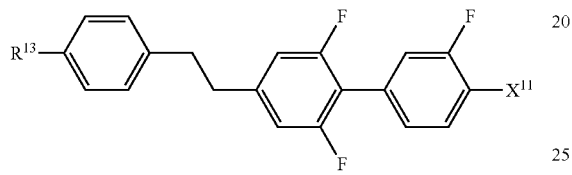
Formula 21
(6-77)
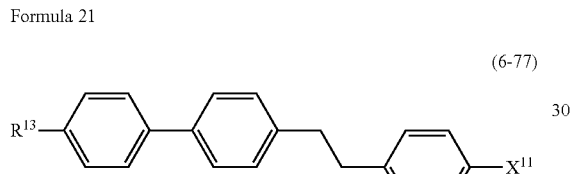
(6-78)
(6-79)
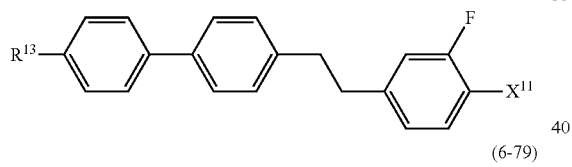
(6-80)
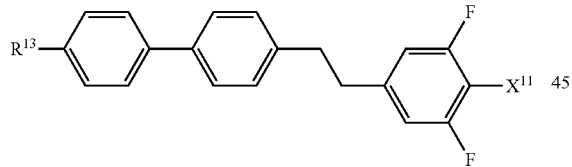
(6-81)
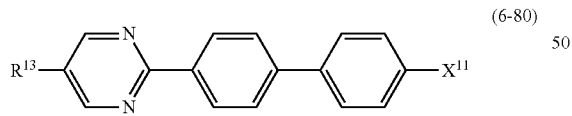
(6-82)
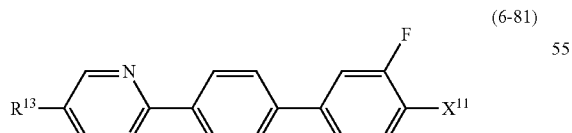
(6-83)
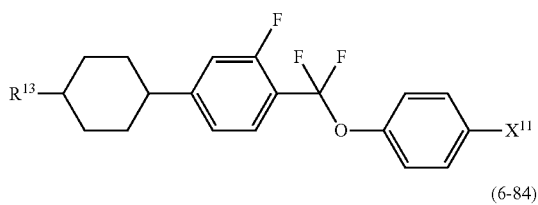
(6-84)
(6-85)
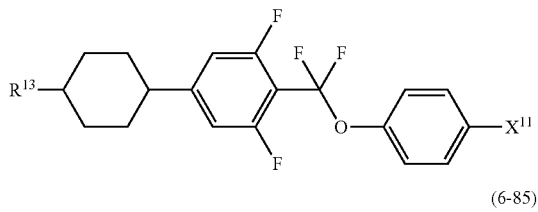
(6-86)
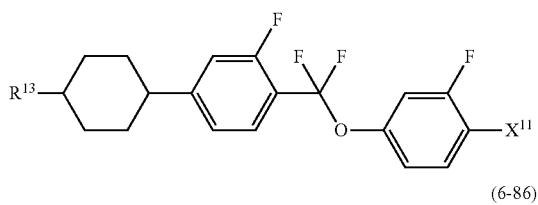
(6-87)
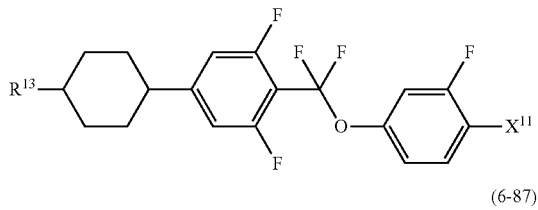
(6-88)
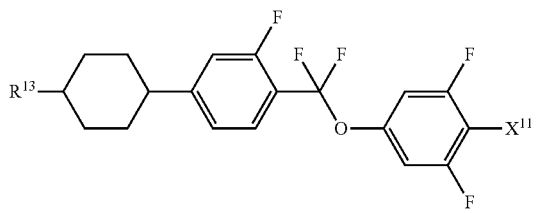
(6-89)
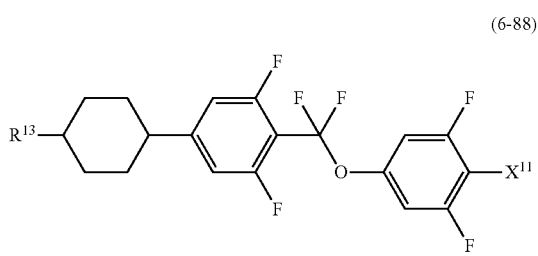
(6-90)
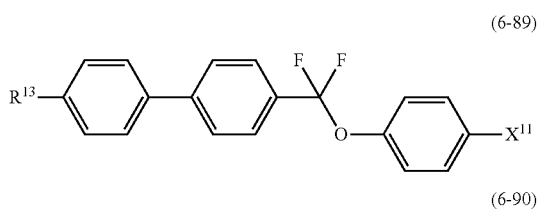

(6-91)
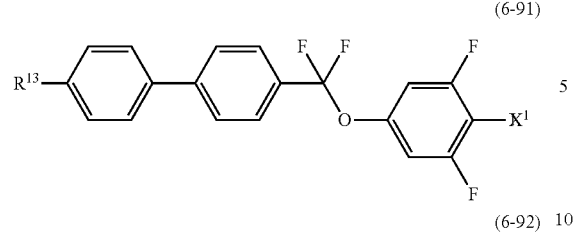
(6-92)
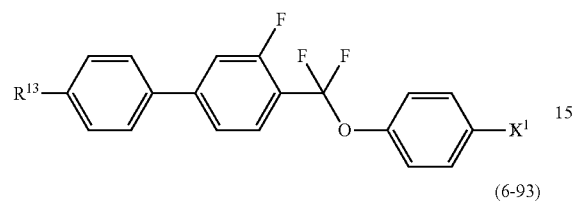
(6-93)
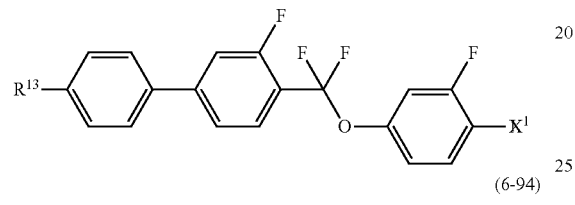
(6-94)
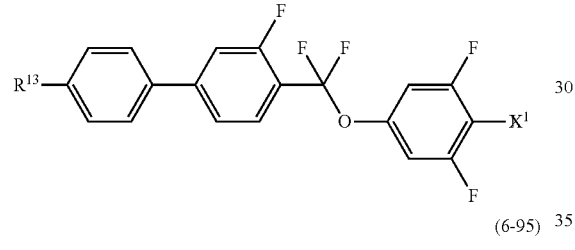
(6-95)
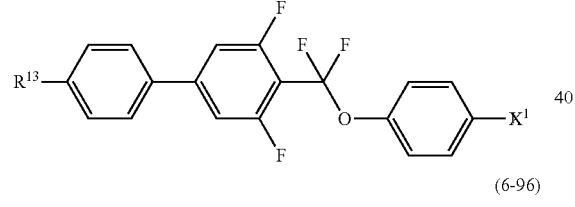
(6-96)
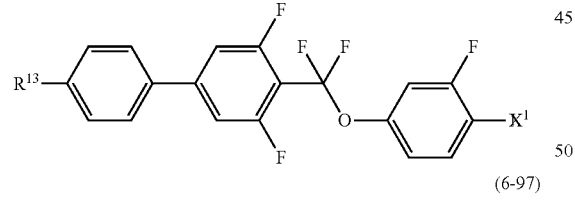
(6-97)
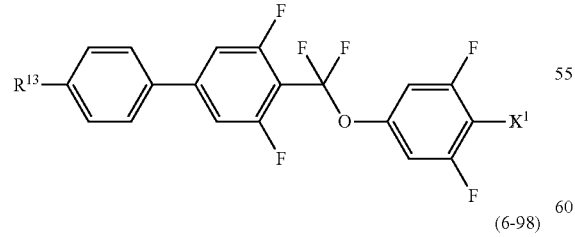
(6-98)
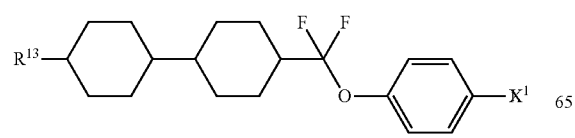
(6-99)
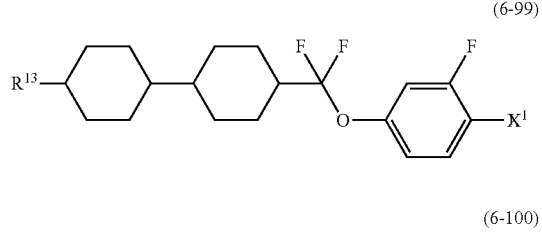
(6-100)
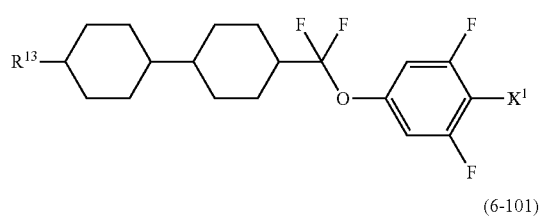
(6-101)
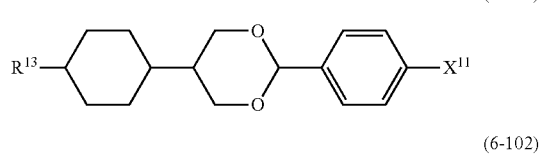
(6-102)
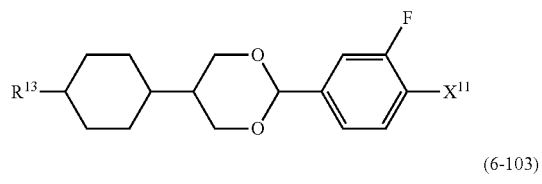
(6-103)
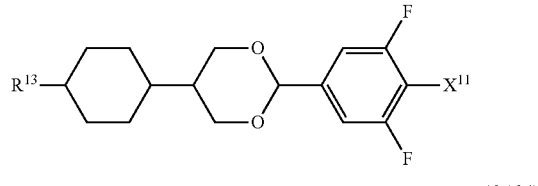
(6-104)
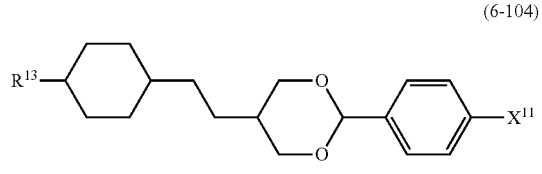
(6-105)
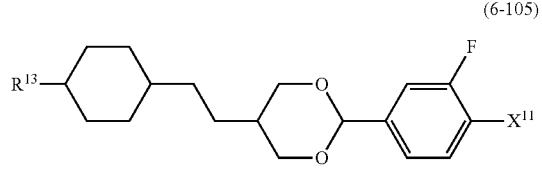
(6-106)
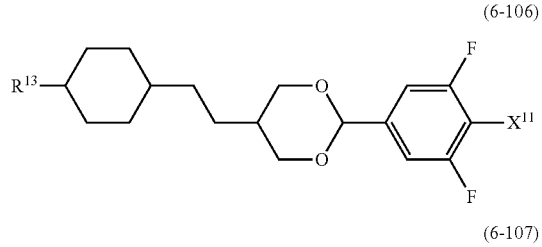
(6-107)
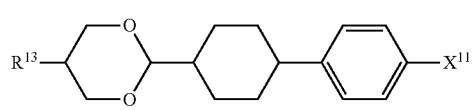

(6-108)
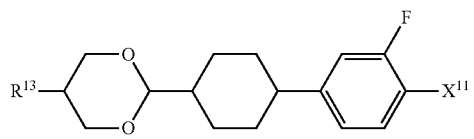
(6-109)
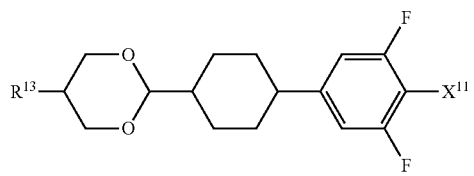
(6-110)
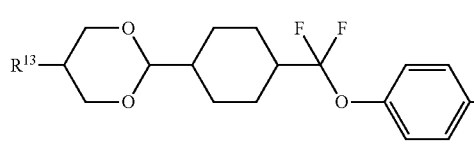
(6-111)
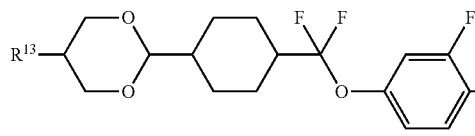
(6-112)
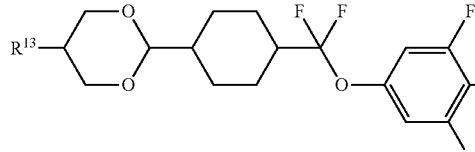
(6-113)
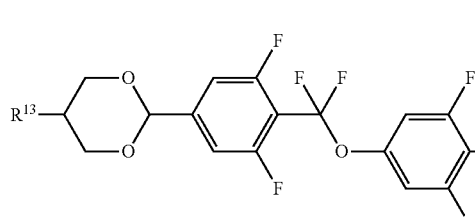
Formula 22
(7-1)
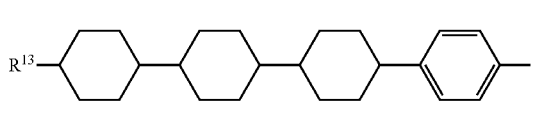
(7-2)
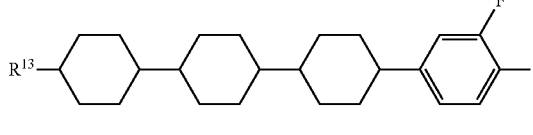
(7-3)
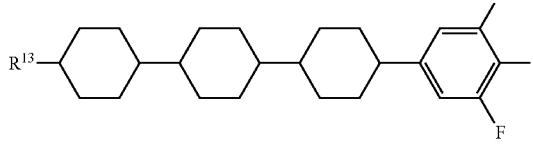
(7-4)
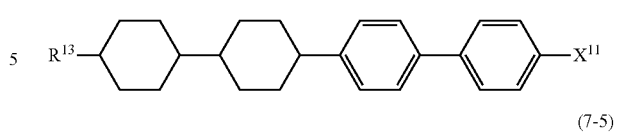
(7-5)
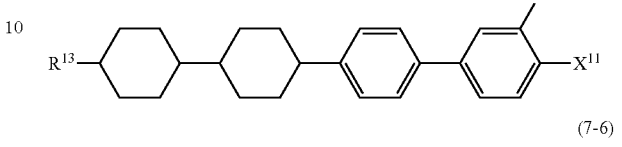
(7-6)
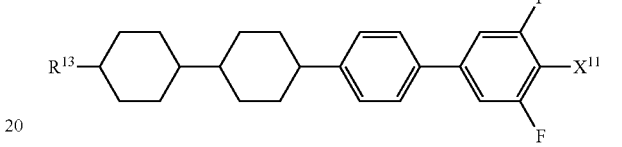
(7-7)
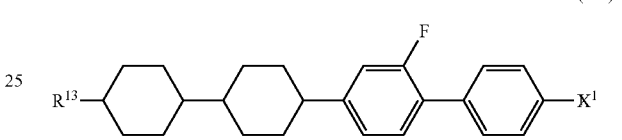
(7-8)
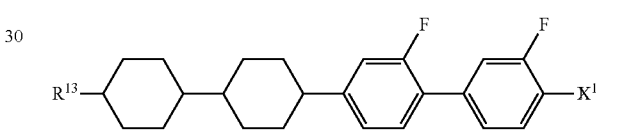
(7-9)
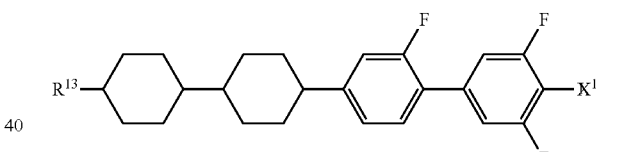
(7-10)
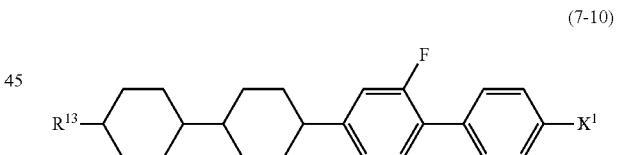
(7-11)
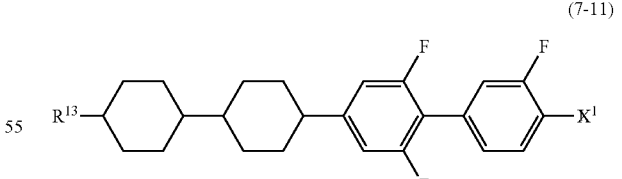
(7-12)
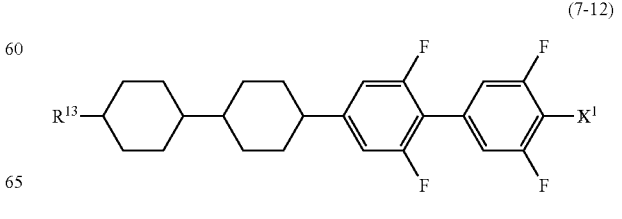

-continued
(7-13)
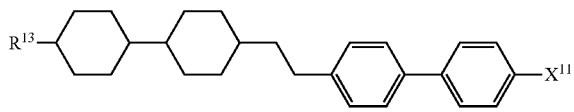
(7-14)
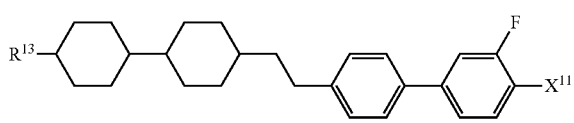
(7-15)
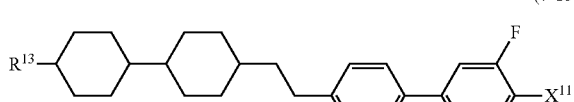
(7-16)
(7-17)
(7-18)
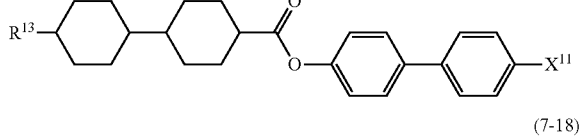
(7-19)
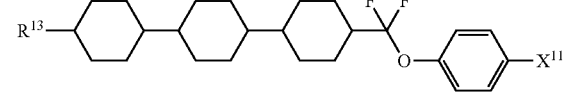
(7-20)
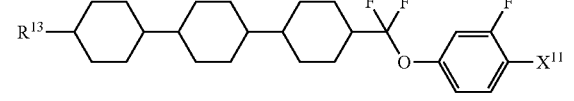
(7-21)
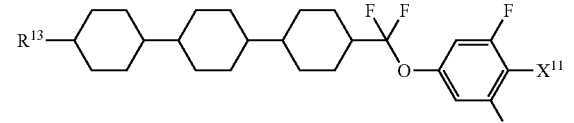
(7-22)
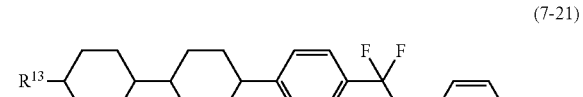
-continued
(7-23)
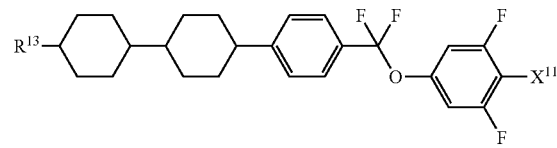
(7-24)
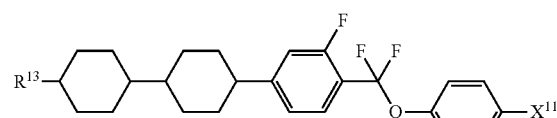
(7-25)
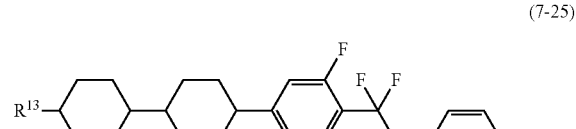
(7-26)
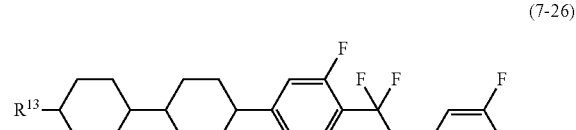
(7-27)
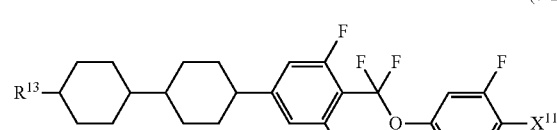
(7-28)
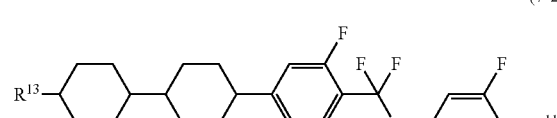
(7-29)
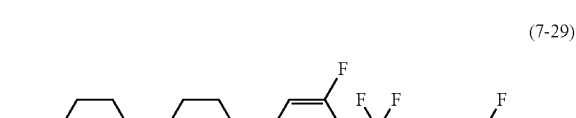
(7-30)
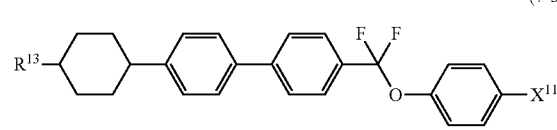
(7-31)
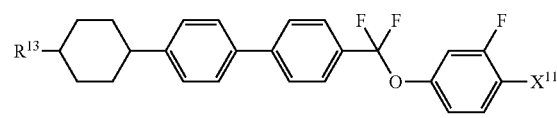

(7-32)
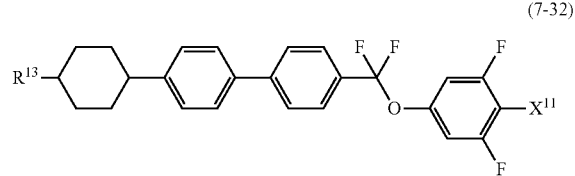
(7-40)
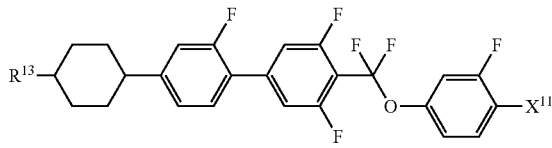
(7-33)
(7-34)
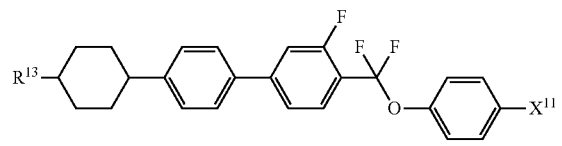
(7-41)
(7-42)
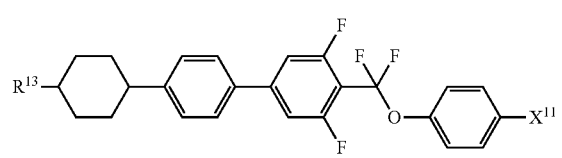
(7-35)
(7-36)
(7-37)
(7-38)
Formula 23
(7-39)
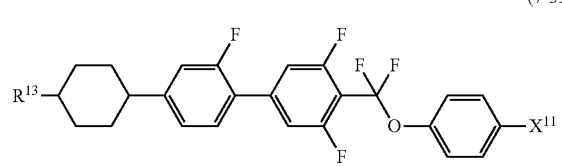
(7-43)
(7-44)
(7-45)
(7-46)
(7-47)
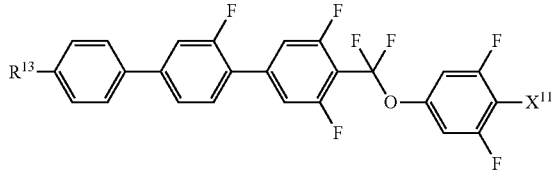

(7-48)
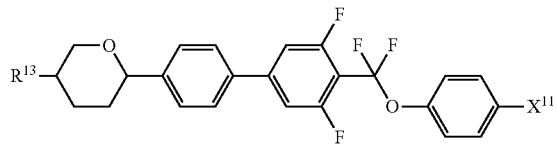

(7-49)
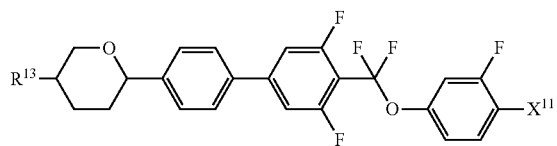

(7-50)
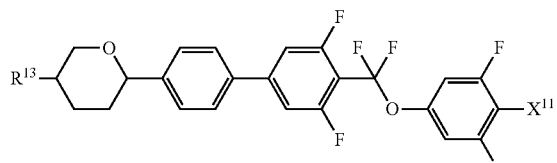

(7-51)
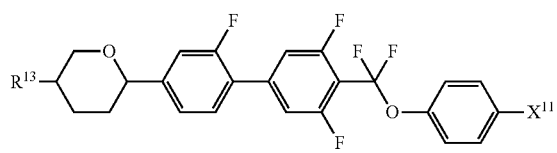

(7-52)
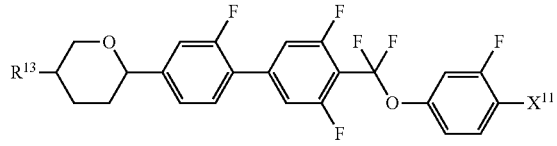

(7-53)
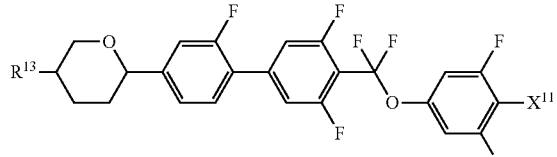

(7-54)
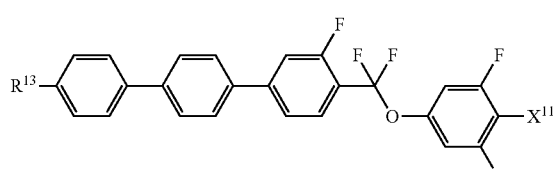

(7-55)
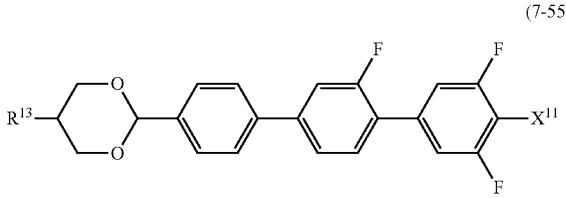

(7-56)
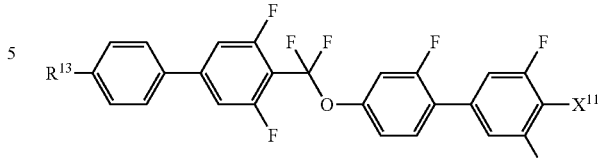

(7-57)
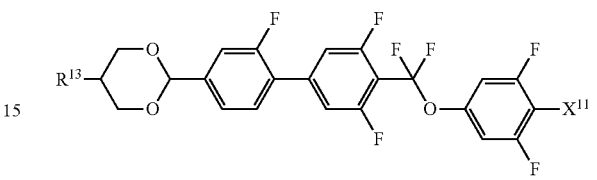

Component C has the positive dielectric anisotropy and is significantly excellent in the stability to heat or light, and therefore is used when a composition for the IPS mode, the FFS mode, and the OCB more and so forth is prepared. A content of component C is suitably in the range of about 1% by weight to about 99% by weight, preferably in the range of about 10% by weight to about 97% by weight, and further preferably in the range of about 40% by weight to about 95% by weight, based on the weight of the liquid crystal composition. When component C is added to a composition having the negative dielectric anisotropy, the content of component C is preferably about 30% by weight or less. The elastic constant of the composition can be adjusted, and a voltage-transmittance curve of the device can be adjusted by adding component C thereto.

Component D is compound (8) in which a right-terminal group is —C≡N or —C≡C—C≡N. Preferred examples of component D include compounds (8-1) to (8-64). In the above compounds, $R^{14}$ is alkyl having 1 to 10 carbons or alkenyl having 2 to 10 carbons, and in the groups, at least one piece of —$CH_2$— may be replaced by —O—, and in the monovalent groups, at least one hydrogen may be replaced by fluorine; and $X^{12}$ is —C≡N or —C≡C—C≡N.

Formula 24

(8-1)
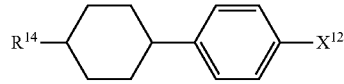

(8-2)
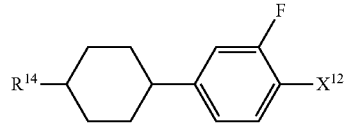

(8-3)
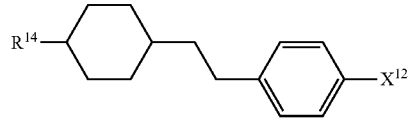

(8-4)
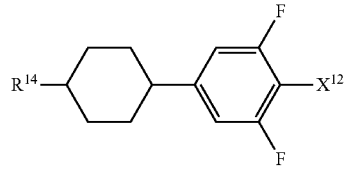

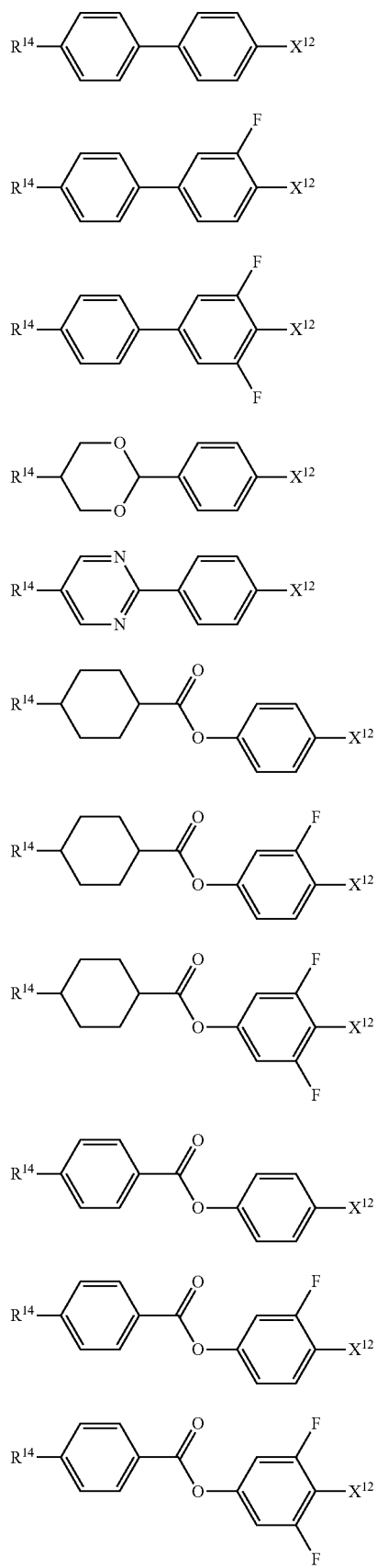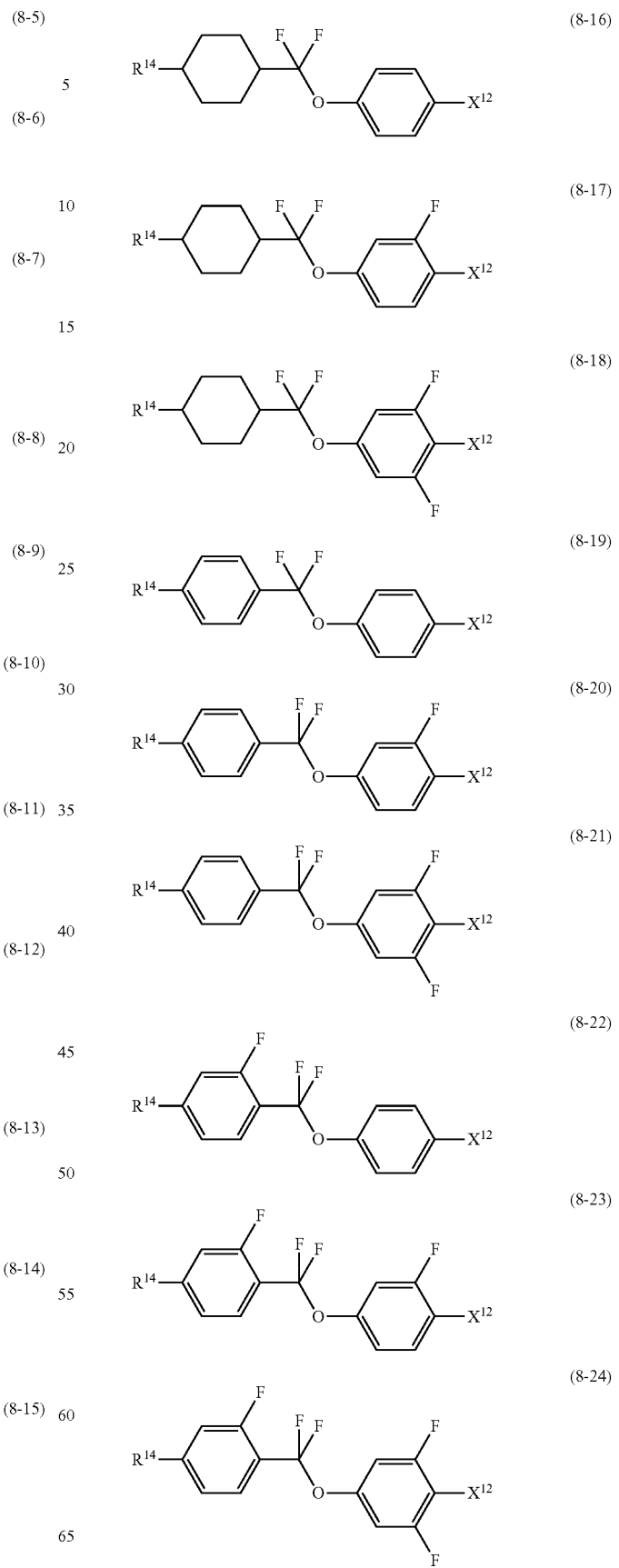

(8-25) 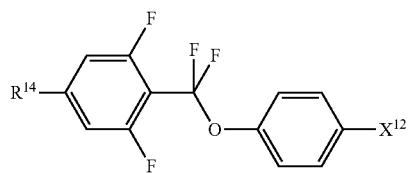
(8-26) 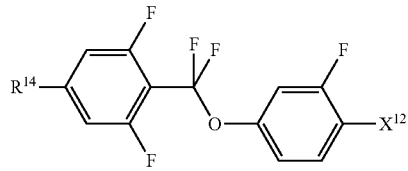
(8-27) 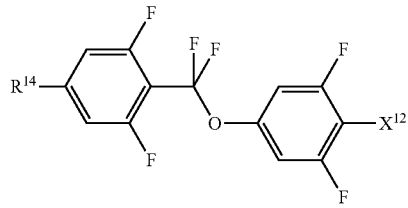
(8-28) 
(8-29) 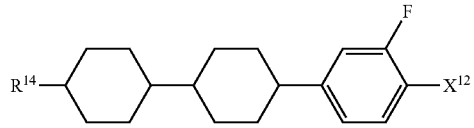
(8-30) 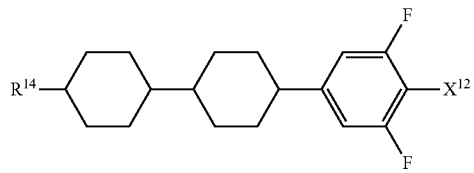
(8-31) 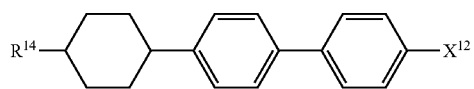
(8-32) 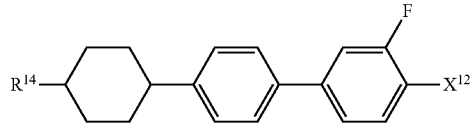
(8-33) 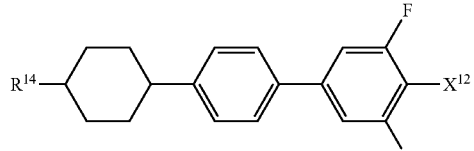
(8-34) 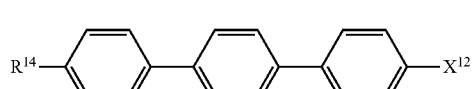
(8-35) 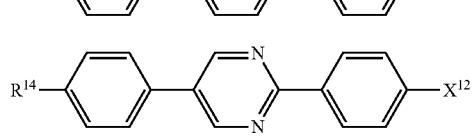
(8-36) 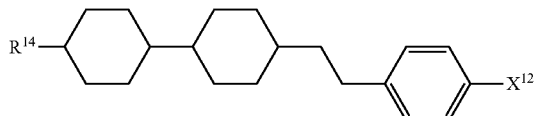
(8-37) 
(8-38) 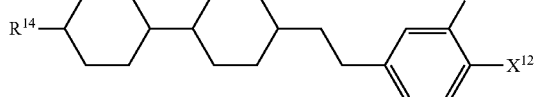
(8-39) 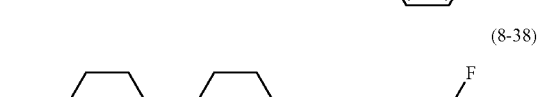
(8-40) 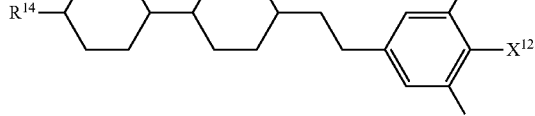
(8-41) 
Formula 25
(8-42) 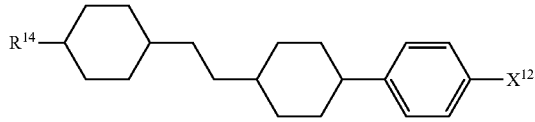
(8-43) 
(8-44) 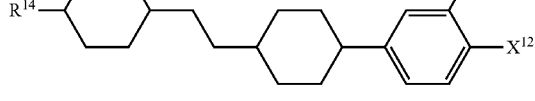

(8-45)
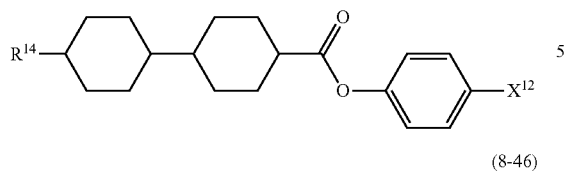
(8-46)
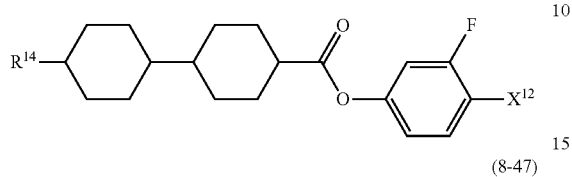
(8-47)
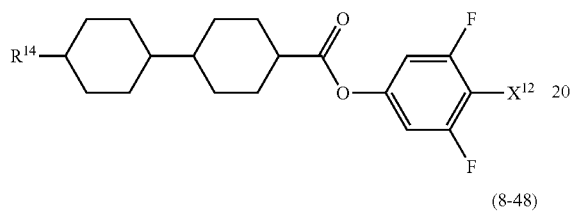
(8-48)
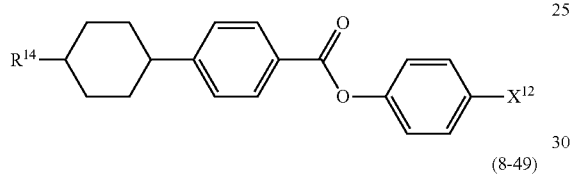
(8-49)
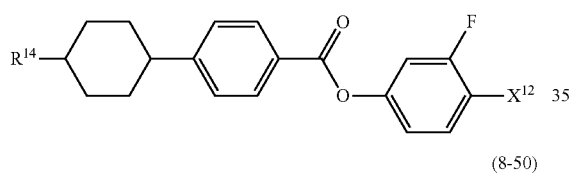
(8-50)
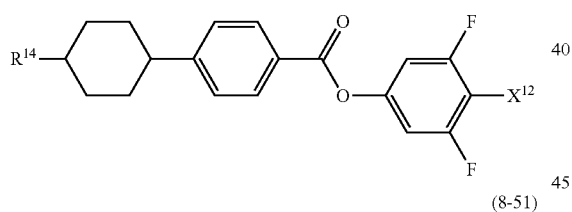
(8-51)
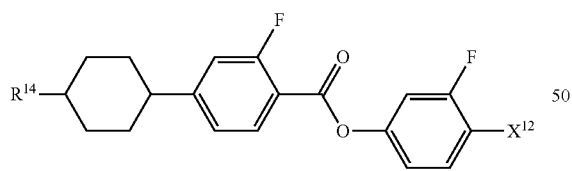
(8-52)
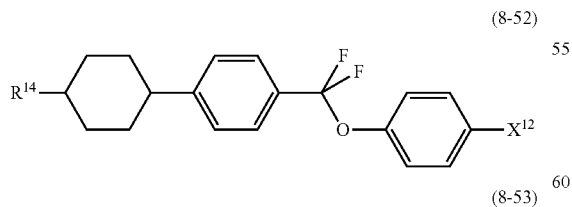
(8-53)
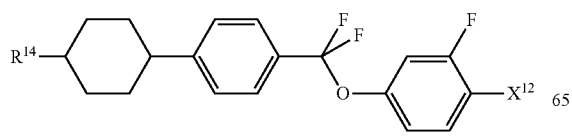
(8-54)
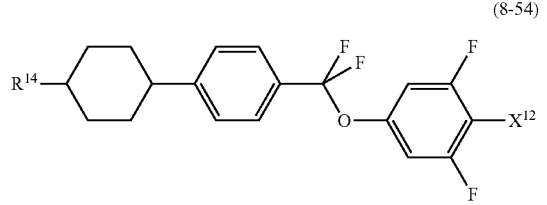
(8-55)
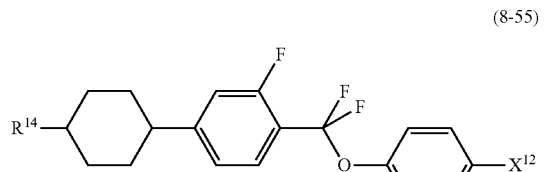
(8-56)
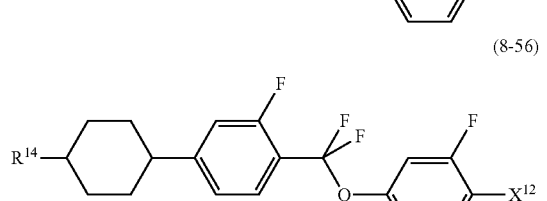
(8-57)
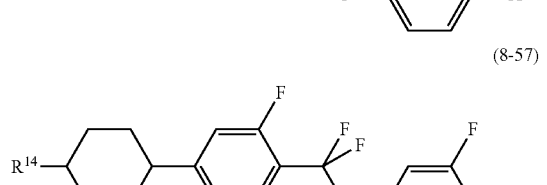
(8-58)
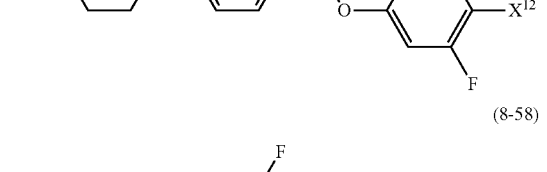
(8-59)
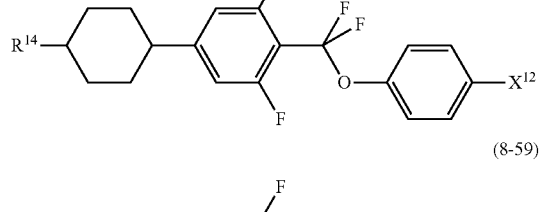
(8-60)
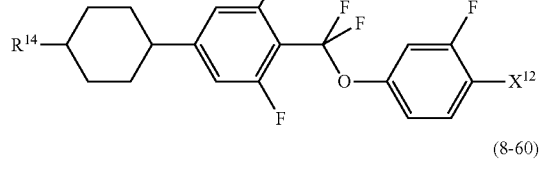
(8-61)
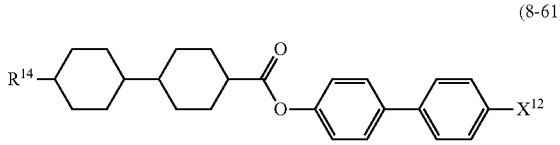

-continued (8-62)
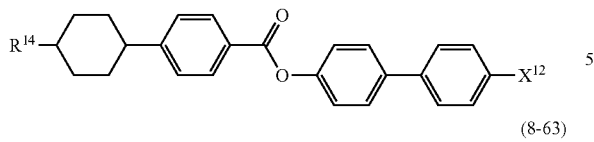

(8-63)
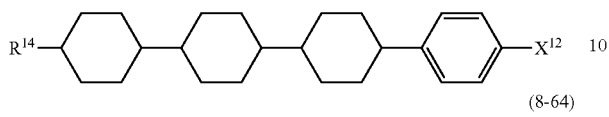

(8-64)
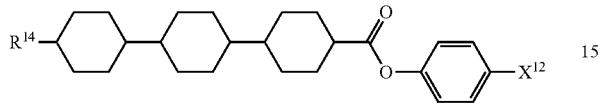

Component D has the positive dielectric anisotropy and a value thereof is large, and therefore is used when a composition for the TN mode or the like is prepared. Addition of component D can increase the dielectric anisotropy of the composition. Component D is effective in extending the temperature range of the liquid crystal phase, adjusting the viscosity or adjusting the optical anisotropy. Component D is also useful for adjustment of the voltage-transmittance curve of the device.

When a composition for the TN mode or the like is prepared, a content of component D is suitably in the range of about 1% by weight to about 99% by weight, preferably in the range of about 10% by weight to about 97% by weight, and further preferably in the range of about 40% by weight to about 95% by weight, based on the weight of the liquid crystal composition. When component D is added to a composition having the negative dielectric anisotropy, the content of component D is preferably about 30% by weight or less. The elastic constant of the composition can be adjusted and the voltage-transmittance curve of the device can be adjusted by adding component D thereto.

Component E includes compounds (9) to (15). The compounds have phenylene in which hydrogen in lateral positions are replaced by two pieces of halogen, such as 2,3-difluoro-1,4-phenylene. Preferred examples of component E include compounds (9-1) to (9-8), compounds (10-1) to (10-17), compound (11-1), compounds (12-1) to (12-3), compounds (13-1) to (13-11), compounds (14-1) to (14-3) and compounds (15-1) to (15-3). In the compounds, $R^{15}$ and $R^{16}$ are independently alkyl having 1 to 10 carbons or alkenyl having 2 to 10 carbons, and in the groups, at least one piece of —$CH_2$— may be replaced by —O—, and in the monovalent groups, at least one hydrogen may be replaced by fluorine; and $R^{17}$ is hydrogen, fluorine, alkyl having 1 to 10 carbons or alkenyl having 2 to 10 carbons, and in the alkyl and the alkenyl, at least one piece of —$CH_2$— may be replaced by —O—, and in the monovalent groups, at least one hydrogen may be replaced by fluorine.

Formula 26

(9-1)
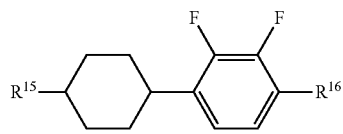

(9-2)
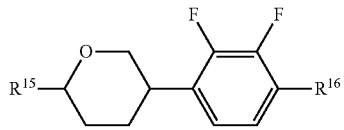

(9-3)
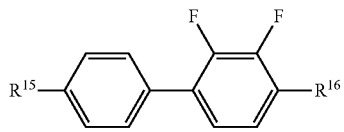

(9-4)
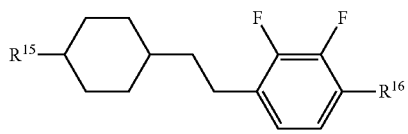

(9-5)
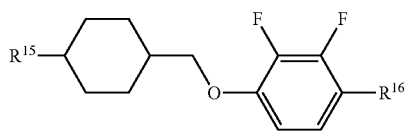

(9-6)
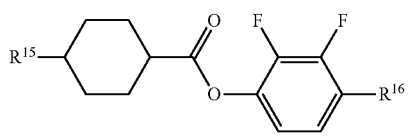

(9-7)
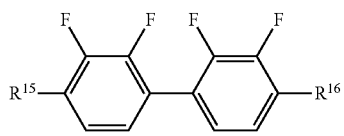

(9-8)
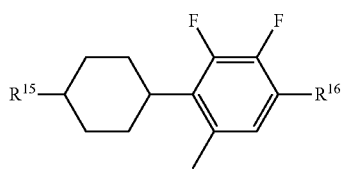

(10-1)
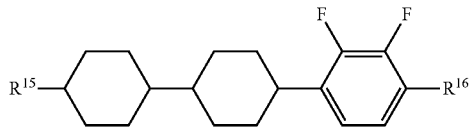

(10-2)
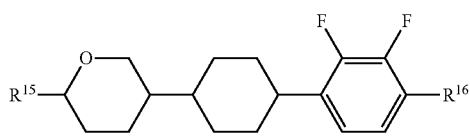

(10-3)
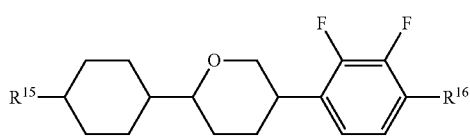

(10-4)
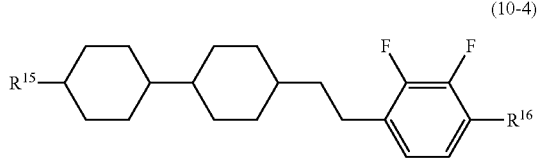

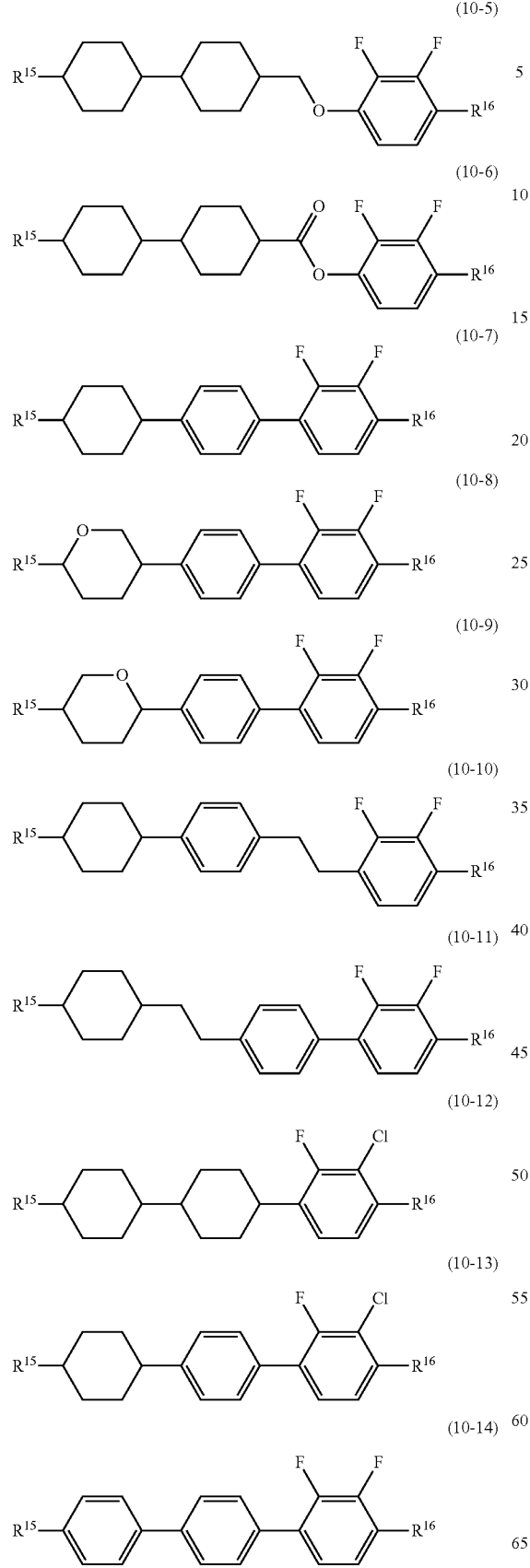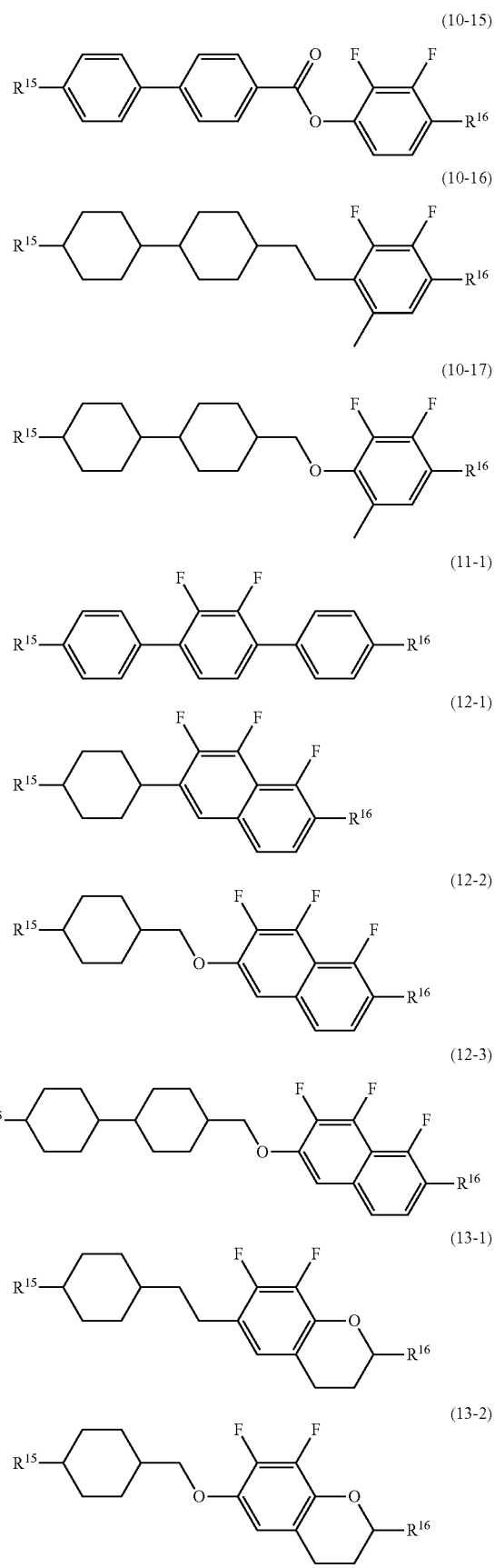

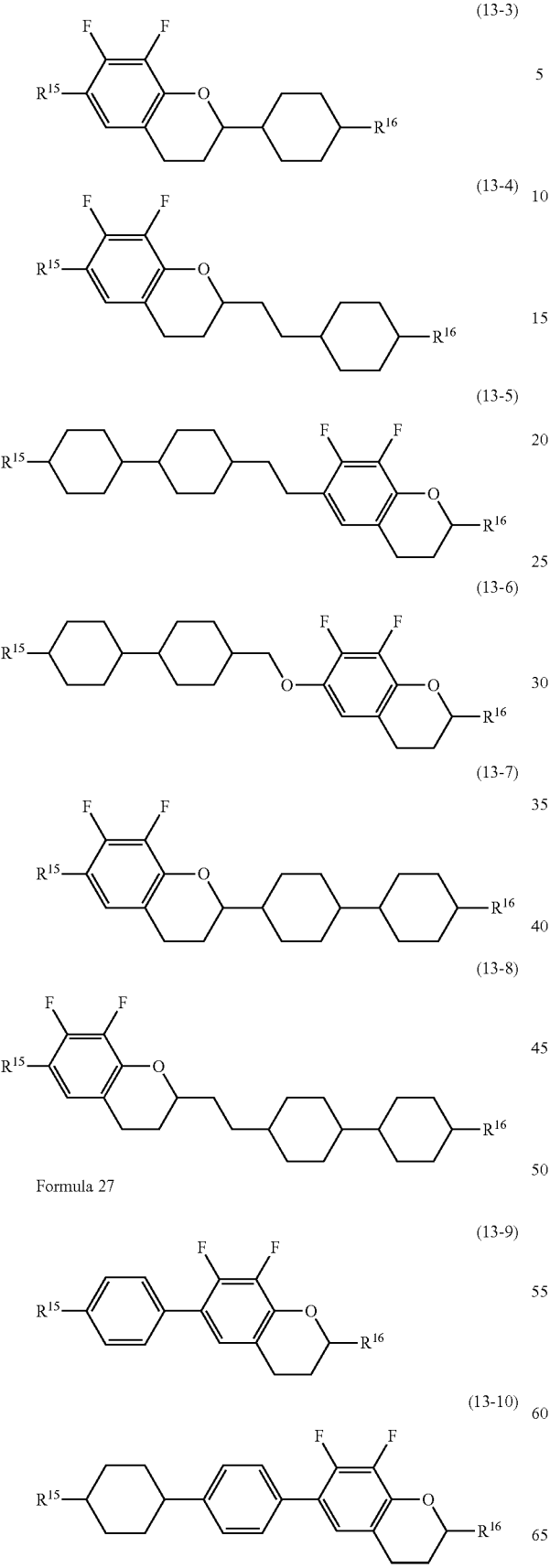
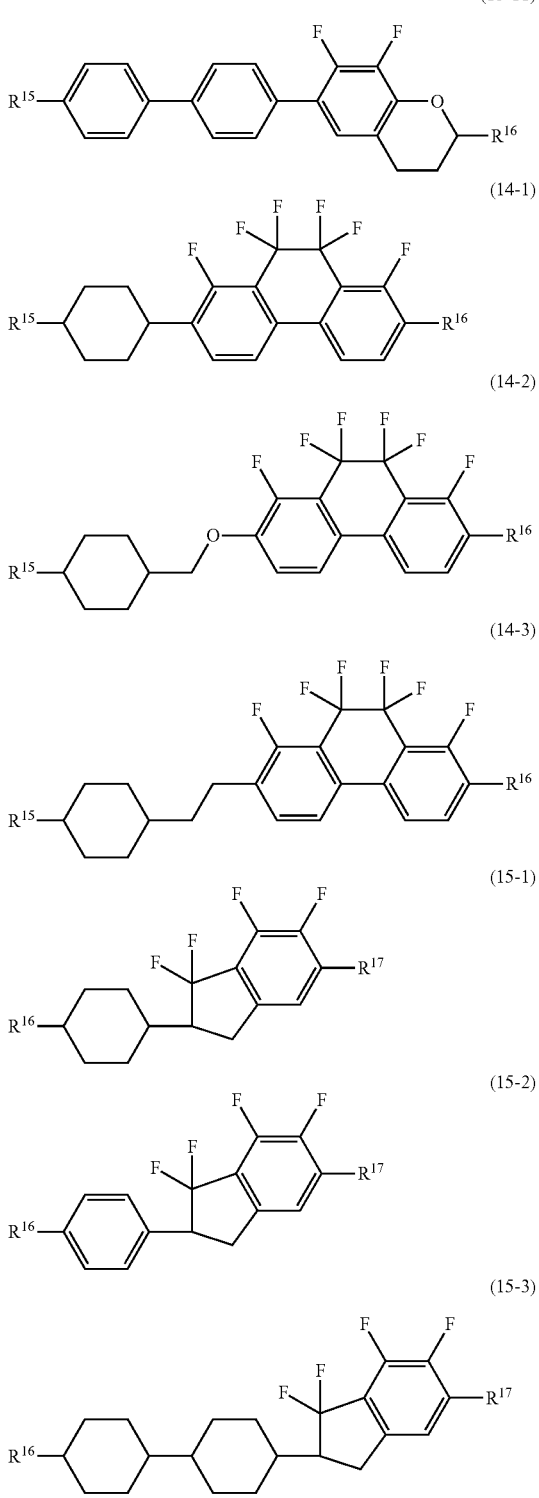

Component E has negatively large dielectric anisotropy. Component E is used when a composition for the IPS mode, the VA mode, the PSA mode or the like is prepared. As a content of component E is increased, the dielectric anisotropy of the composition is negatively increased, but the viscosity is increased. Thus, as long as a desired value of threshold voltage of the device is met, the content is preferably as small as possible. When the dielectric anisotropy at a degree of −5 is taken into account, the content is preferably about 40% by weight or more in order to allow a sufficient voltage driving.

Among types of component E, compound (9) is a bicyclic compound, and therefore is effective in decreasing the viscosity, adjusting the optical anisotropy or increasing the dielectric anisotropy. Compounds (10) and (11) are a tricyclic compound, and therefore are effective in increasing the maximum temperature, the optical anisotropy or the dielectric anisotropy. Compounds (12) to (15) are effective in increasing the dielectric anisotropy.

When a composition for the IPS mode, the VA mode or the PSA mode is prepared, the content of component E is preferably about 40% by weight or more, and further preferably in the range of about 50% by weight to about 95% by weight, based on the weight of the liquid crystal composition. When component E is added to a composition having the positive dielectric anisotropy, the content of component E is preferably about 30% by weight or less. The elastic constant of the composition can be adjusted and the voltage-transmittance curve of the device can be adjusted by adding component E thereto.

The liquid crystal composition satisfying at least one of physical properties such as the high stability to heat and light, the high maximum temperature, the low minimum temperature, the small viscosity, the suitable optical anisotropy, the large dielectric anisotropy, the large specific resistance and the suitable elastic constant can be prepared by suitably combining compound (1) with components B, C, D and E. The device including such a composition has the wide temperature range in which the device can be used, a short response time, the large voltage holding ratio, low threshold voltage, a large contrast ratio, a small flicker rate and a long service life.

If the device is used for a long period of time, a flicker may be occasionally generated on a display screen. The flicker rate (%) can be represented by a formula (|Illuminance when applying positive voltage−luminance when applying negative voltage|)/(average luminance)×100. In a device having the flicker rate in the range of about 0% to about 1%, the flicker is hard to generate on the display screen even if the device is used for a long period of time. The flicker is associated with image persistence, and is presumed to be generated according to a difference in electric potential between a positive frame and a negative frame in driving at alternating current. The composition containing compound (1) is also useful for reducing generation of the flicker.

3-2. Additive

A liquid crystal composition is prepared according to a publicly known method. For example, the component compounds are mixed and dissolved in each other by heating. According to an application, an additive may be added to the composition. Specific examples of the additive include a polymerizable compound, a polymerization initiator, a polymerization inhibitor, an optically active compound, an antioxidant, an ultraviolet light absorber, a light stabilizer, a heat stabilizer, a dye and an antifoaming agent. Such additives are well known to those skilled in the art, and described in literature.

In a liquid crystal display device having the polymer sustained alignment (PSA) mode, the composition contains a polymer. The polymerizable compound is added for the purpose of forming the polymer in the composition. The polymerizable compound is polymerized by irradiation with ultraviolet light while voltage is applied between electrodes to produce the polymer in the composition. A suitable pretilt is achieved by the method, and therefore the device in which a response time is shortened and the image persistence is improved is prepared.

Preferred examples of the polymerizable compound include acrylate, methacrylate, a vinyl compound, a vinyloxy compound, propenyl ether, an epoxy compound (oxirane, oxetane) and vinyl ketone. Further preferred examples include a compound having at least one acryloyloxy, and a compound having at least one methacryloyloxy. Still further preferred examples also include a compound having both acryloyloxy and methacryloyloxy.

Further preferred examples include compounds (M-1) to (M-18). In the above compounds, $R^{25}$ to $R^{31}$ are independently hydrogen or methyl; $R^{32}$, $R^{33}$ and $R^{34}$ are independently hydrogen or alkyl having 1 to 5 carbons, and at least one piece of $R^{32}$, $R^{33}$ and $R^{34}$ is alkyl having 1 to 5 carbons; s, v and x are independently 0 or 1; and t and u are independently an integer of 1 to 10. $L^{21}$ to $L^{26}$ are independently hydrogen or fluorine; and $L^{27}$ and $L^{28}$ are independently hydrogen, fluorine or methyl.

Formula 28

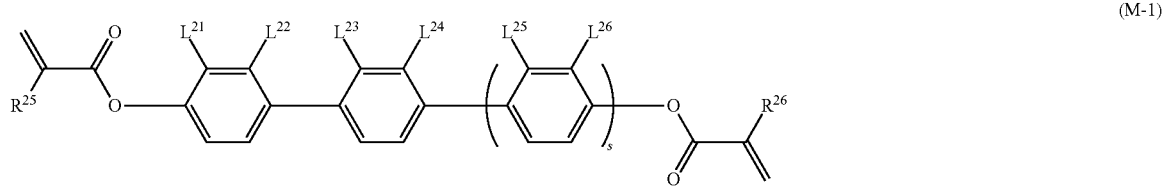

(M-1)

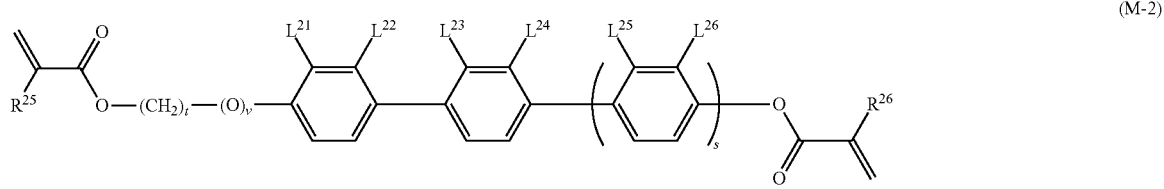

(M-2)

-continued
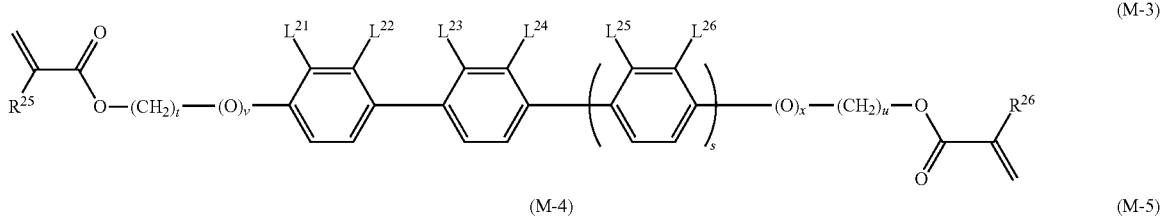
(M-3)
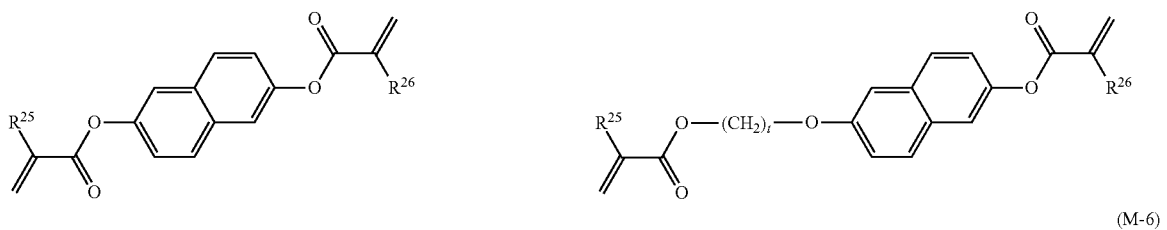
(M-4)                                       (M-5)
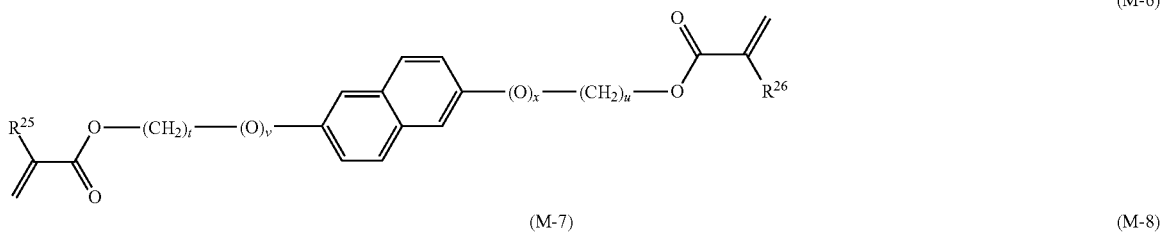
(M-6)
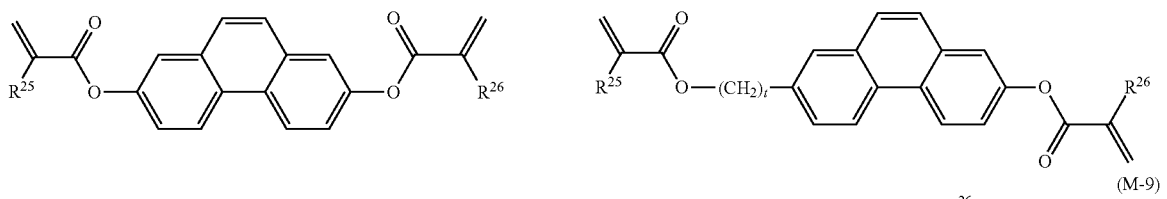
(M-7)                                       (M-8)
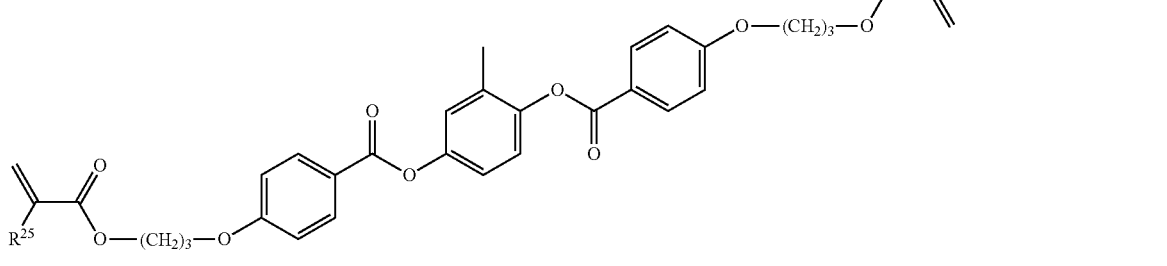
(M-9)
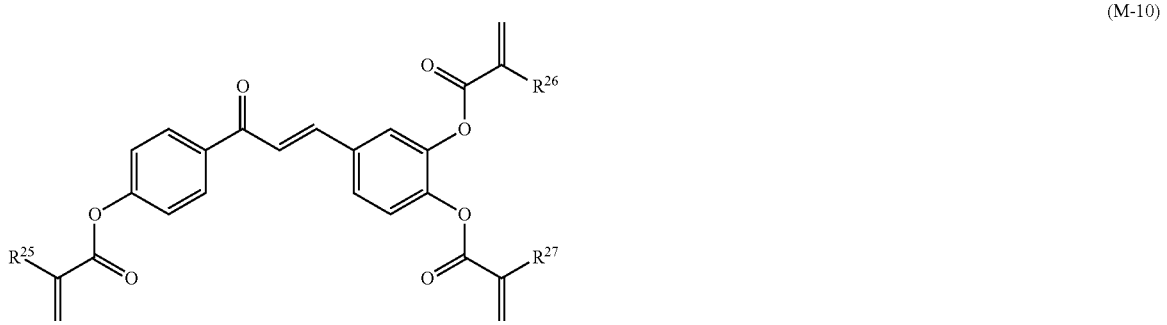
(M-10)
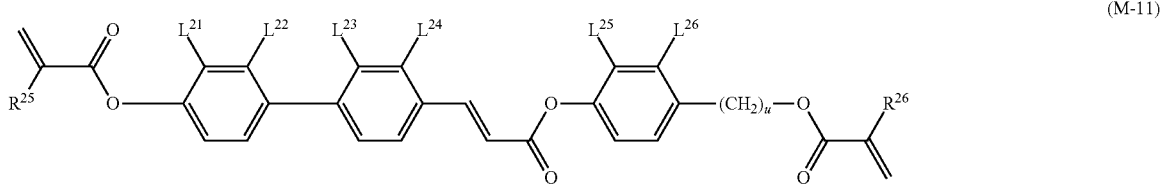
(M-11)

-continued

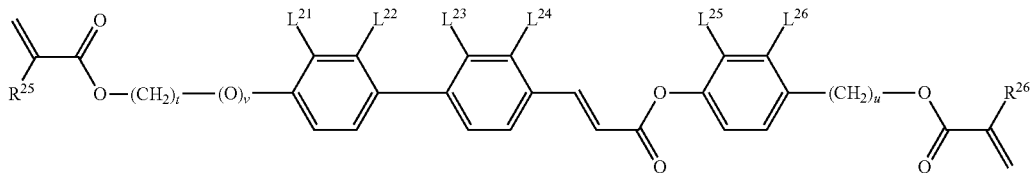
(M-12)

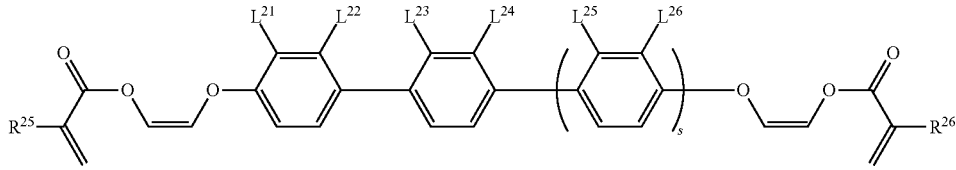
(M-13)

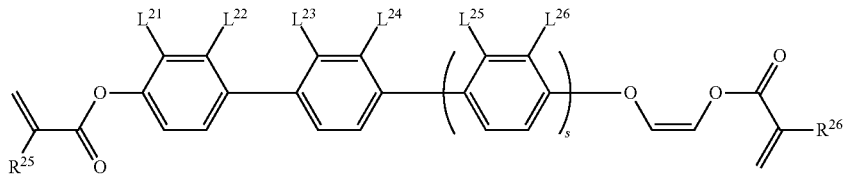
(M-14)

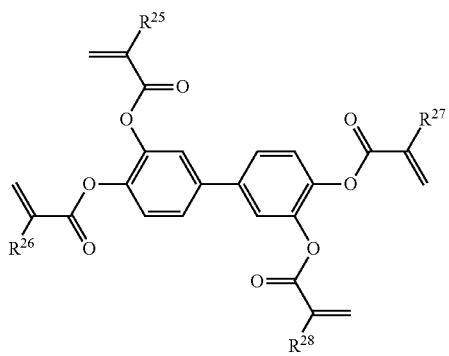
(M-15)

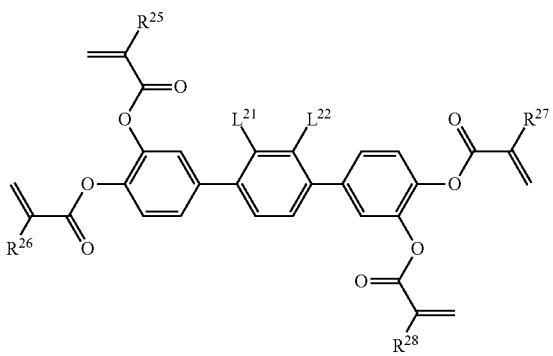
(M-16)

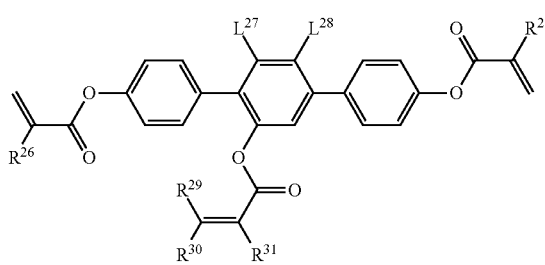
(M-17)

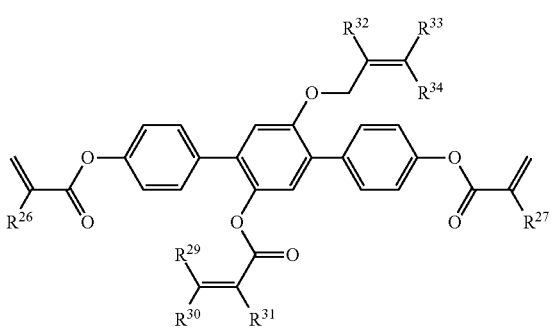
(M-18)

The polymerizable compound can be rapidly polymerized by adding the polymerization initiator. An amount of a remaining polymerizable compound can be decreased by optimizing a reaction temperature. Specific examples of a photoradical polymerization initiator include TPO, 1173 and 4265 from Darocur series of BASF SE, and 184, 369, 500, 651, 784, 819, 907, 1300, 1700, 1800, 1850 and 2959 from Irgacure series.

Additional examples of the photoradical polymerization initiator include 4-methoxyphenyl-2,4-bis(trichloromethyl) triazine, 2-(4-butoxystyryl)-5-trichloromethyl-1,3,4-oxadiazole, 9-phenylacridine, 9,10-benzphenazine, a benzophenone-Michler's ketone mixture, a hexaarylbiimidazole-mercaptobenzimidazole mixture, 1-(4-isopropylphenyl)-2-hydroxy-2-methylpropane-1-one, benzyl dimethyl ketal, 2-methyl-1-[4-(methylthio)phenyl]-2-morpholinopropane-1-one, a mixture of 2,4-diethylxanthone and methyl p-dimethylaminobenzoate and a mixture of benzophenone and methyltriethanolamine.

After the photoradical polymerization initiator is added to the liquid crystal composition, polymerization can be performed by irradiation with ultraviolet light while an electric field is applied. However, an unreacted polymerization initiator or a decomposition product of the polymerization initiator may cause poor display such as the image persistence in the device. In order to prevent such an event, photopolymerization may be performed without addition of the polymerization initiator. A preferred wavelength of irradiation light is in the range of approximately 150 nanometers to approximately 500 nanometers. A further preferred wavelength is in the range of about 250 nanometers to about 450 nanometers, and a most preferred wavelength is in the range of about 300 nanometers to about 400 nanometers.

Upon storing the polymerizable compound, the polymerization inhibitor may be added thereto for preventing polymerization. The polymerizable compound is ordinarily added to the composition without removing the polymerization inhibitor. Specific examples of the polymerization inhibitor include hydroquinone, a hydroquinone derivative such as methylhydroquinone, 4-t-butyl-catechol, 4-methoxyphenol and phenothiazine.

The optically active compound is effective in inducing a helical structure in liquid crystal molecules to give a required twist angle to prevent a reverse twist. A helical pitch can be adjusted by adding the optically active compound thereto. Two or more optically active compounds may be added for the purpose of adjusting temperature dependence of the helical pitch. Preferred examples of the optically active compound include compounds (Op-1) to (Op-18) described below. In compound (Op-18), ring J is 1,4-cyclohexylene or 1,4-phenylene, and R28 is alkyl having 1 to 10 carbons. Asterisk mark "*" represents asymmetrical carbon.

Formula 29

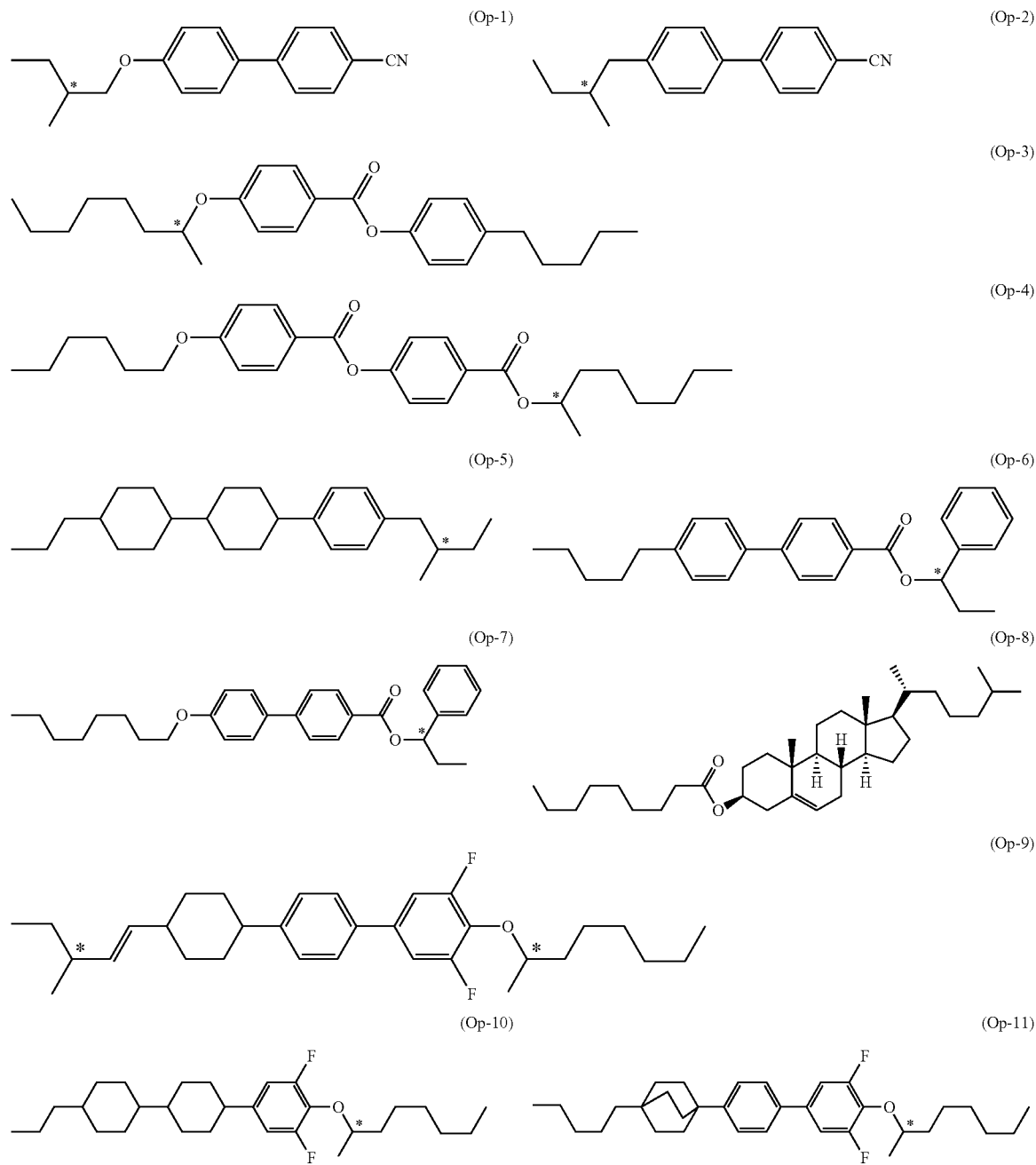

-continued

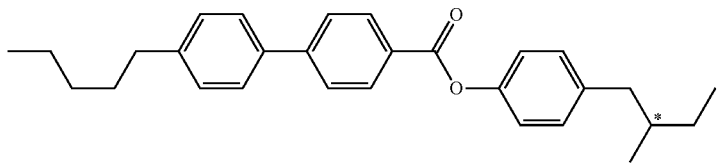
(Op-12)

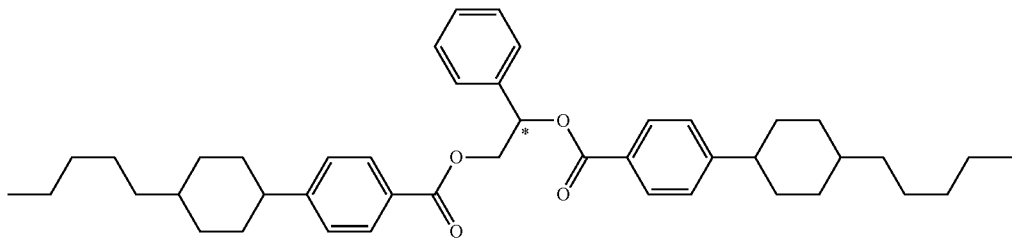
(Op-13)

(Op-14) (Op-15)

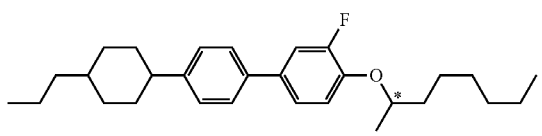 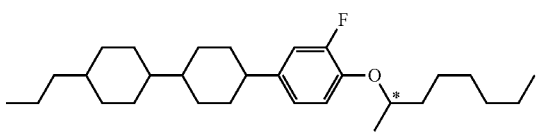

(Op-16) (Op-17)

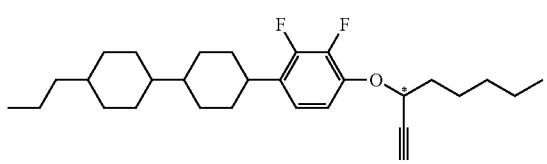 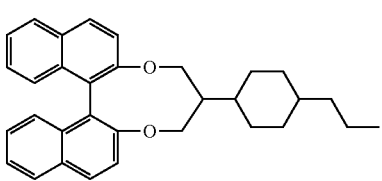

(Op-18)

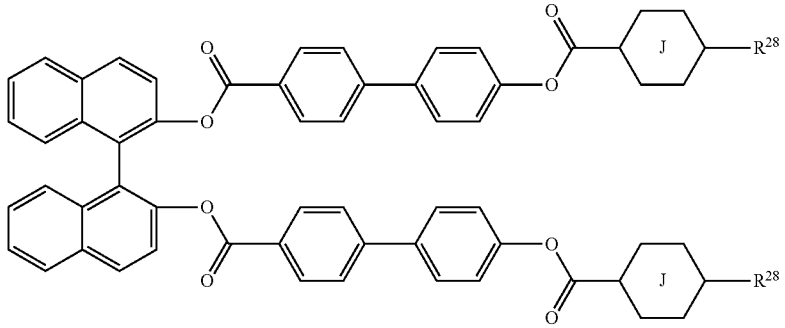

The antioxidant is effective for maintaining a large voltage holding ratio. Specific examples of a preferred antioxidant include compounds (AO-1) and (AO-2) described below; Irganox 415, Irganox 565, Irganox 1010, Irganox 1035, Irganox 3114 and Irganox 1098 (tradenames; BASF SE). The ultraviolet light absorber is effective for preventing a decrease of the maximum temperature. Specific examples of a preferred ultraviolet light absorbent include a benzophenone derivative, a benzoate derivative, and a triazole derivative, and specific examples thereof include compounds (AO-3) and (AO-4) described below; Tinuvin 329, Tinuvin P, Tinuvin 326, Tinuvin 234, Tinuvin 213, Tinuvin 400, Tinuvin 328 and Tinuvin 99-2 (tradenames; BASF SE); and 1,4-diazabicyclo[2.2.2]octane (DABCO).

The light stabilizer such as an amine having steric hindrance is preferred for maintaining the large voltage holding ratio. Specific examples of a preferred light stabilizer include compounds (AO-5), (AO-6) and (AO-7) described below; Tinuvin 144, Tinuvin 765, Tinuvin 770DF (tradenames; BASF SE); and LA-77Y and LA-77G (tradenames; ADEKA). The heat stabilizer is also effective for maintaining the large voltage holding ratio, and preferred examples thereof include Irgafos 168 (tradename; BASF SE). A dichroic dye such as an azo dye or an anthraquinone dye is added to the composition to be adapted for a device having a guest host (GH) mode. The antifoaming agent is effective for preventing foam formation. Specific examples of a preferred antifoaming agent include dimethyl silicone oil and methylphenyl silicone oil.

Formula 30

(AO-1)

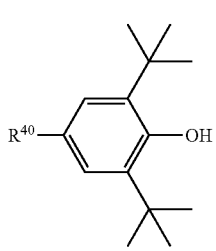

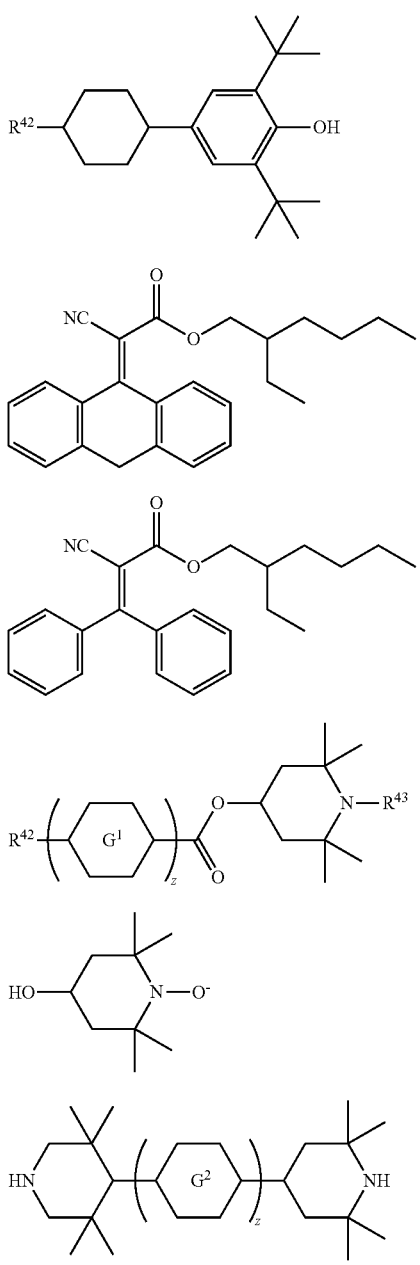

In compound (AO-1), $R^{40}$ is alkyl having 1 to 20 carbons, alkoxy having 1 to 20 carbons, —COOR$^{41}$ or —CH$_2$CH$_2$COOR$^{41}$, where, $R^{41}$ is alkyl having 1 to 20 carbons. In compounds (AO-2) and (AO-5), $R^{42}$ is alkyl having 1 to 20 carbons. In compound (AO-5), $R^{43}$ is hydrogen, methyl or O. (oxygen radical); ring $G^1$ is 1,4-cyclohexylene or 1,4-phenylene; in compound (AO-7); ring $G^2$ is 1,4-cyclohexylene, 1,4-phenylene, or 1,4-phenylene in which at least one hydrogen is replaced by fluorine; and in compounds (AO-5) and (AO-7), z is 1, 2 or 3.

4. Liquid Crystal Display Device

The liquid crystal composition can be used in the liquid crystal device having the operating mode such as the PC mode, the TN mode, the STN mode, the OCB mode and the PSA mode, and driven by an active matrix mode. The composition can also be used in the liquid crystal display device having the operating mode such as the PC mode, the TN mode, the STN mode, the OCB mode, the VA mode and the IPS mode, and driven by a passive matrix mode. The devices can be applied to any of a reflective type, a transmissive type and a transflective type.

The composition is also suitable for a nematic curvilinear aligned phase (NCAP) device, and the composition is microencapsulated herein. The composition can also be used for a polymer dispersed liquid crystal display device (PDLCD) and a polymer network liquid crystal display device (PN-LCD). In the compositions, a large amount of the polymerizable compound is added. Meanwhile, when an adding amount of the polymerizable compound is 10% by weight or less based on the weight of the liquid crystal composition, the liquid crystal display device having the PSA mode is made. A preferred proportion is in the range of about 0.1% by weight to about 2% by weight. A further preferred proportion is in the range of about 0.2% by weight to about 1.0% by weight.

EXAMPLES

The invention will be described in greater detail by way of Examples (including Synthesis Examples and Use Examples). However, the invention is not limited by the Examples. The invention includes a mixture of a composition in Use Example 1 and a composition in Use Example 2. The invention also contains a composition prepared by mixing at least two of compositions in Use Examples 1 to 11.

1. Example of Compound (1)

Compound (1) was prepared according to procedures described below. The thus prepared compound was identified by methods such as an NMR analysis. Physical properties of the compound and the composition and characteristics of a device were measured by methods described below.

NMR analysis: For measurement, DRX-500 made by Bruker BioSpin Corporation was used. In $^1$H-NMR measurement, a sample was dissolved in a deuterated solvent such as CDCl$_3$, and measurement was carried out under conditions of room temperature, 500 MHz and 16 times of accumulation. Tetramethylsilane was used as an internal standard. In $^{19}$F-NMR measurement, CFCl$_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-2010 Gas Chromatograph made by Shimadzu Corporation was used. As a column, a capillary column DB-1 (length 60 m, bore 0.25 mm, film thickness 0.25 μm) made by Agilent Technologies, Inc. was used. As a carrier gas, helium (1 mL/minute) was used. A temperature of a sample vaporizing chamber was set to 300° C., and a temperature of a detector (FID) was set to 300° C. A sample was dissolved in acetone and prepared to be a 1 weight % solution, and then 1 microliter of the solution obtained was injected into the sample vaporizing chamber. As a recorder, GC Solution System made by Shimadzu Corporation or the like was used.

HPLC Analysis: For measurement, Prominence (LC-20AD; SPD-20A) made by Shimadzu Corporation was used. As a column, YMC-Pack ODS-A (length 150 mm, bore 4.6 mm, particle diameter 5 μm) made by YMC Co., Ltd. was used. As an eluate, acetonitrile and water were appropriately mixed and used. As a detector, a UV detector, an RI detector, a CORONA detector or the like was appropriately used. When the UV detector was used, a detection wavelength was set at 254 nanometers. A sample was dissolved in acetonitrile and prepared to be a 0.1 weight % solution, and then 1 microliter of the solution was injected into a sample chamber. As a recorder, C-R7Aplus made by Shimadzu Corporation was used.

Ultraviolet-Visible Spectrophotometry: For measurement, PharmaSpec UV-1700 made by Shimadzu Corporation was used. A detection wavelength was adjusted in the range of 190 nanometers to 700 nanometers. A sample was dissolved in acetonitrile, and prepared to be a solution of 0.01 mmol/L, and measurement was carried out by putting the solution in a quartz cell (optical path length 1 cm).

Sample for measurement: Upon measuring phase structure and a transition temperature (a clearing point, a melting point, a polymerization starting temperature or the like), a compound itself was used as a sample. Upon measuring physical properties such as a maximum temperature of a nematic phase, viscosity, optical anisotropy and dielectric anisotropy, a mixture of a compound and a base liquid crystal was used as a sample.

When a sample obtained by mixing the compound with the base liquid crystal was used, an extrapolated value was calculated by the following equation, and the value was described. (Extrapolated value)={100×(measured value of a sample)−(% by weight of a base liquid crystal)×(measured value of a base liquid crystal)}/(% by weight of a compound).

Base liquid crystal (A): When the dielectric anisotropy of the compound was zero or positive, base liquid crystal (A) described below was used. A proportion of each component was expressed in terms of % by weight.

Formula 31

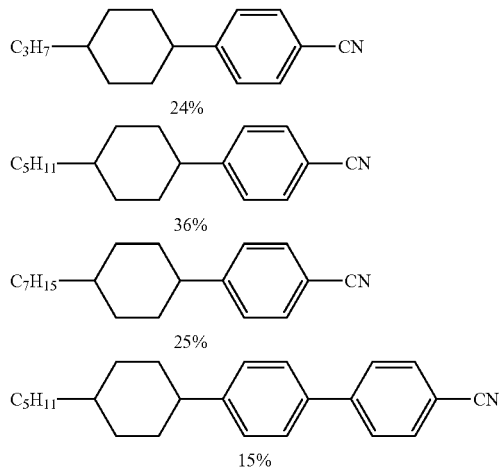

A ratio of the compound to base liquid crustal (A) was set to 15% by weight: 85% by weight. When crystals (or a smectic phase) precipitated at the ratio thereof at 25° C., a ratio of the compound to the base liquid crystal was changed step by step in the order of (10% by weight:90% by weight), (5% by weight:95% by weight) and (1% by weight:99% by weight), and a sample was measured at a ratio when no crystals (or no smectic phase) precipitated at 25° C. In addition, unless otherwise noted, the ratio of the compound to base liquid crystal (A) was 15% by weight:85% by weight.

Measuring method: Measurement of physical properties was carried out by the methods described below. Most of the methods are described in the Standard of Japan Electronics and Information Technology Industries Association (hereinafter, abbreviated as JEITA) discussed and established in JEITA (JEITA ED-2521B). A modification of the methods was also used. No thin film transistor (TFT) was attached to a TN device used for measurement.

(1) Phase structure: A sample was placed on a hot plate of a melting point apparatus (FP-52 Hot Stage made by Mettler-Toledo International Inc.) equipped with a polarizing microscope. A state of phase and a change thereof were observed with the polarizing microscope while the sample was heated at a rate of 3° C. per minute, and a kind of the phase was specified.

(2) Transition temperature (° C.): For measurement, a differential scanning calorimeter, Diamond DSC System, made by PerkinElmer, Inc., or a high sensitivity differential scanning calorimeter, X-DSC7000, made by SII NanoTechnology Inc. was used. A sample was heated and then cooled at a rate of 3° C. per minute, and a starting point of an endothermic peak or an exothermic peak caused by a phase change of the sample was determined by extrapolation, and thus a transition temperature was determined. A polymerization starting temperature and a melting point of a compound were also measured using the apparatus. Temperature at which a compound undergoes transition from a solid to a liquid crystal phase such as the smectic phase and the nematic phase may be occasionally abbreviated as "minimum temperature of the liquid crystal phase." Temperature at which the compound undergoes transition from the liquid crystal phase to liquid may be occasionally abbreviated as "clearing point."

The crystals were expressed as C. When kinds of the crystals were distinguishable, each of the crystals was expressed as $C_1$ or $C_2$. The smectic phase and the nematic phase were expressed as S and N, respectively. When a smectic A phase, a smectic B phase, a smectic C phase or a smectic F phase was distinguishable among the smectic phases, the phases were expressed as $S_A$, $S_B$, $S_C$ or $S_F$, respectively. A liquid (isotropic) was expressed as I. A transition temperature was expressed as "C 50.0 N 100.0 I," for example. The expression indicates that a transition temperature from the crystals to the nematic phase is 50.0° C., and a transition temperature from the nematic phase to the liquid is 100.0° C.

Compatibility at a low temperature: Samples in which the base liquid crystal and the compound were mixed for the compound to be 20% by weight, 15% by weight, 10% by weight, 5% by weight, 3% by weight and 1% by weight were prepared, and placed in glass vials. After the glass vials were kept in freezers at −10° C. or −20° C. for a predetermined period of time, whether or not crystals or a smectic phase precipitated was observed.

(4) Maximum temperature of nematic phase ($T_{NI}$ or NI; ° C.): A sample was placed on a hot plate of a melting point apparatus equipped with a polarizing microscope, and was heated at a rate of 1° C. per minute. Temperature when part of the sample began to change from a nematic phase to an isotropic liquid was measured. When the sample was a mixture of compound (1) and the base liquid crystal, the maximum temperature was expressed as a symbol $T_{NI}$. When the sample was a mixture of compound (1) and a compound such as component B, compound C and compound D, the maximum temperature was expressed using a symbol NI. A maximum temperature of the nematic phase may be occasionally abbreviated as "maximum temperature."

(5) Minimum temperature of nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample was maintained in the nematic phase at −20° C. and changed to crystals or a smectic phase at −30° C., $T_c$ of the sample was expressed as Tc<−20° C. A minimum temperature of the nematic phase may be occasionally abbreviated as "minimum temperature."

(6) Viscosity (bulk viscosity; η; measured at 20° C.; mPa·s): A cone-plate (E type) rotational viscometer made by Tokyo Keiki Inc. was used for measurement.

(7) Viscosity (rotational viscosity; γ1; measured at 25° C.; mPa·s): Measurement was carried out according to the method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. A voltage was applied stepwise to the device in the range of 16 V to 19.5 V at an increment of 0.5V. After a period of 0.2 second with no voltage application, a voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values according to calculating equation (8) on page 40 of the paper presented by M. Imai et al. A value of dielectric anisotropy required for the calculation was determined using the device by which the rotational viscosity was measured and by a method described below.

(8) Optical anisotropy (refractive index anisotropy; measured at 25° C.; Δn): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of the optical anisotropy (Δn) was calculated from an equation: Δn=n∥−n⊥.

(9) Dielectric anisotropy (Δs; measured at 25° C.): A sample was put into a TN device in which a distance (cell gap) between two glass substrates was 9 micrometers and a twist angle was 80 degrees. Sine waves (10 V, 1 kHz) were applied to the device, and after 2 seconds, a dielectric constant (ε∥) in a major axis direction of the liquid crystal molecules was measured. Sine waves (0.5V, 1 kHz) were applied to the device, and after 2 seconds, a dielectric constant (ε⊥) in a minor axis direction of the liquid crystal molecules was measured. A value of dielectric anisotropy was calculated from an equation: Δ=ε∥−ε⊥.

(10) Elastic constant (K; measured at 25° C.; pN): For measurement, HP4284A LCR Meter made by Yokogawa-Hewlett-Packard Co. was used. A sample was put in a horizontal alignment device in which a distance (cell gap) between two glass substrates was 20 micrometers. An electric charge of 0 V to 20 V was applied to the device, and electrostatic capacity (C) and an applied voltage (V) were measured. The measured values were fitted to equation (2.98) and equation (2.101) on page 75 of "Liquid Crystal Device Handbook" (Ekisho Debaisu Handobukku, in Japanese; Nikkan Kogyo Shimbun, Ltd.), and values of $K_{11}$ and $K_{33}$ were obtained from equation (2.99). Next, $K_{22}$ was calculated using the previously determined values of $K_{11}$ and $K_{33}$ in equation (3.18) on page 171. Elastic constant K is expressed using a mean value of the thus determined $K_{11}$, $K_{22}$ and $K_{33}$.

(11) Threshold voltage (Vth; measured at 25° C.; V): For measurement, an LCD-5100 luminance meter made by Otsuka Electronics Co., Ltd. was used. A light source was a halogen lamp. A sample was put in a normally white mode TN device in which a distance (cell gap) between two glass substrates was 0.45/Δn (μm) and a twist angle was 80 degrees. A voltage (32 Hz, rectangular waves) to be applied to the device was stepwise increased from 0 V to 10 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage was expressed in terms of a voltage at 90% transmittance.

(12) Change in heating current values (dH; measured at 2.5° C.; μA) Then, dH was determined according to the following formula (A):

$$dH(\mu A)=Iha(\mu A)-Ihb(\mu A) \tag{A}$$

where, Iha in formula (A) denotes a value of the current passing through the liquid crystal composition after heating, and Ihb denotes a value of the current passing through the liquid crystal composition before heating. The liquid crystal composition was heated at 150° C. for 1 hour in atmospheric air. A TN device used for the measurement was prepared by facing two glass substrates obliquely vapor-deposited with silicon dioxide, in which a distance (cell gap) between the two glass substrates was 10 μm and an electrode area was 1 cm². A current value was determined by applying a rectangular wave of 3 V and 32 Hz to the device at 25° C.

(13) Voltage holding ratio (VHR-1; measured at 25° C.; %): A TN device used for measurement had a polyimide alignment film, and a distance (cell gap) between two glass substrates was 5 micrometers. A sample was put in the device, and the device was sealed with an ultraviolet-curable adhesive. The device was charged by applying a pulse voltage (60 microseconds at 5 V) at 25° C. A decaying voltage was measured for 16.7 milliseconds with a high-speed voltmeter, and area A between a voltage curve and a horizontal axis in a unit cycle was determined. Area B was an area without decay. A voltage holding ratio was expressed in terms of a percentage of area A to area B.

(14) Voltage holding ratio (VHR-2; measured at 80° C.; %): A voltage holding ratio was measured according to the method described above except that a sample was measured at 80° C. in place of 25° C. The thus obtained value was expressed in terms of VHR-2.

(15) Specific resistance (ρ; measured at 25° C.; Ωcm): Into a vessel equipped with electrodes, 1.0 milliliter of a sample was injected. A direct current voltage (10 V) was applied to the vessel, and a direct current after 10 seconds was measured. Specific resistance was calculated from the following equation: (specific resistance)={(voltage)×(electric capacity of a vessel)}/{(direct current)×(dielectric constant of vacuum)}.

(16) Response time (T; measured at 25° C.; ms): For measurement, an LCD-5100 luminance meter made by Otsuka Electronics Co., Ltd. was used. A light source was a halogen lamp. A light source was a halogen lamp. A low-pass filter was set to 5 kHz. A sample was put in a normally white mode TN device in which a distance (cell gap) between two glass substrates was 5.0 micrometers and a twist angle was 80 degrees. Rectangular waves (60 Hz, 5 V, 0.5 second) were applied to the device. On the occasion, the device was irradiated with light from a direction perpendicular to the device, and an amount of light transmitted through the device was measured. The maximum amount of light corresponds to 100% transmittance and the minimum amount of light corresponds to 0% transmittance. A rise time (τr; ms) was expressed in terms of time required for a change from 90% transmittance to 10% transmittance. A fall time (τf; ms) was expressed in terms of time required for a change from 10% transmittance to 90% transmittance. A response time was represented by a sum of the rise time and the fall time thus obtained.

(17) Flicker rate (measured at 25° C.; %): For measurement, 3298F Multimedia Display Tester made by Yokogawa Electric Corporation was used. A light source was LED. A sample was put in a normally black mode FFS device in which a distance (cell gap) between two glass substrates was 3.5 μm and a rubbing direction was anti-parallel. The device was sealed with an ultraviolet-curable adhesive. Voltage was applied to the device, and a voltage having a maximum amount of light transmitted through the device was measured. A flicker rate displayed thereon was read by bringing a sensor unit close to the device while voltage was applied to the device.

Solmix A-11 (trade name) of a raw material is a mixture of ethanol (85.5%), methanol (13.4%) and isopropanol (1.1%), and was purchased from Japan Alcohol Trading Co., Ltd.

Synthesis Example 1

Synthesis of Compound (No. 1-2-57)

Formula 32

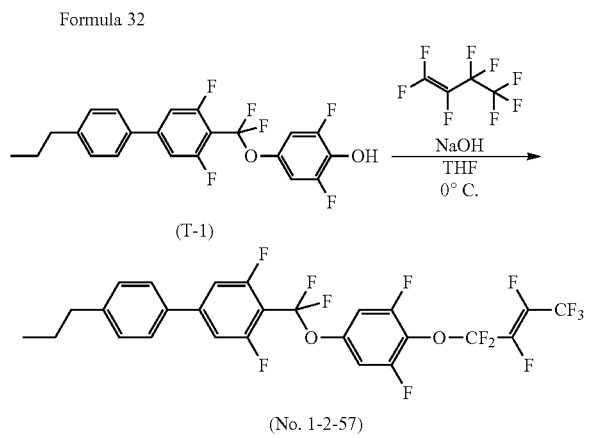

Compound (T-1) (3.00 g, 7.04 mmol) prepared according to the method described in JP 2007-277127 A and sodium hydroxide (0.34 g, 8.16 mmol) were dissolved in tetrahydrofuran, and subjected to bubbling with perfluoro-1-butene (1.42 g, 7.11 mmol) at 0° C., and the resulting mixture was stirred for 2 hours. The resulting reaction liquid was poured into water and subjected to extraction with toluene. An organic layer was washed with water and saturated brine, and then dried over magnesium sulfate, and a solvent was distilled off by an evaporator. A residue was purified by silica gel chromatography and recrystallization to obtain compound (No. 1-2-57) (yield: 17%).

$^1$H-NMR (CDCl$_3$) δ 7.50-7.48 (m, 2H), 7.31-7.29 (m, 2H), 7.23-7.21 (m, 2H), 7.04-7.02 (m, 2H), 2.66-2.63 (m, 2H), 1.68 (sex, 2H), 0.97 (t, 3H).

$^{19}$F-NMR (CDCl$_3$) δ−62.17 (t, 2F), −69.11 (dd, 3F), −73.12--73.24 (m, 2F), −111.17 (dt, 2F), −122.37--122.43 (m, 2F), −156.96--157.44 (m, 1F) and −159.83--160.28 (m, 1F).

Physical properties of compound (No. 1-2-57) were as described below. Phase transition temperature: C 57.2 S$_A$ 57.2 I; maximum temperature (NI)=33.7° C.; dielectric anisotropy (Δε)=26.1; optical anisotropy (Δn)=0.130; viscosity (η)=47.7 mPa·s.

Synthesis Example 2

Synthesis of Compound (No. 1-2-5)

Formula 33

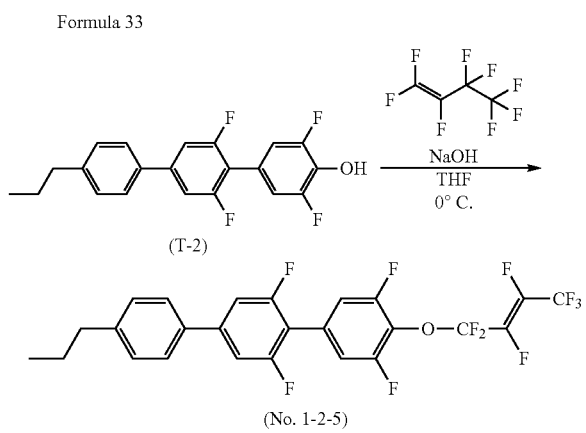

Compound (No. 1-2-5) was obtained (yield: 15%) by using compound (T-2) (4.00 g, 11.68 mmol) prepared according to the method described in JP 2007-277127 A in a manner similar to the method in Example 1.

$^1$H-NMR (CDCl$_3$) 57.55-7.53 (m, 2H), 7.49-7.40 (m, 3H), 7.30-7.28 (m, 4H), 2.67-2.63 (m, 2H), 1.69 (sex, 2H), 0.98 (t, 3H).

$^{19}$F-NMR (CDCl$_3$) δ−69.08 (dd, 3F), −72.86--72.97 (m, 2F), −117.81--117.86 (m, 1F), −124.68--124.74 (m, 2F), −156.84--157.26 (m, 1F), −159.92--160.37 (m, 1F).

Physical properties of compound (No. 1-2-5) were as described below. Phase transition temperature: C 66.8 N 150.7 I; maximum temperature (NI)=75.0° C.; dielectric anisotropy (Δε)=18.8; optical anisotropy (Δn)=0.190; viscosity (η)=56.0 mPa·s.

Synthesis Example 3

Synthesis of Compound (No. 1-2-26)

Formula 34

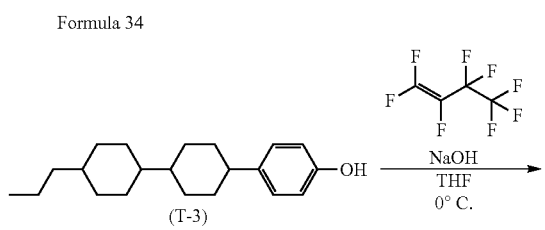

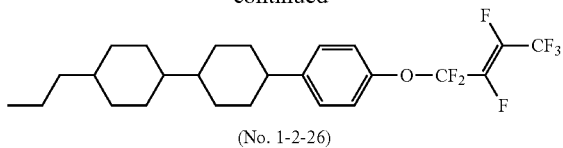

(No. 1-2-26)

Compound (No. 1-2-26) was obtained (yield: 10%) by using compound (T-3) (4.00 g, 13.31 mmol) prepared according to the method described in JP 2007-308483 A in a manner similar to the method in Example 1.

$^1$H-NMR (CDCl$_3$) δ 7.22-7.19 (m, 2H), 7.13-7.11 (m, 2H), 2.49-2.43 (m, 1H), 1.92-1.72 (m, 8H), 1.43-1.25 (m, 4H), 1.16-0.96 (m, 9H), 0.89-0.83 (m, 5H).

$^{19}$F-NMR (CDCl$_3$) δ −69.09, (dd, 3F), −71.21 (dd, 2F), −156.12--156.60 (m, 1F), −161.34--161.78 (m, 1F).

Physical properties of compound (No. 1-2-26) were as described below. Phase transition temperature: C 10.9 S$_B$ 168.5 I; maximum temperature (NI)=112° C.; dielectric anisotropy (Δε)=5.90; optical anisotropy (Δn)=0.097; viscosity (η)=17.7 mPa·s.

According to the synthesis method of compound (1) already described and the synthesis procedures described in Examples 2 to 3, compounds (No. 1-1-1) to (No. 1-1-37), (No. 1-2-1) to (No. 1-2-118), (No. 1-3-1) to (No. 1-3-148) and (No. 1-4-1) to (No. 1-4-36) described below can be prepared.

Formulla 35

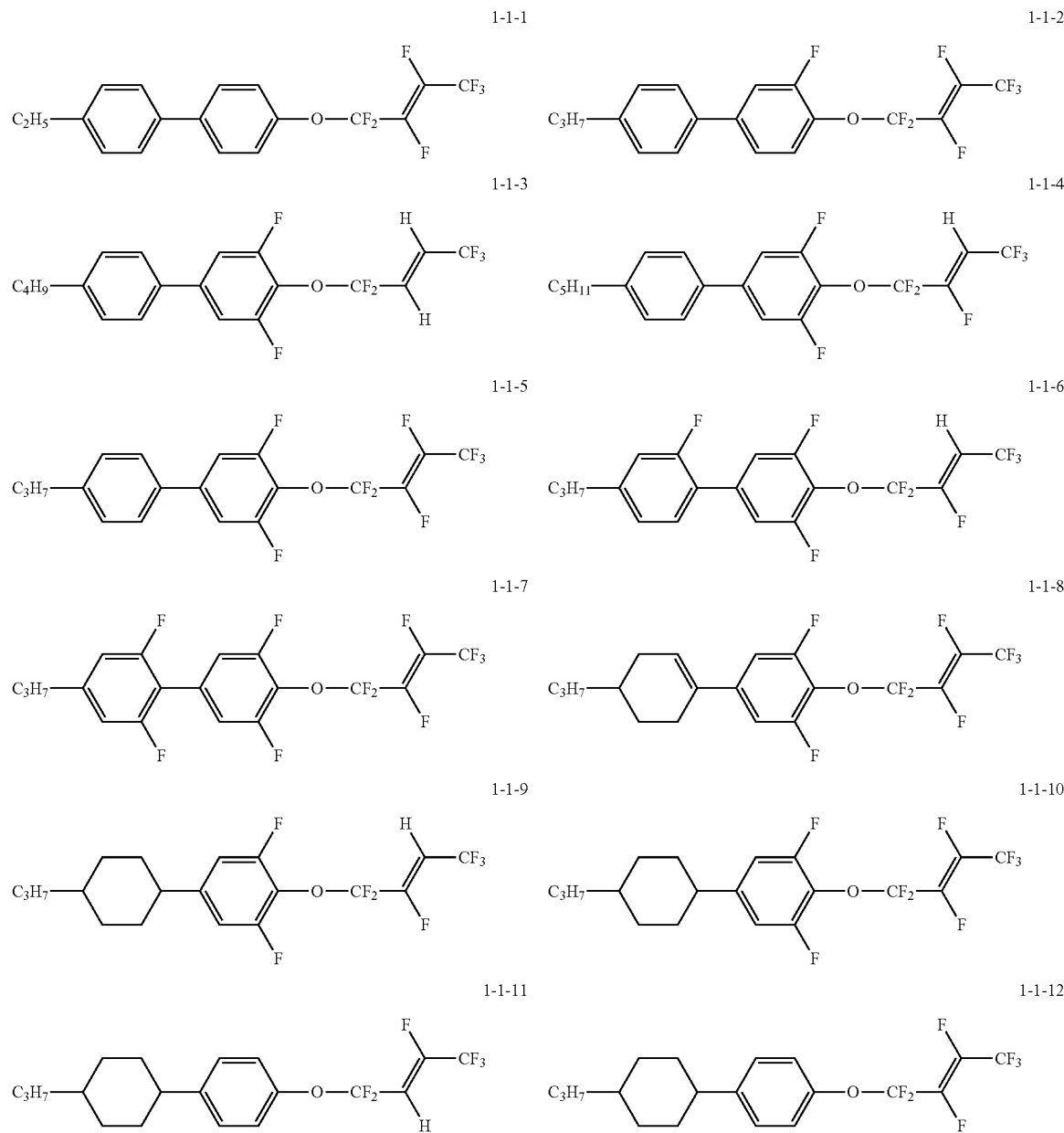

-continued
1-1-13
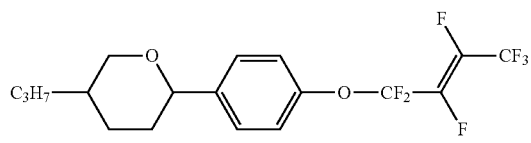
1-1-14
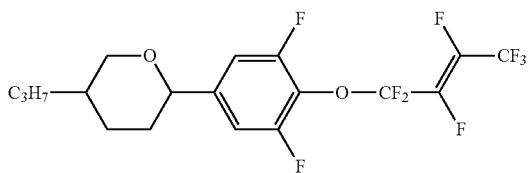
1-1-15
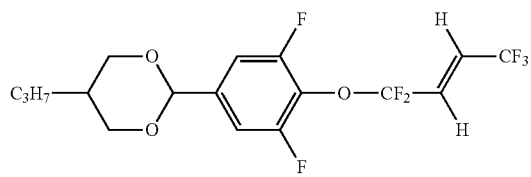
1-1-16
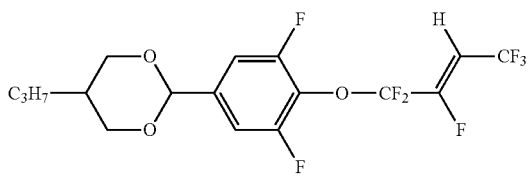
1-1-17
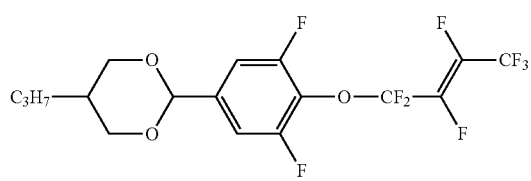
1-1-18
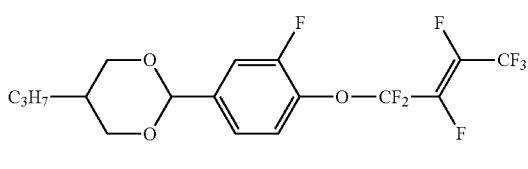
1-1-19
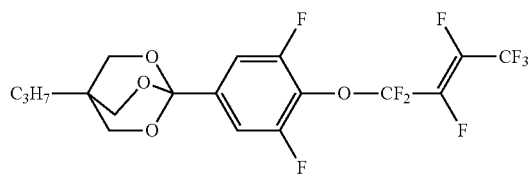
1-1-20
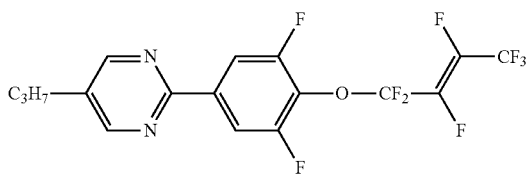
1-1-21
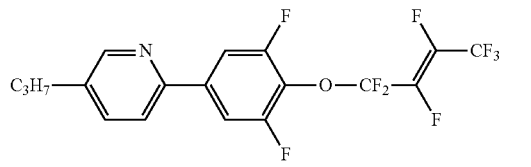
1-1-22
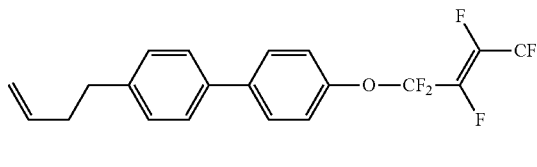
1-1-23
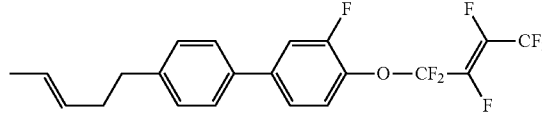
1-1-24
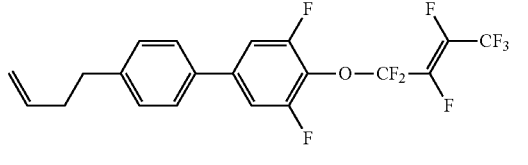
1-1-25
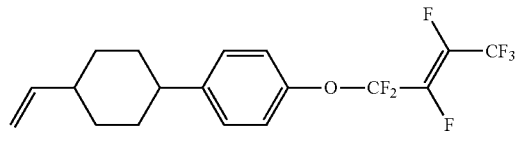
1-1-26
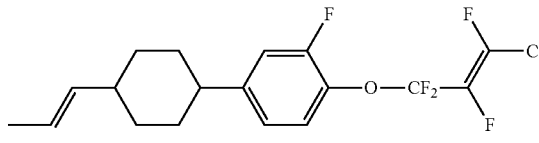
1-1-27
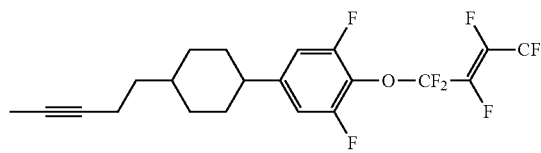
1-1-28
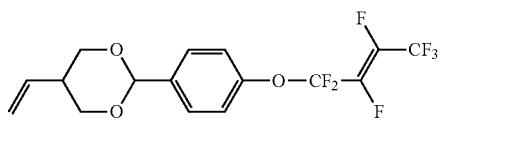

1-1-29
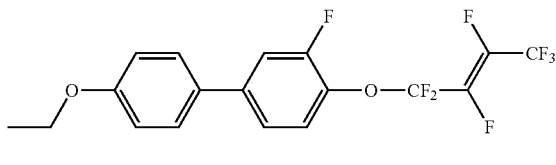
1-1-30
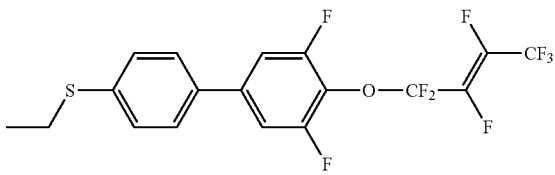
1-1-31
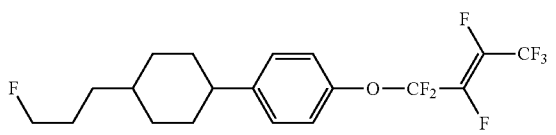
1-1-32
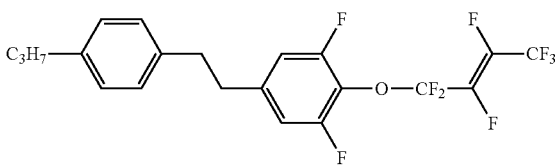
1-1-33
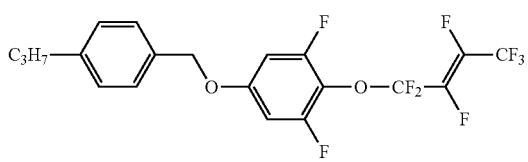
1-1-34
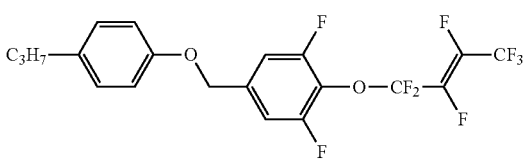
1-1-35
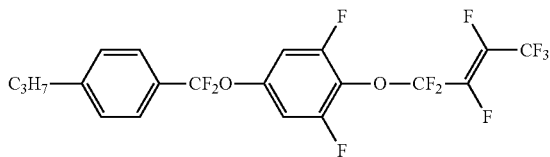
1-1-36
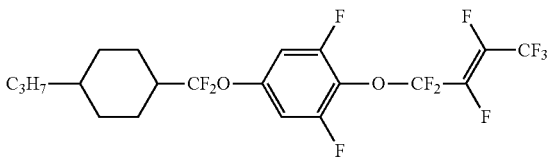
1-1-37
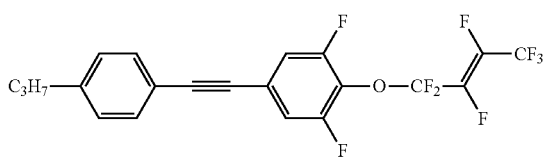
Formula 36
1-2-1
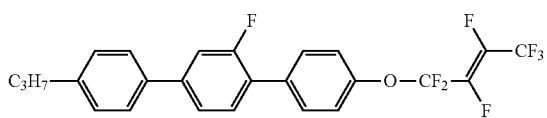
1-2-2
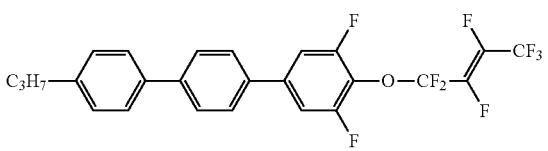
1-2-3
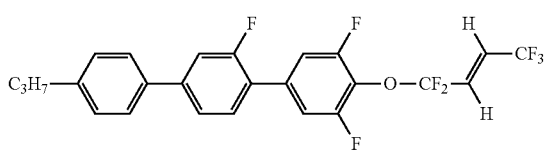
1-2-4
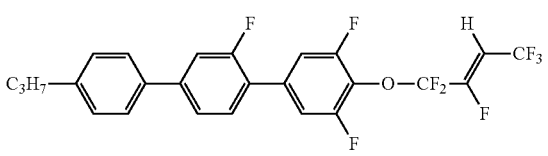
1-2-5
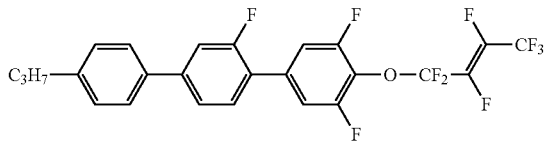
1-2-6
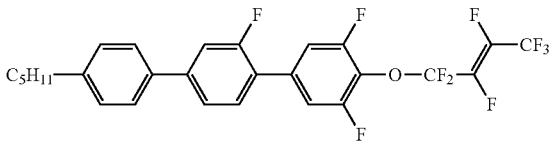

1-2-7
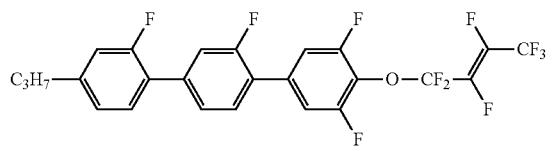
1-2-8
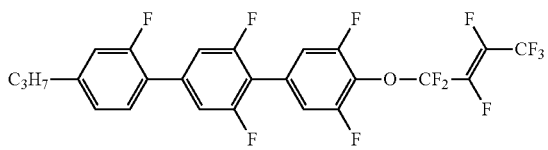
1-2-9
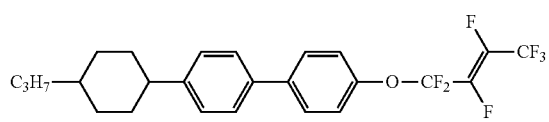
1-2-10
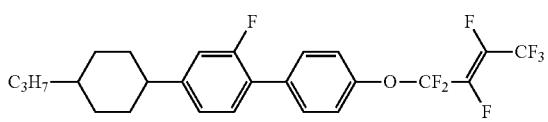
1-2-11
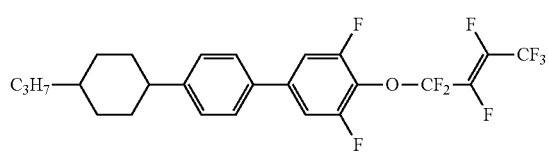
1-2-12
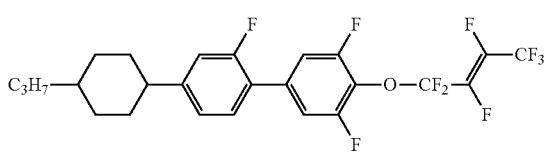
1-2-13
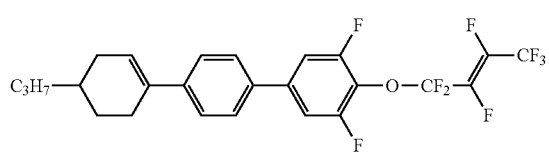
1-2-14
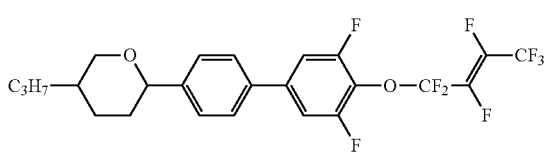
1-2-15
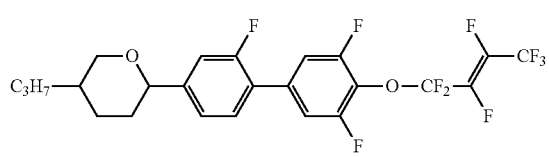
1-2-16
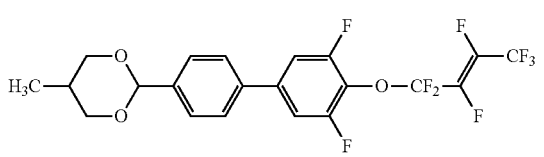
1-2-17
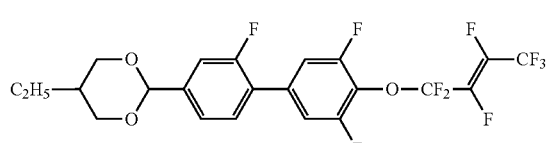
1-2-18
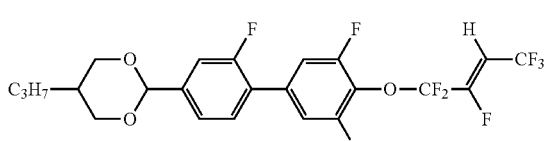
1-2-19
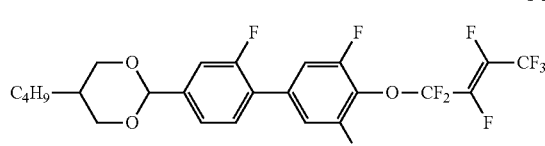
1-2-20
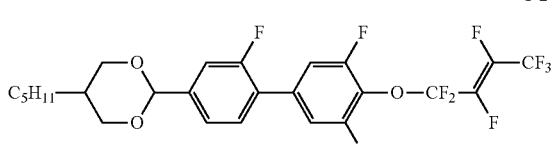
1-2-21
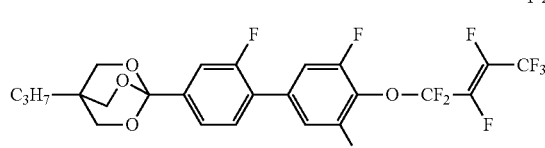
1-2-22
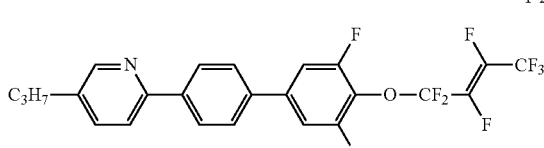
1-2-23
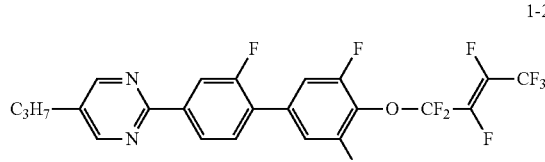
1-2-24
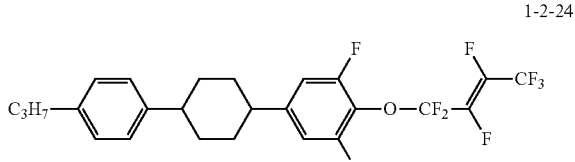

-continued
1-2-25
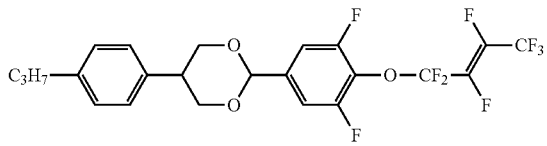
1-2-26
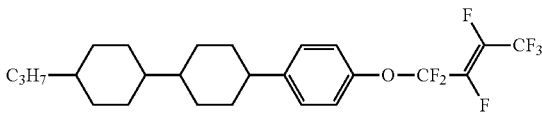
1-2-27
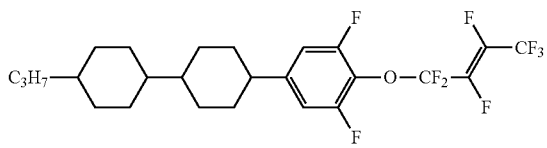
1-2-28
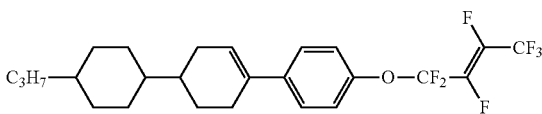
1-2-29
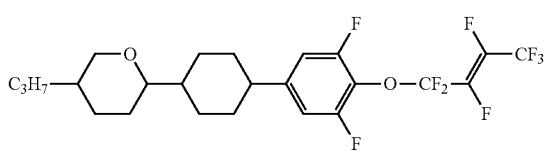
1-2-30
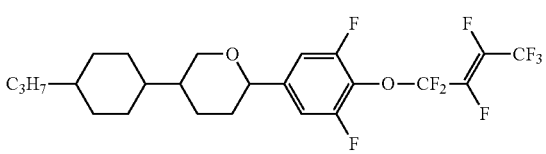
Formula 37
1-2-31
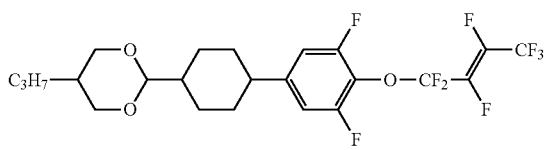
1-2-32
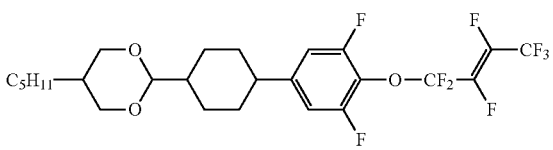
1-2-33
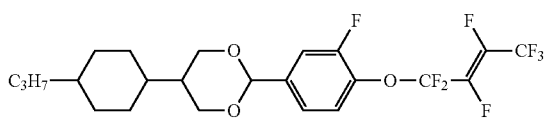
1-2-34
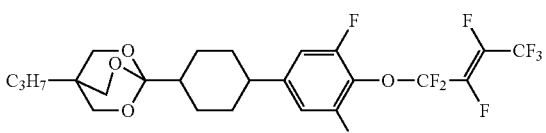
1-2-35
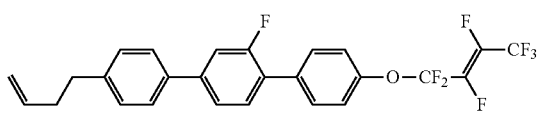
1-2-36
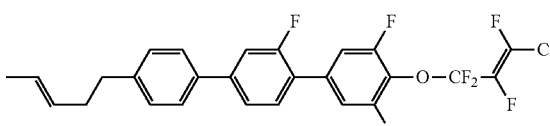
1-2-37
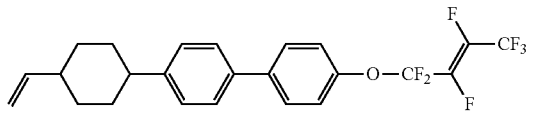
1-2-38
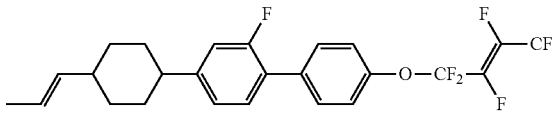
1-2-39
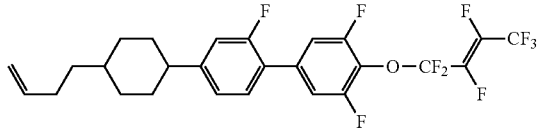
1-2-40
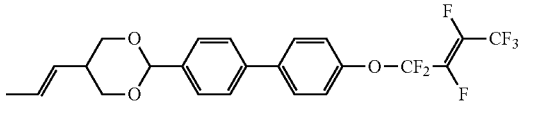
1-2-41
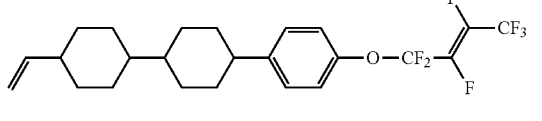
1-2-42
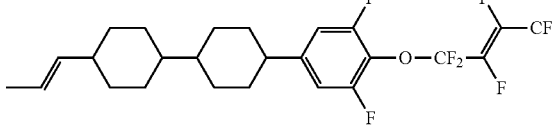

-continued
1-2-43
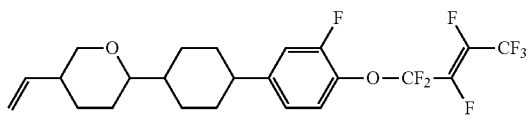
1-2-44
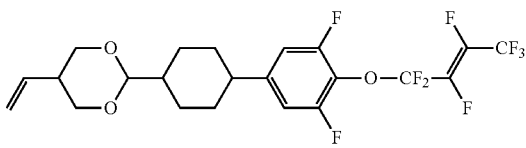
1-2-45
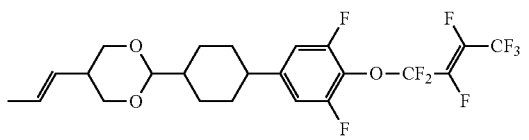
1-2-46
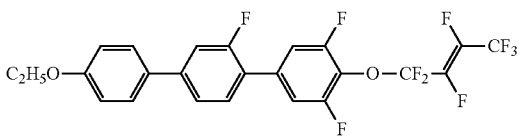
1-2-47
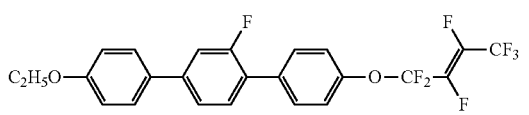
1-2-48
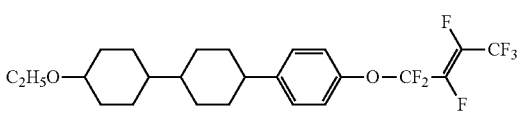
1-2-49
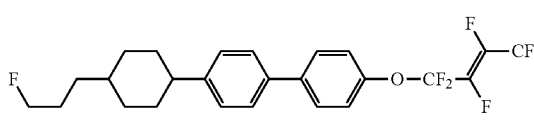
1-2-50
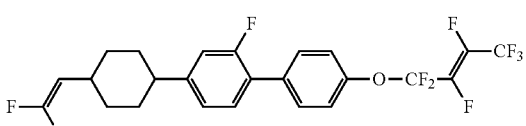
1-2-51
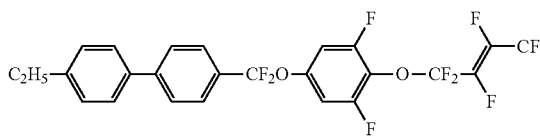
1-2-52
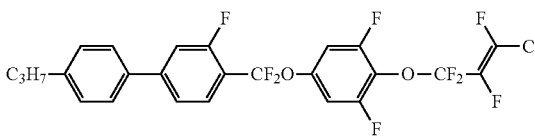
1-2-53
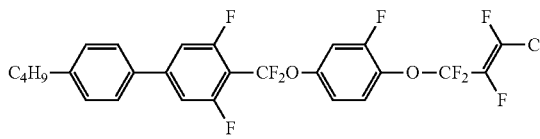
1-2-54
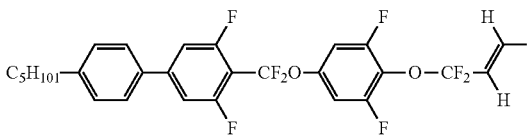
1-2-55
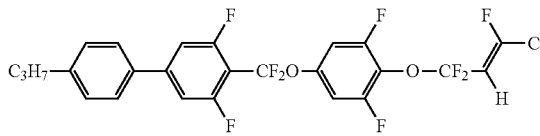
1-2-56
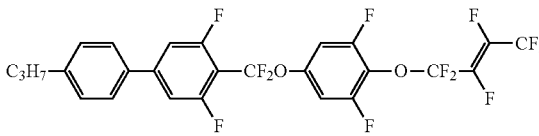
1-2-57
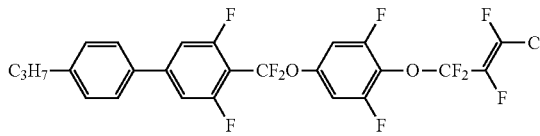
1-2-58
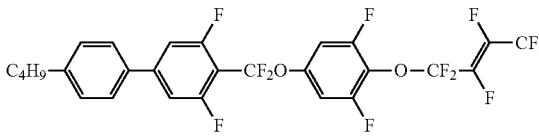
1-2-59
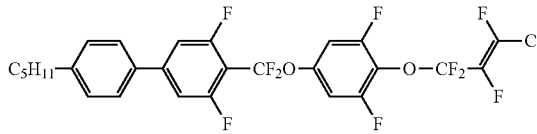
1-2-60
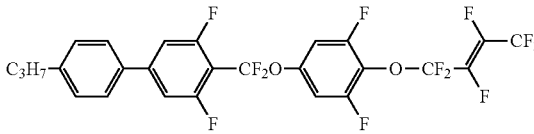

Formula 38
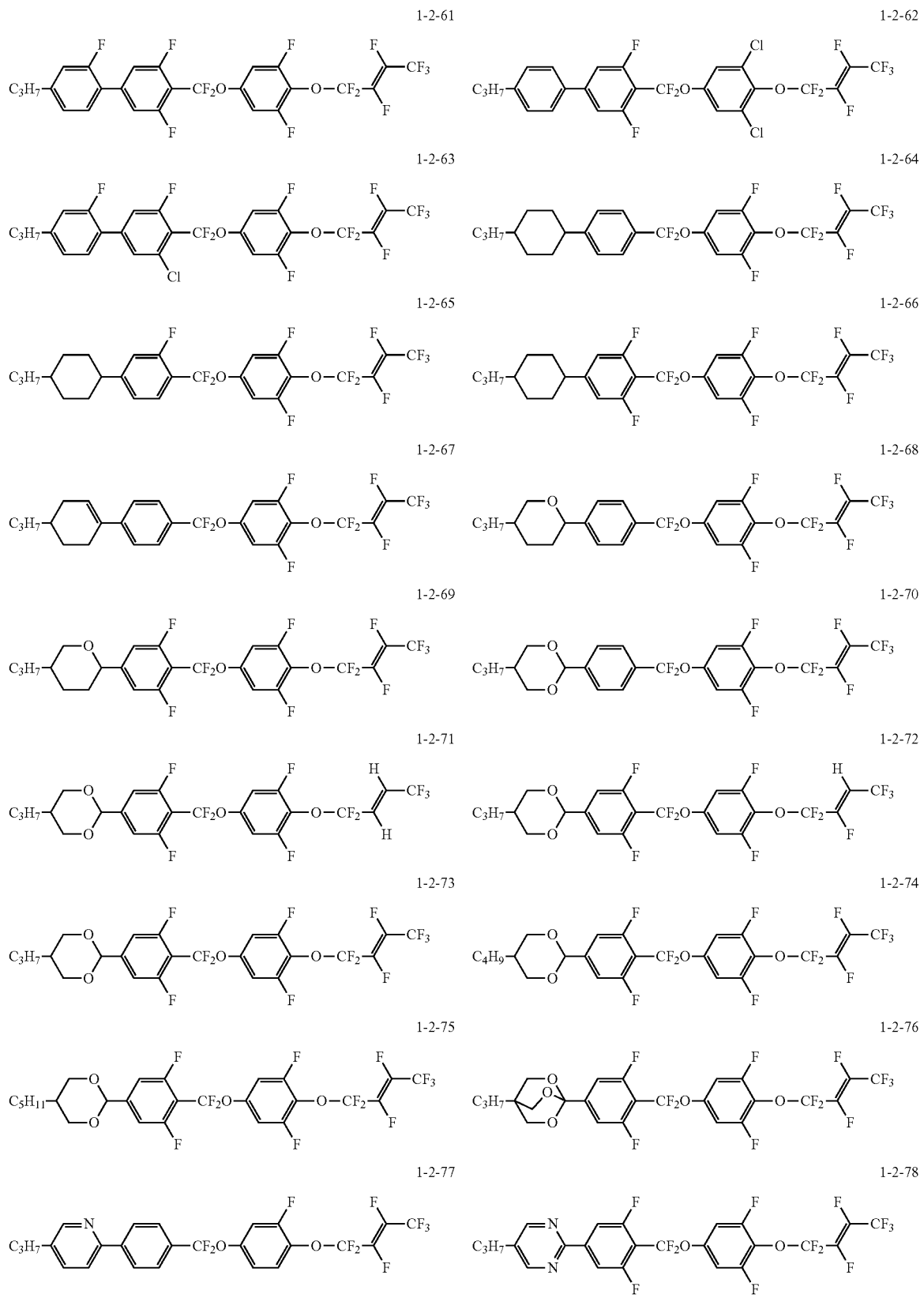

-continued
1-2-79
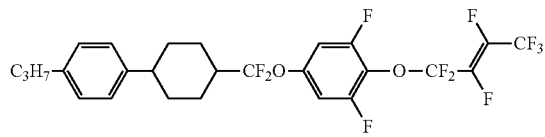
1-2-80
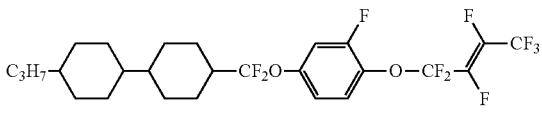
1-2-81
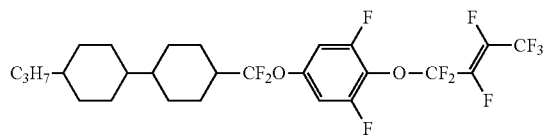
1-2-82
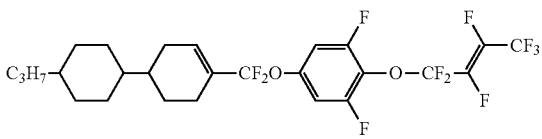
1-2-83
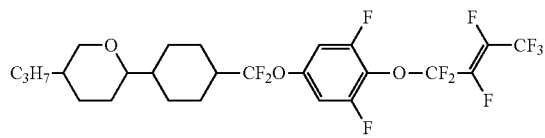
1-2-84
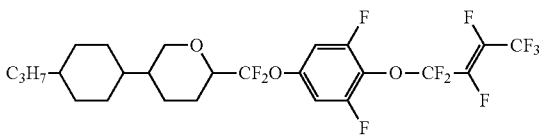
1-2-85
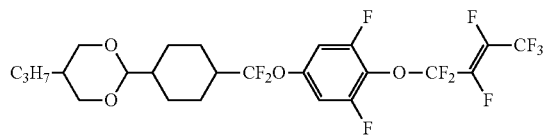
1-2-86
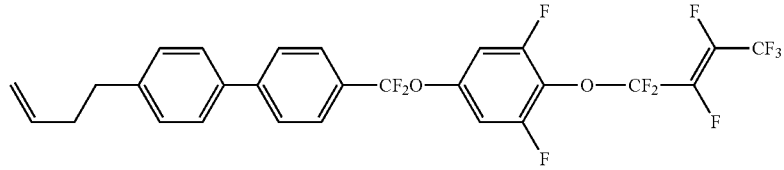
1-2-87
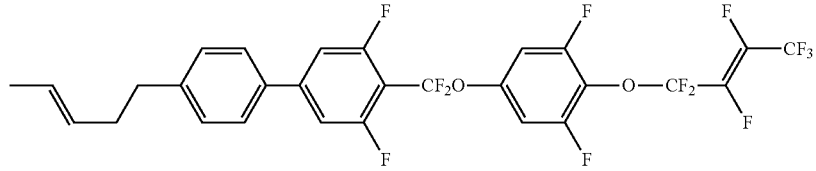
1-2-88
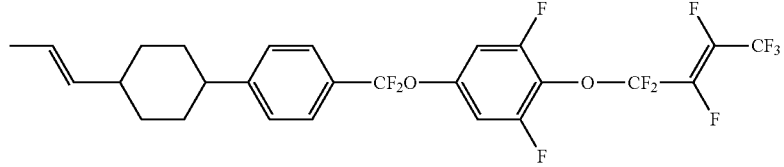
1-2-89
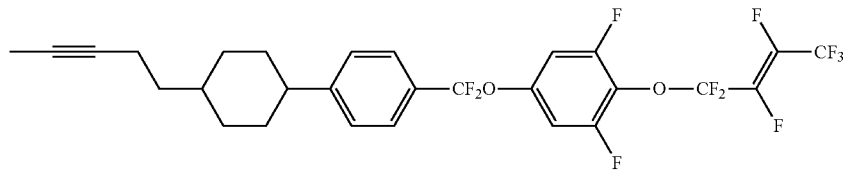
1-2-90
Formula 39
1-2-91
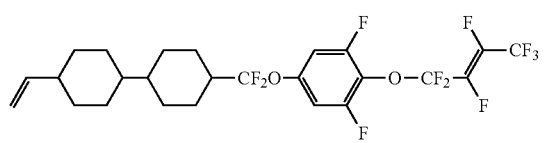
1-2-92
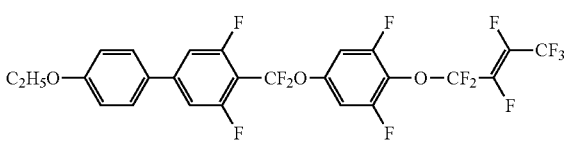

1-2-93
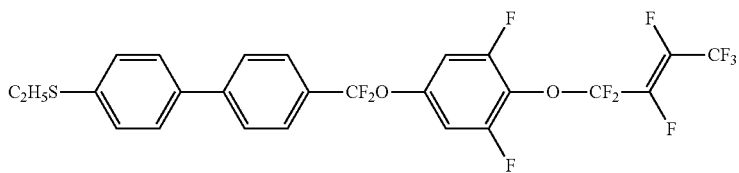
1-2-94
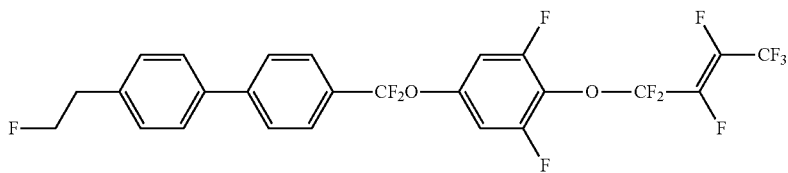
1-2-95
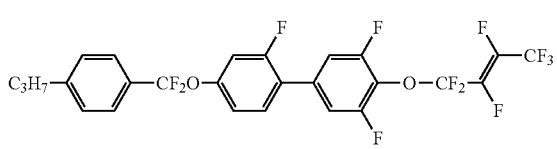
1-2-96
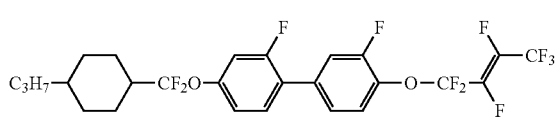
1-2-97
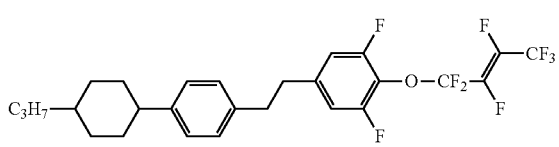
1-2-98
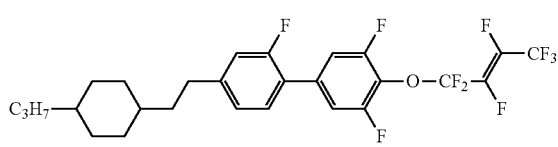
1-2-99
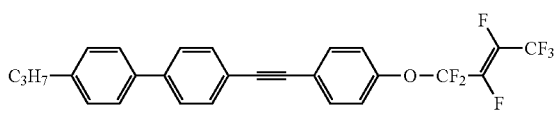
1-2-100
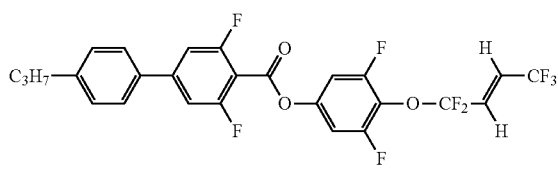
1-2-101
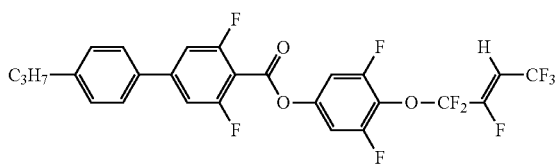
1-2-102
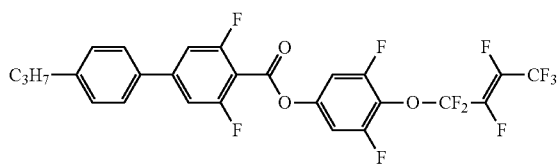
1-2-103
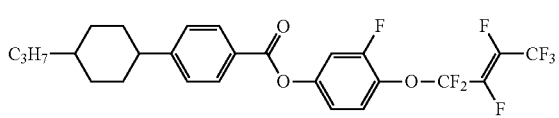
1-2-104
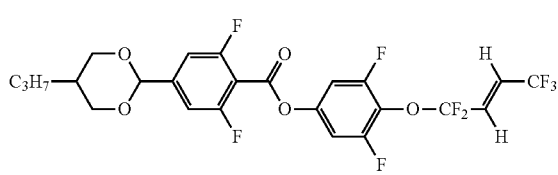
1-2-105
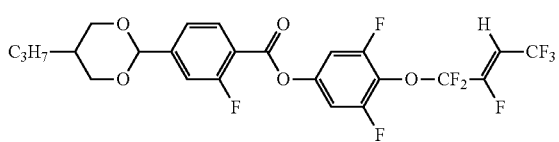
1-2-106
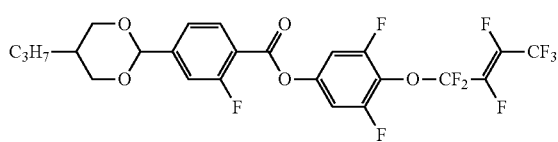
1-2-107
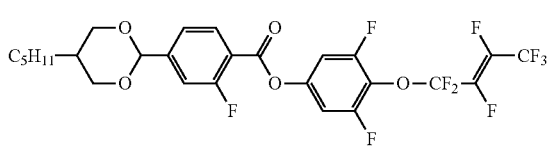
1-2-108
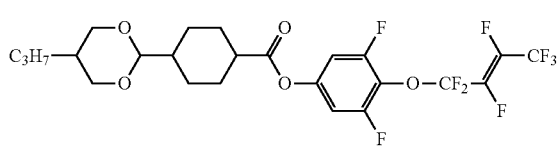

-continued
1-2-109
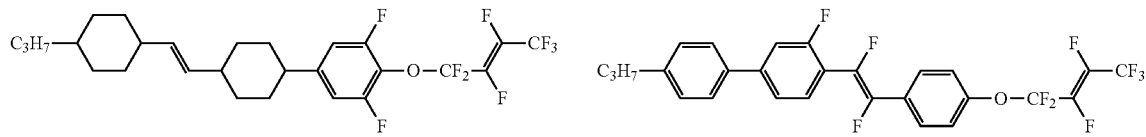
1-2-110
1-2-111
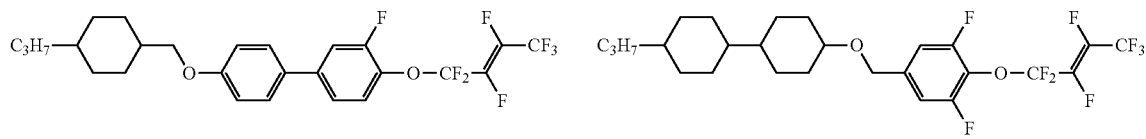
1-2-112
1-2-113
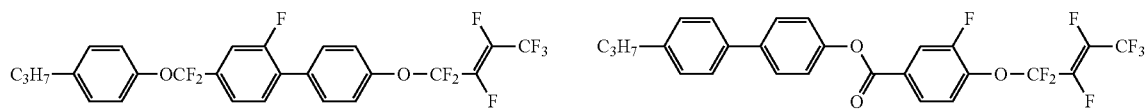
1-2-114
1-2-115
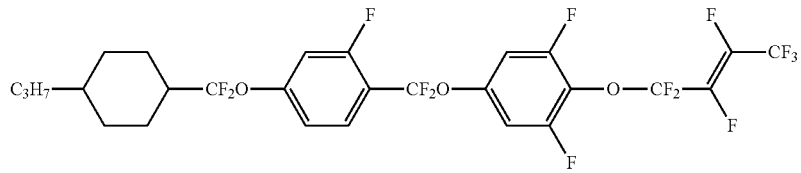
1-2-116
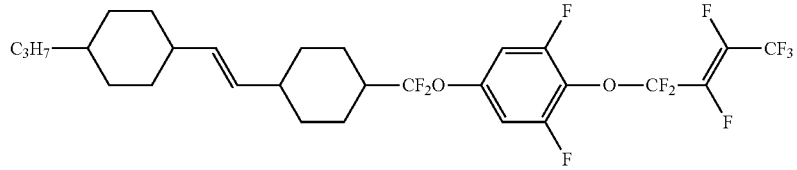
1-2-117
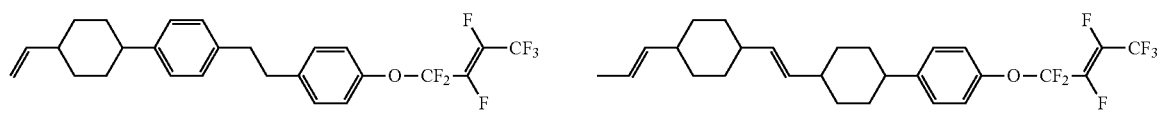
1-2-118
Formula 40
1-3-1
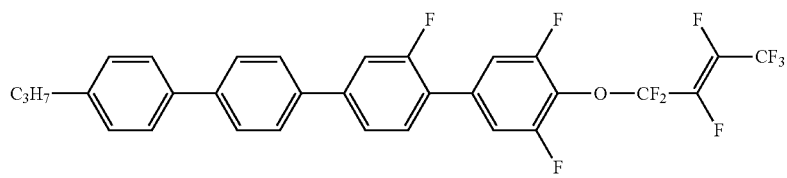
1-3-2
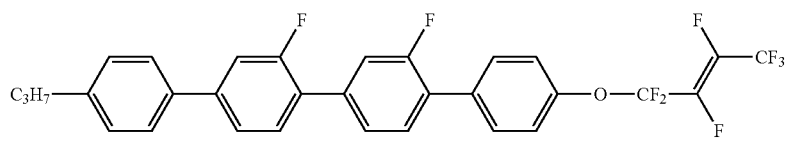
1-3-3
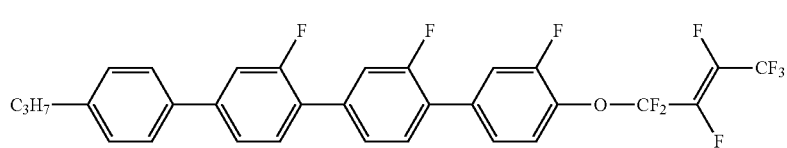

-continued
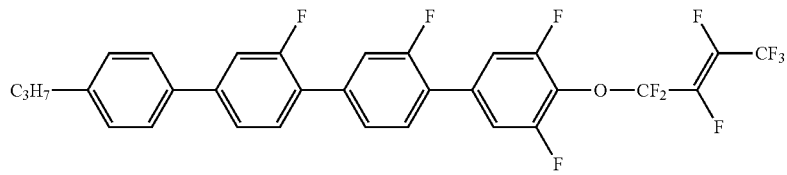
1-3-4
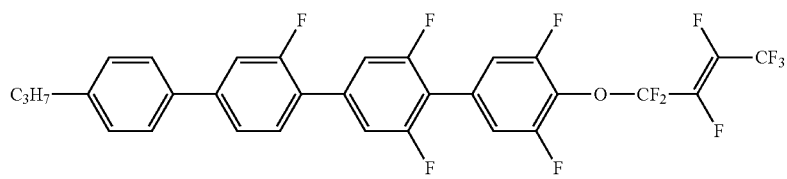
1-3-5
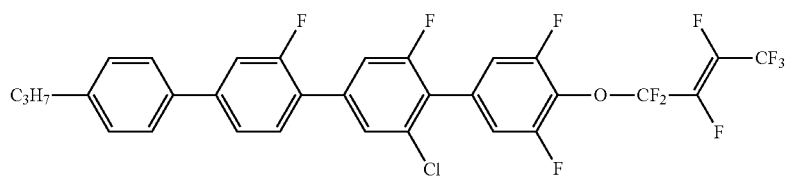
1-3-6
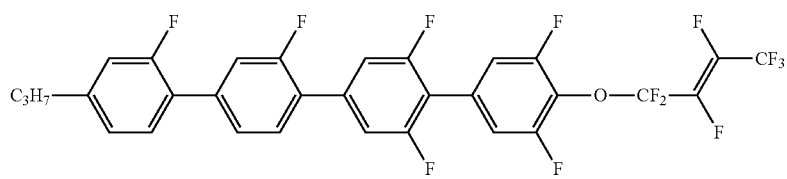
1-3-7
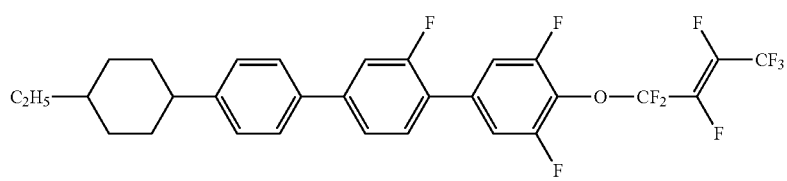
1-3-8
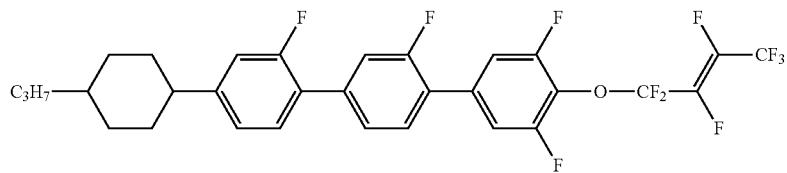
1-3-9
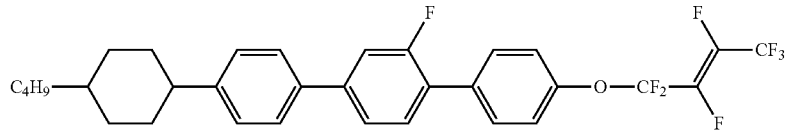
1-3-10
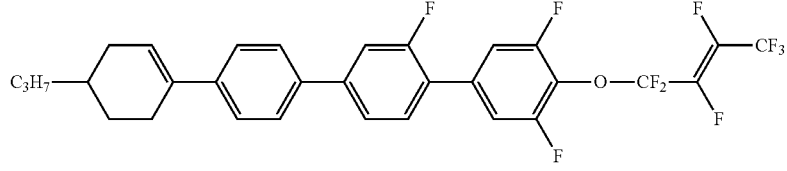
1-3-11
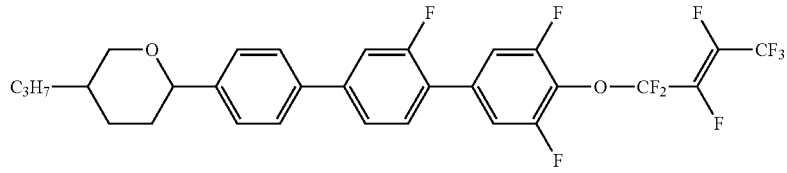
1-3-12

-continued
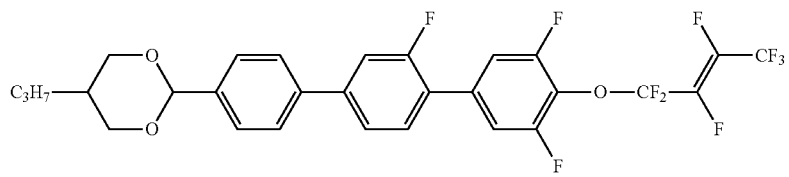
1-3-13
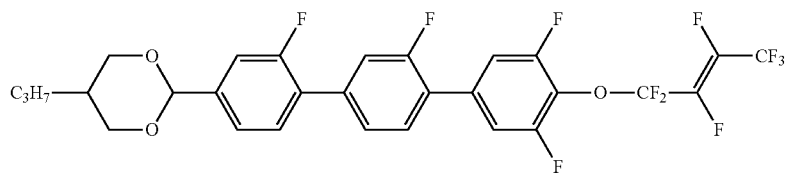
1-3-14
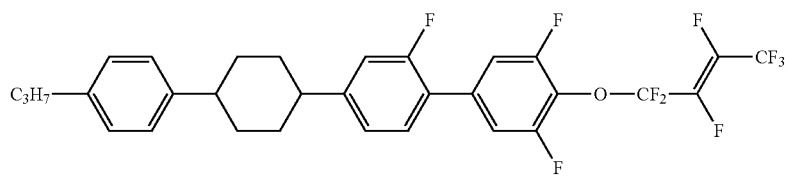
1-3-15
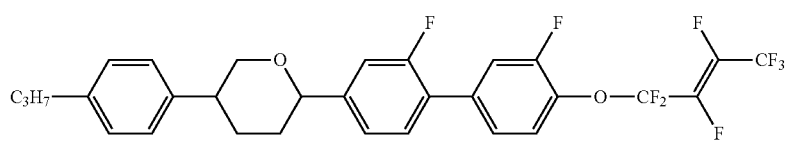
1-3-16
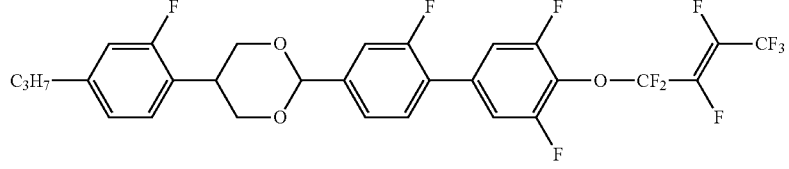
1-3-17
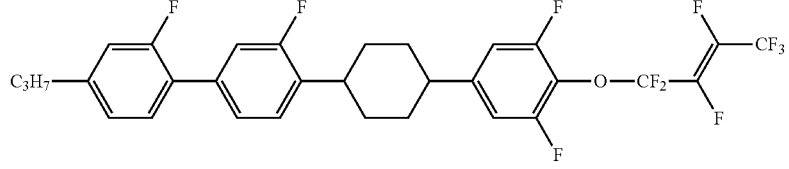
1-3-18
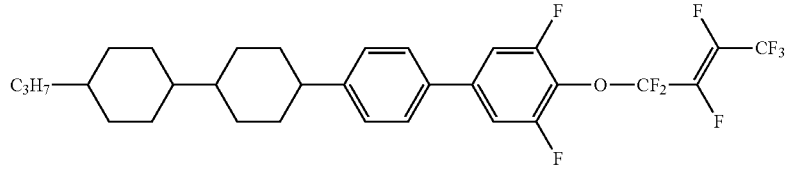
1-3-19
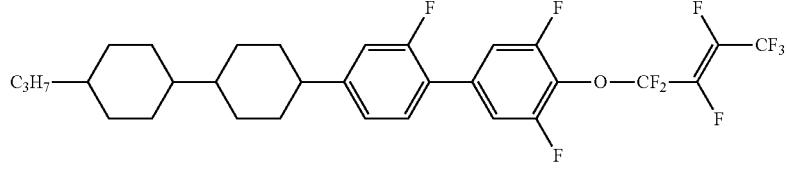
1-3-20
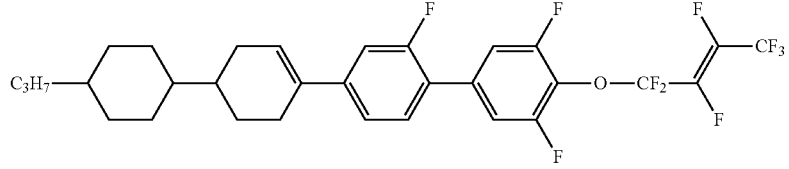
1-3-21

-continued
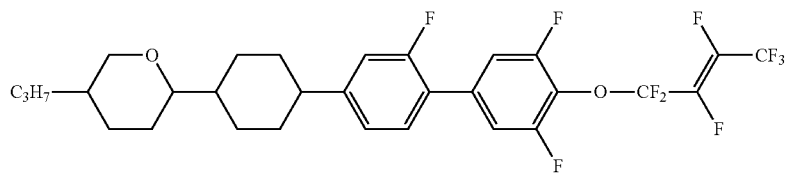
1-3-22
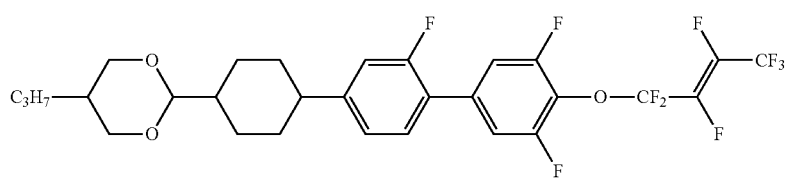
1-3-23
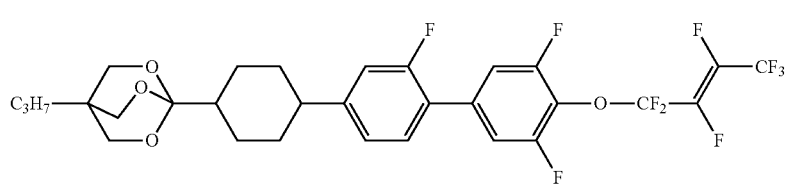
1-3-24
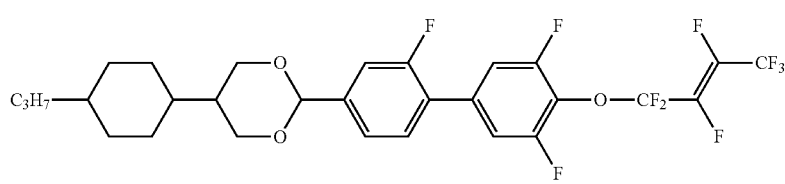
1-3-25
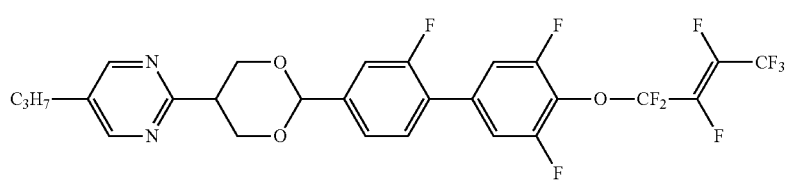
1-3-26
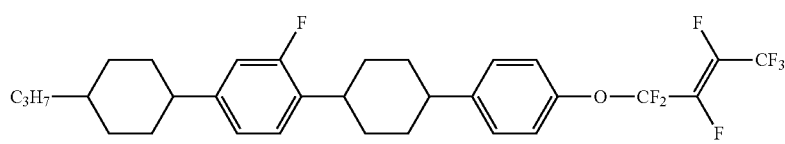
1-3-27
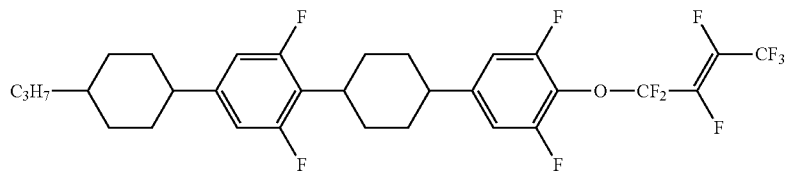
1-3-28
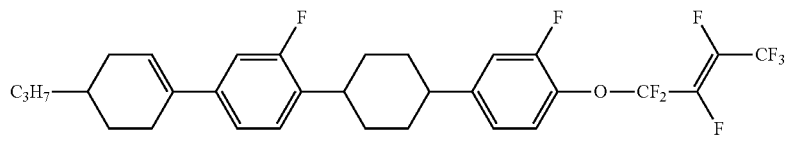
1-3-29
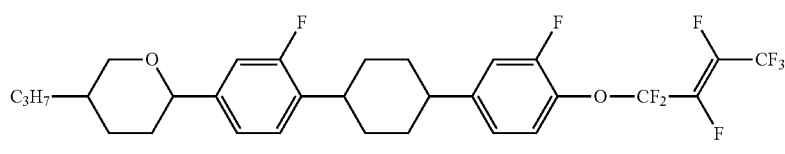
1-3-30

-continued
Formula 41
1-3-31
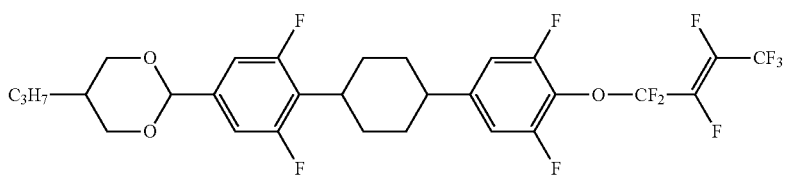
1-3-32
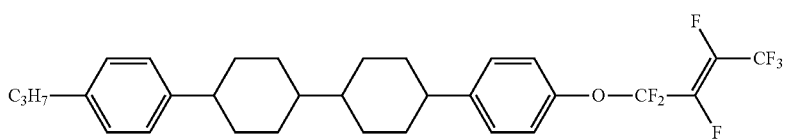
1-3-33
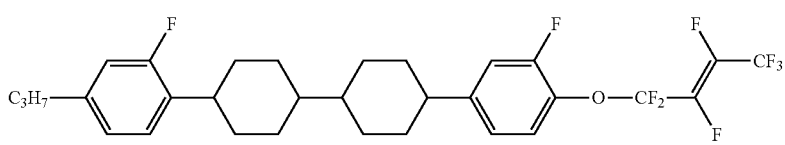
1-3-34
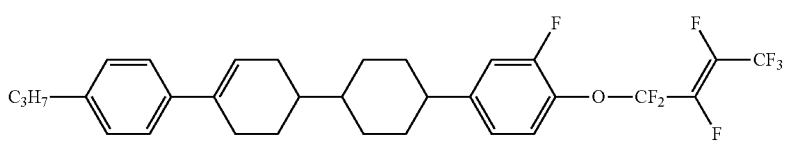
1-3-35
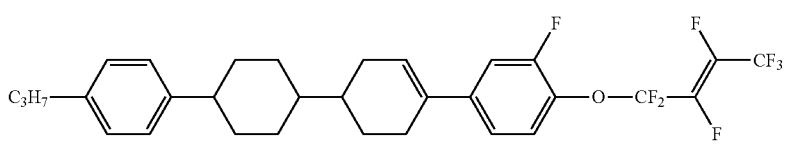
1-3-36
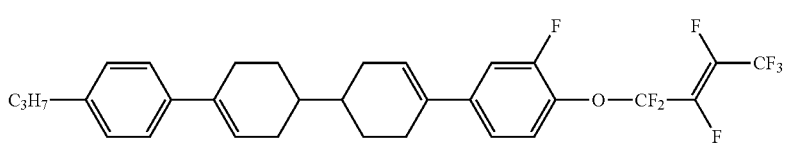
1-3-37
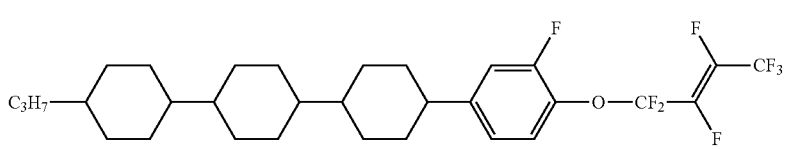
1-3-38
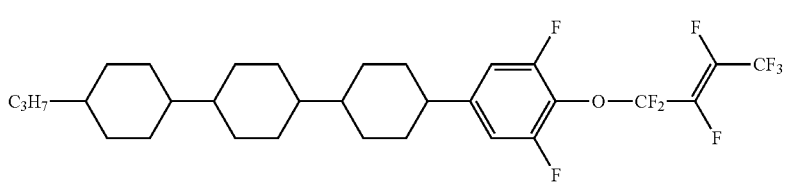
1-3-39
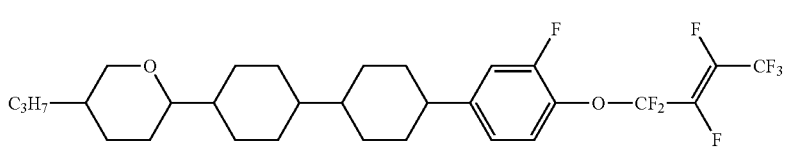
1-3-40
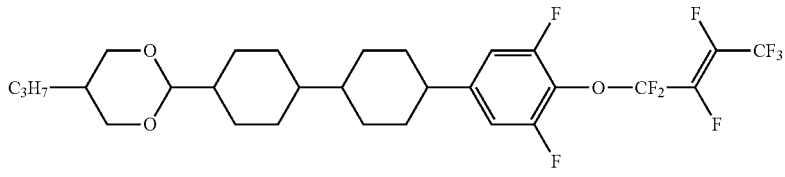

-continued
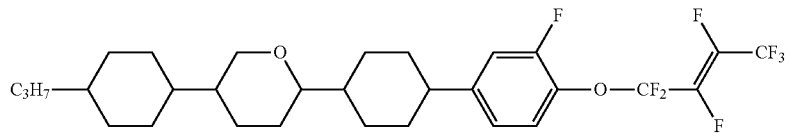
1-3-41
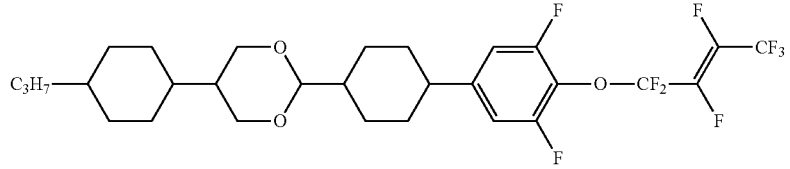
1-3-42
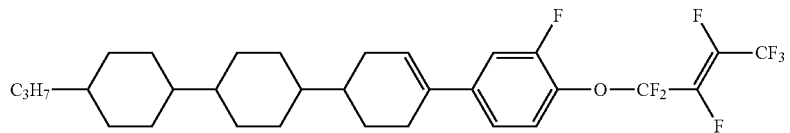
1-3-43
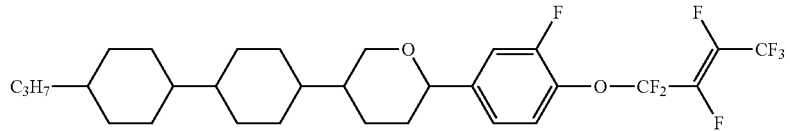
1-3-44
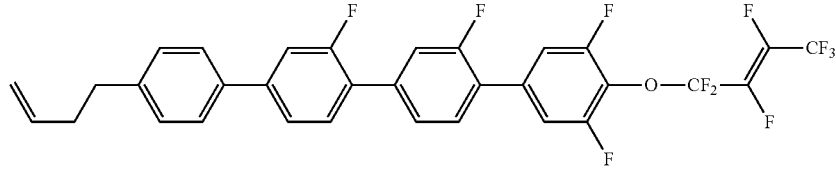
1-3-45
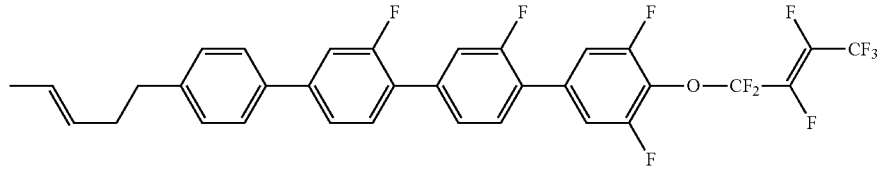
1-3-46
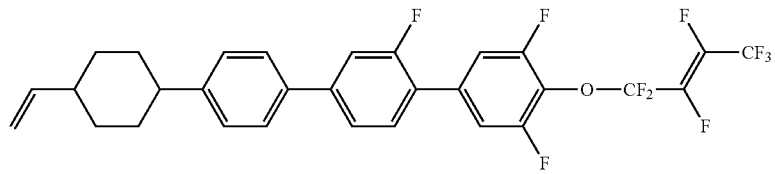
1-3-47
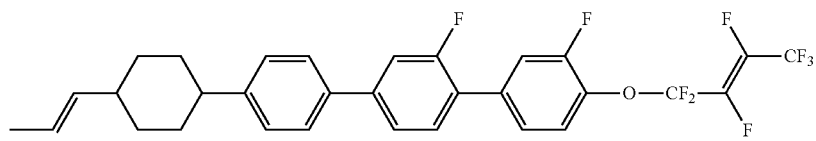
1-3-48
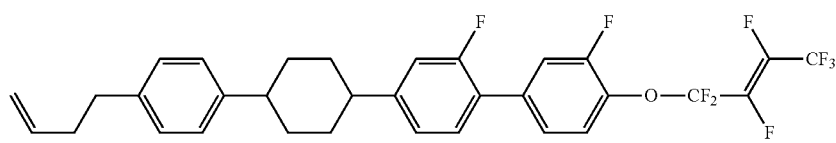
1-3-49
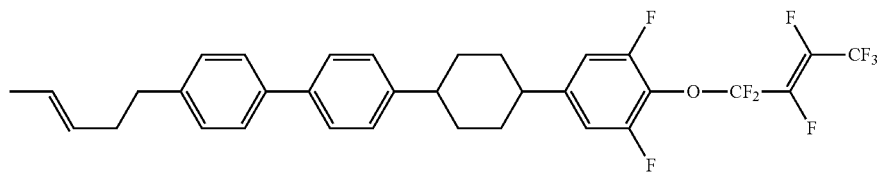
1-3-50

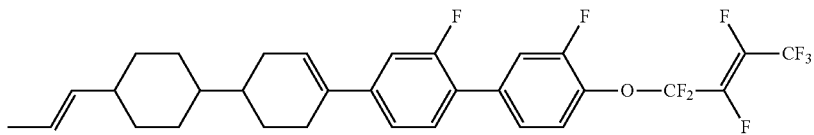
1-3-51
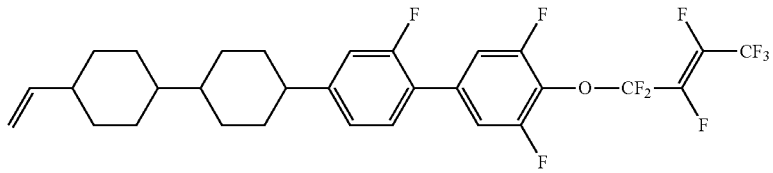
1-3-52
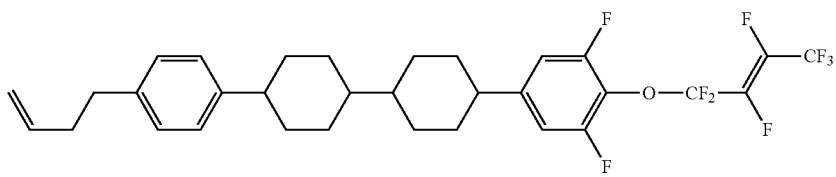
1-3-53
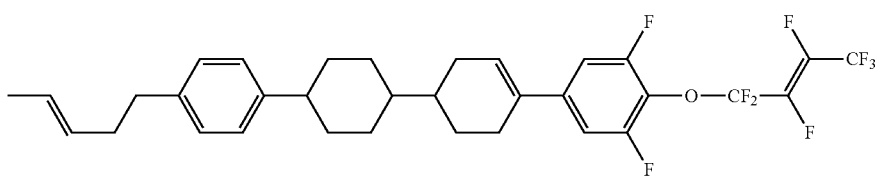
1-3-54
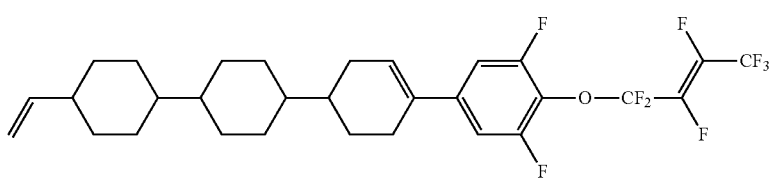
1-3-55
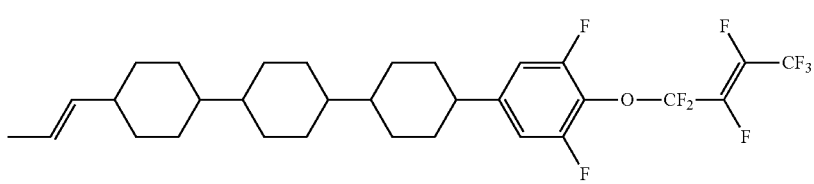
1-3-56
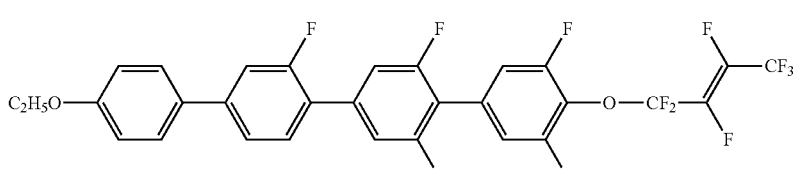
1-3-57
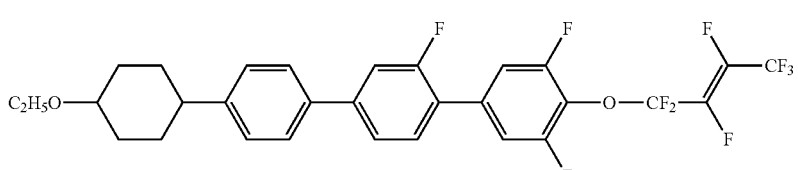
1-3-58
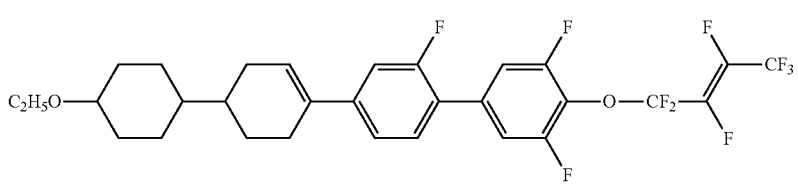
1-3-59

1-3-60
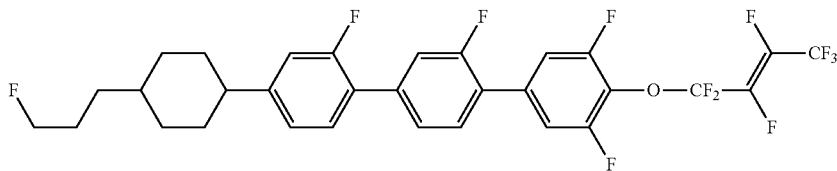
Formula 42
1-3-61
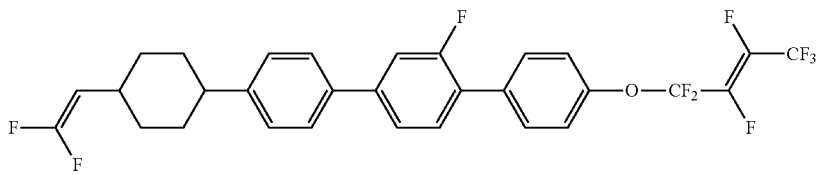
1-3-62
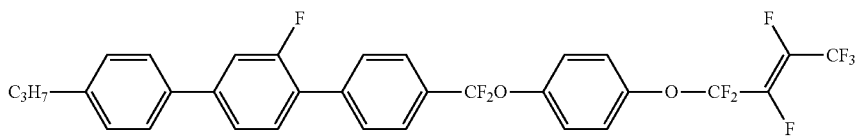
1-3-63
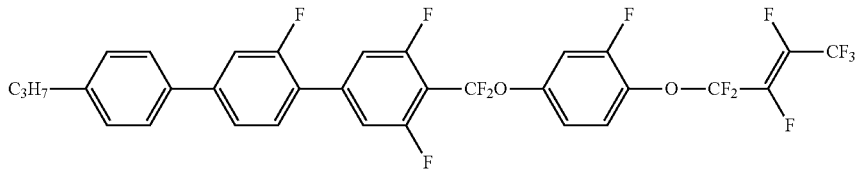
1-3-64
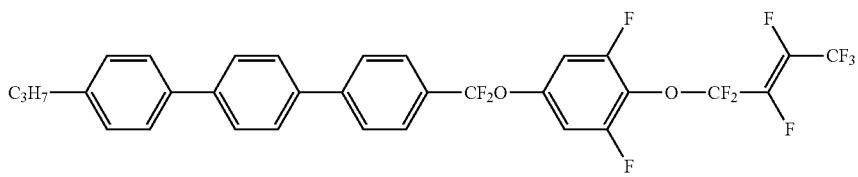
1-3-65
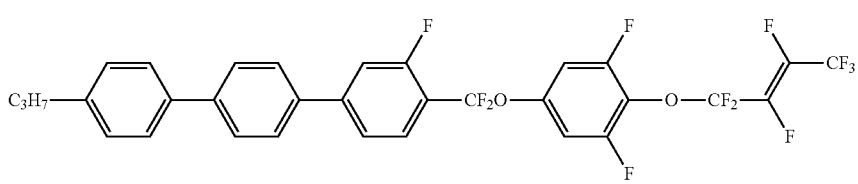
1-3-66
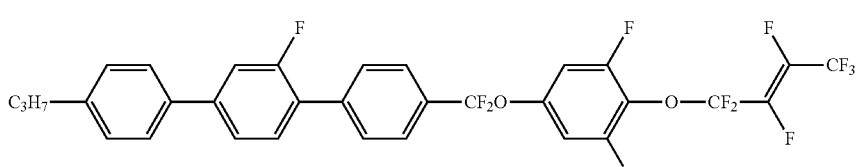
1-3-67
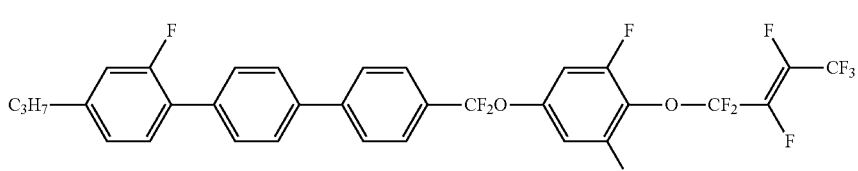
1-3-68
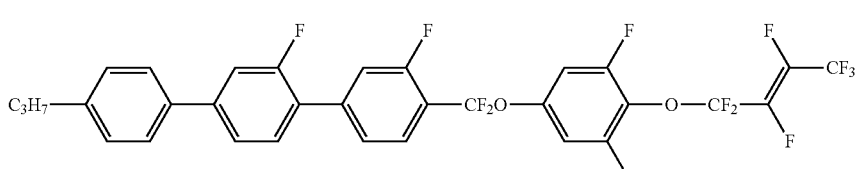

-continued
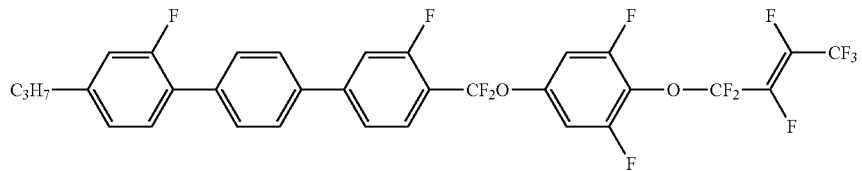
1-3-69
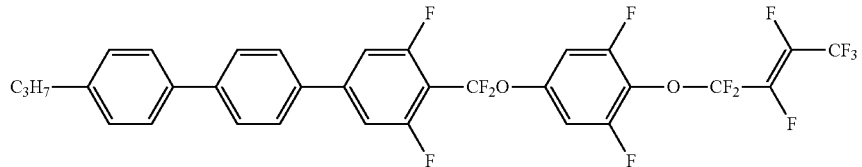
1-3-70
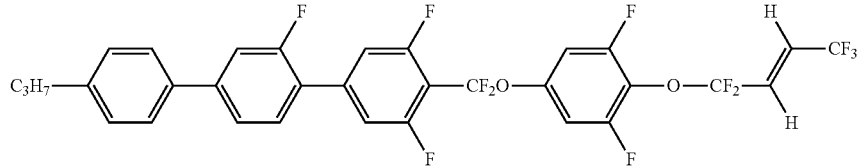
1-3-71
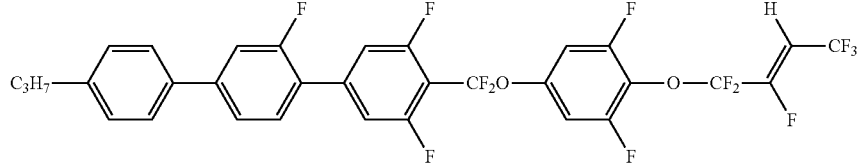
1-3-72
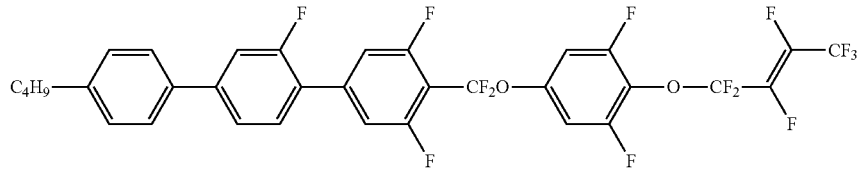
1-3-73
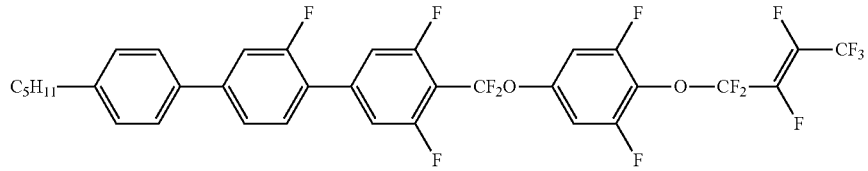
1-3-74
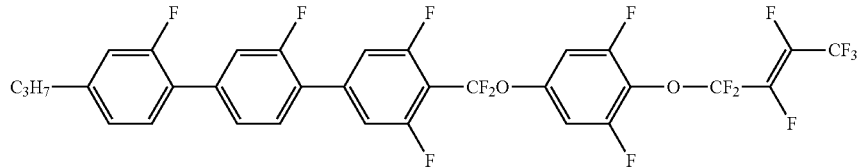
1-3-75
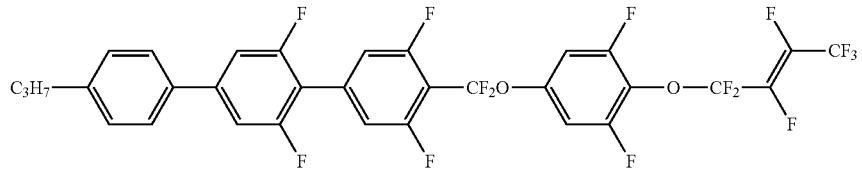
1-3-76
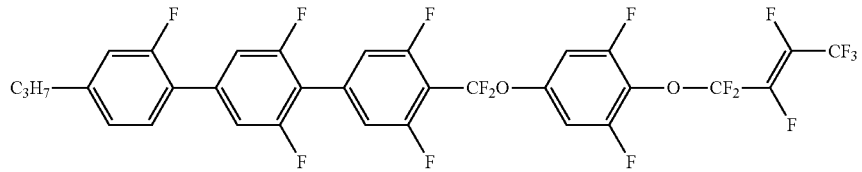
1-3-77

-continued
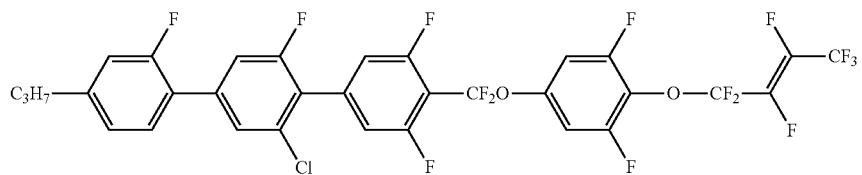
1-3-78
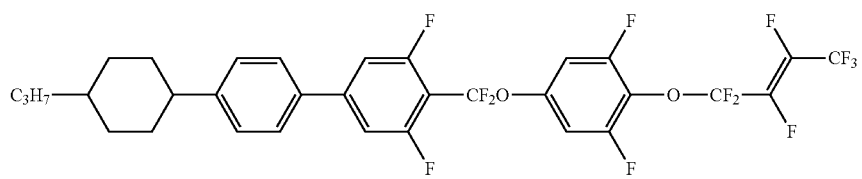
1-3-79
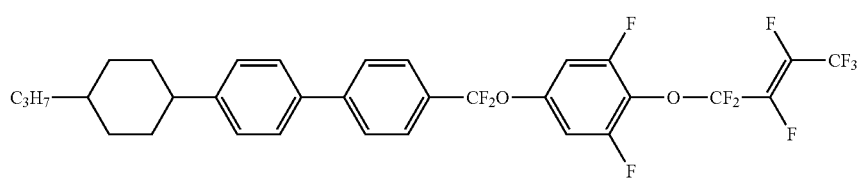
1-3-80
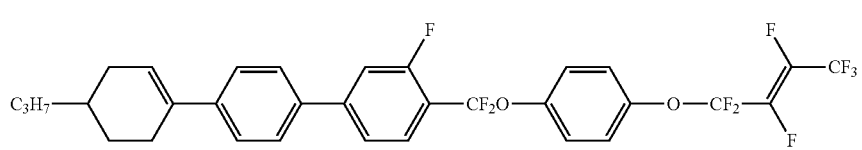
1-3-81
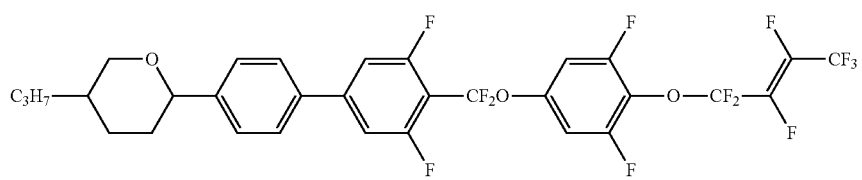
1-3-82
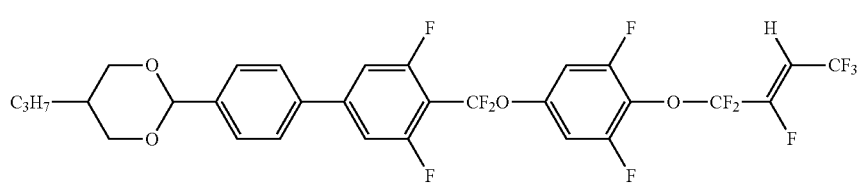
1-3-83
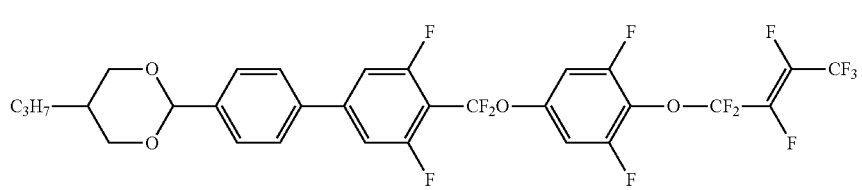
1-3-84
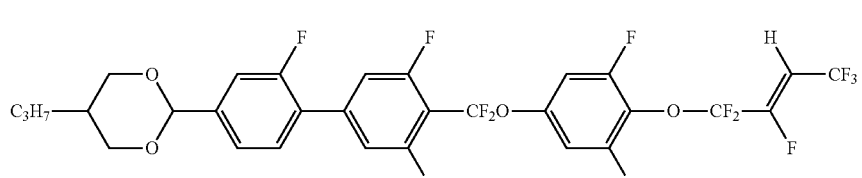
1-3-85
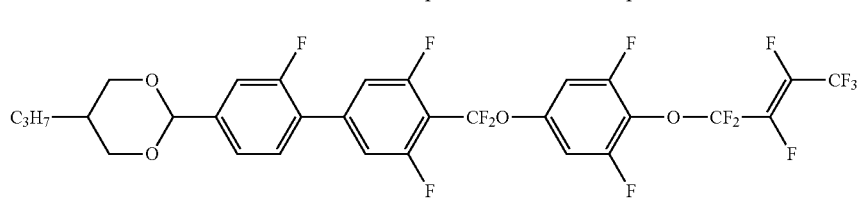
1-3-86

-continued
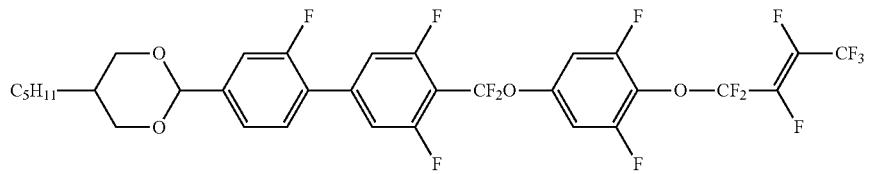
1-3-87
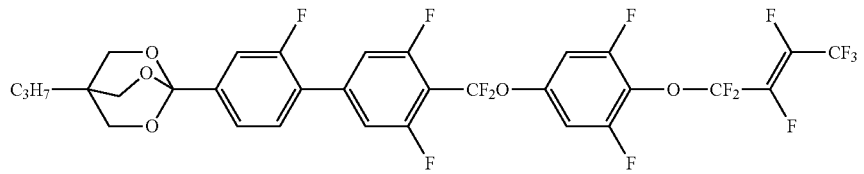
1-3-88
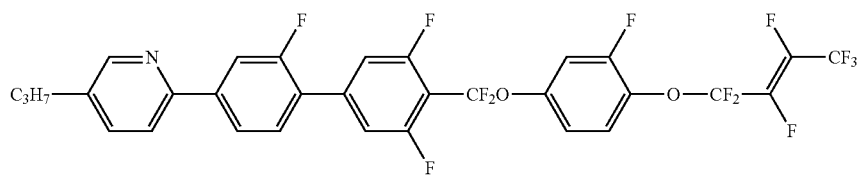
1-3-89
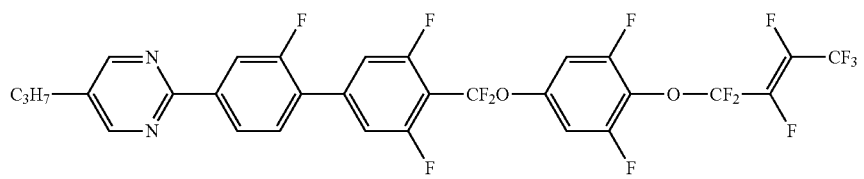
1-3-90
Formula 43
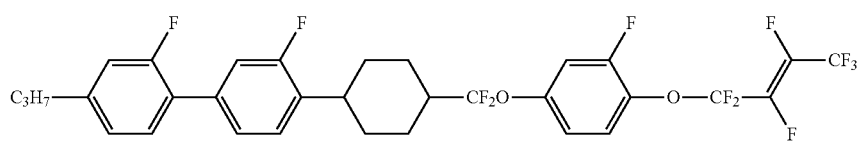
1-3-91
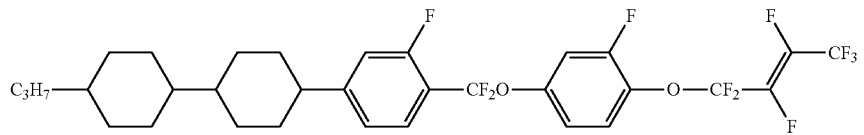
1-3-92
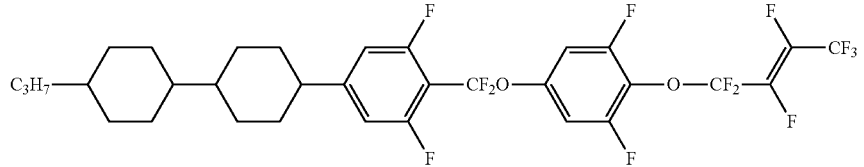
1-3-93
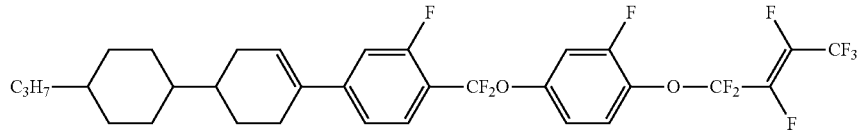
1-3-94
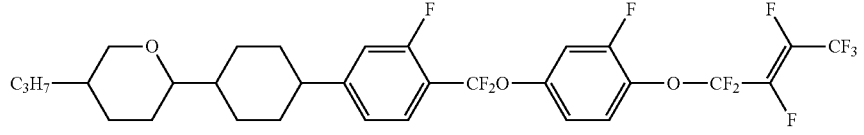
1-3-95

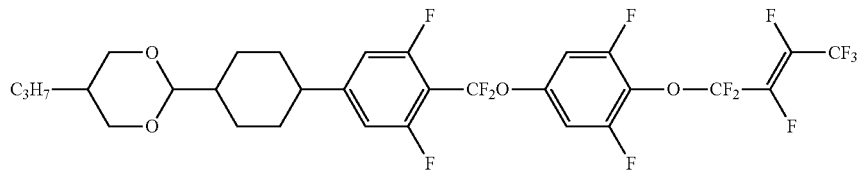
1-3-96
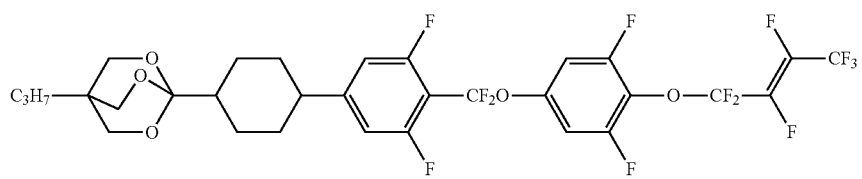
1-3-97
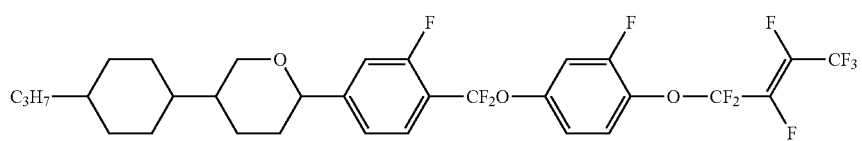
1-3-98
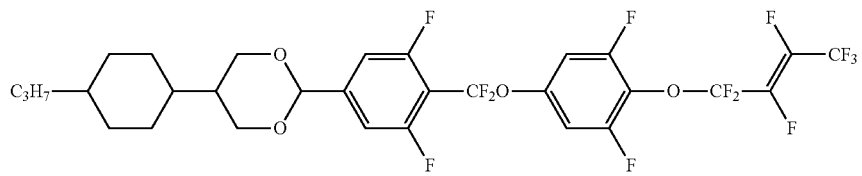
1-3-99
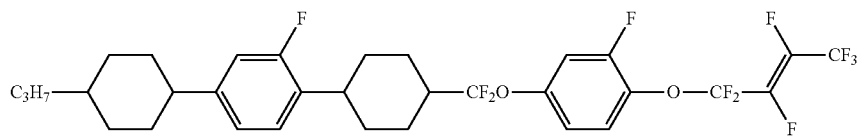
1-3-100
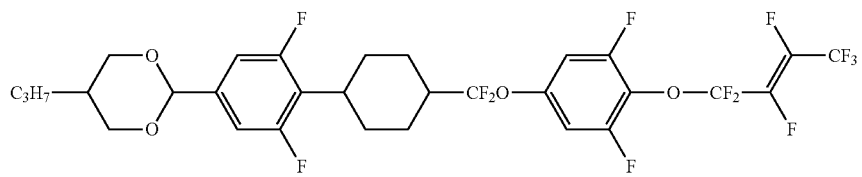
1-3-101
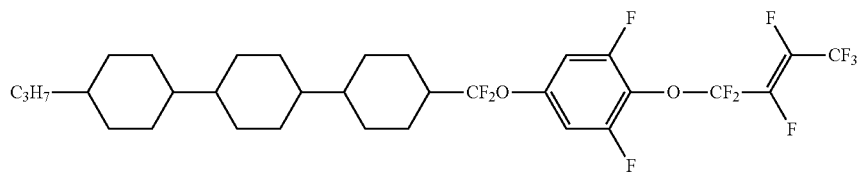
1-3-102
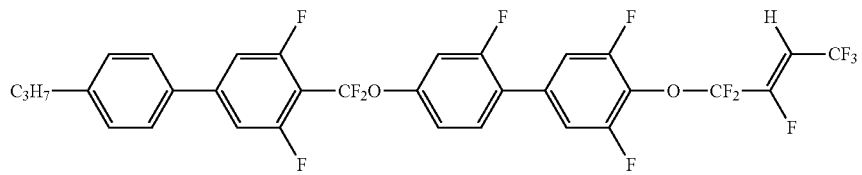
1-3-103
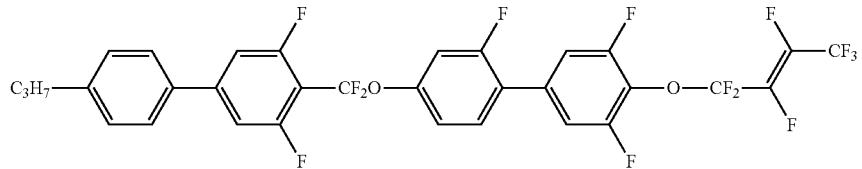
1-3-104

-continued
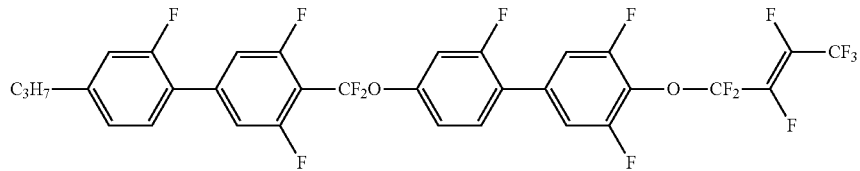
1-3-105
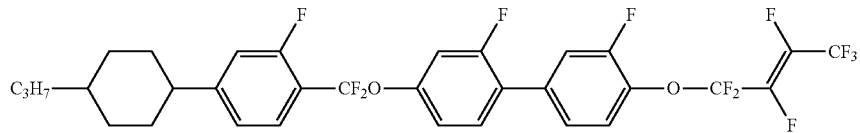
1-3-106
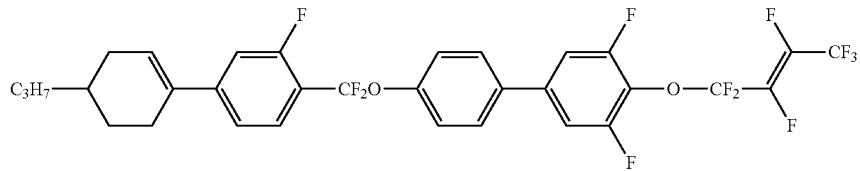
1-3-107
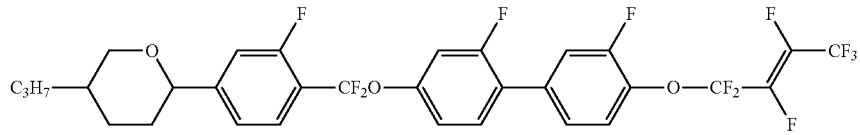
1-3-108
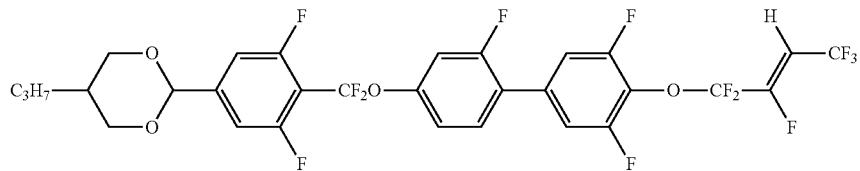
1-3-109
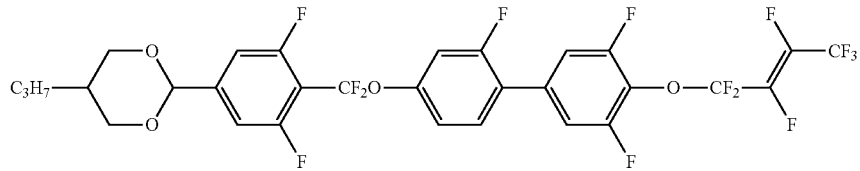
1-3-110
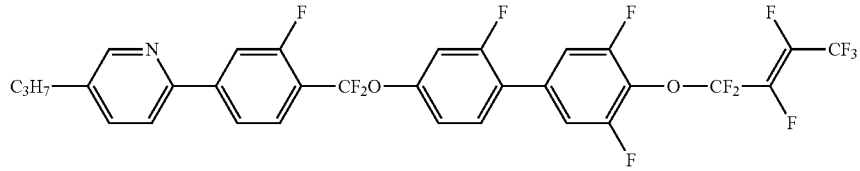
1-3-111
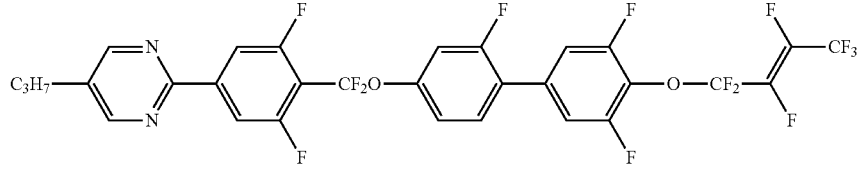
1-3-112
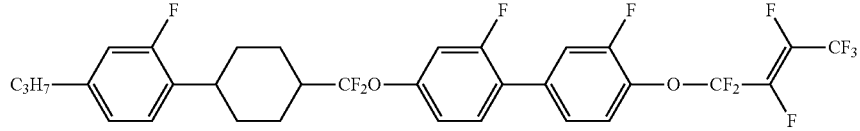
1-3-113

-continued
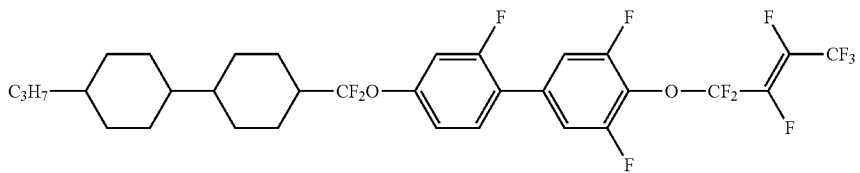
1-3-114
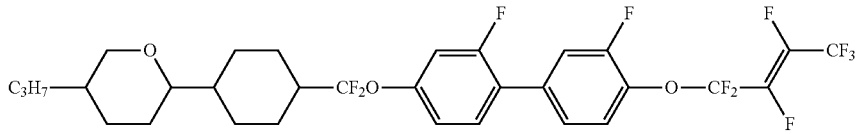
1-3-115
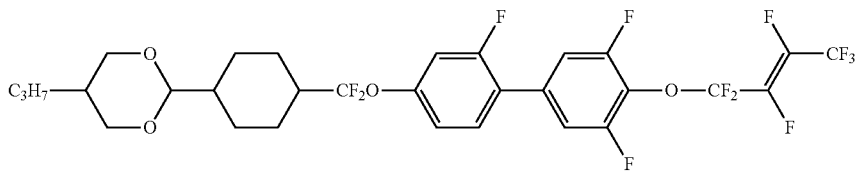
1-3-116
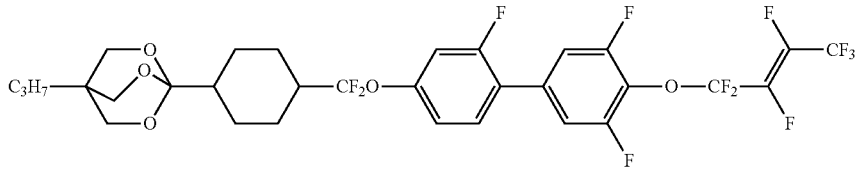
1-3-117
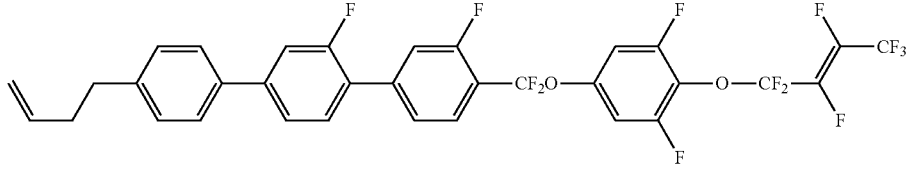
1-3-118
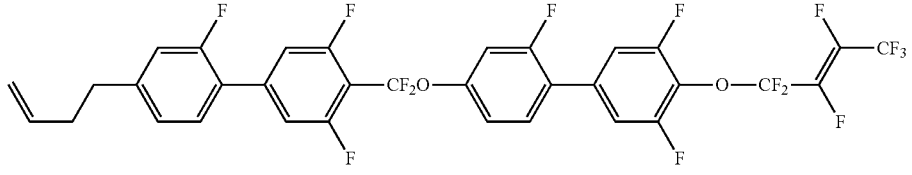
1-3-119
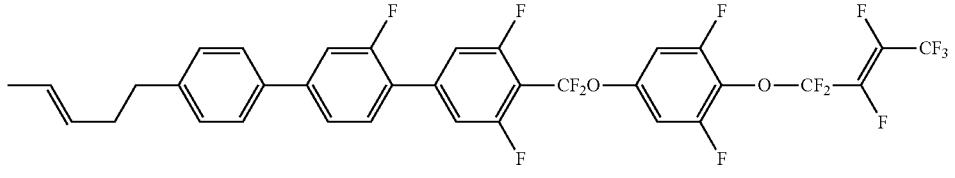
1-3-120
Formula 44
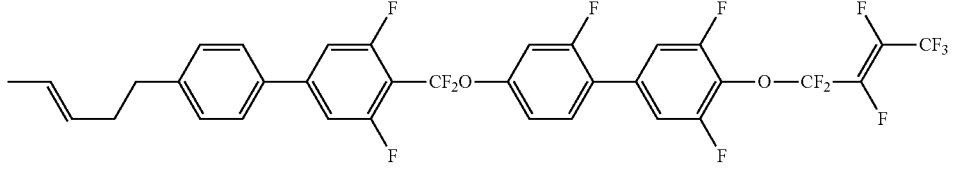
1-3-121
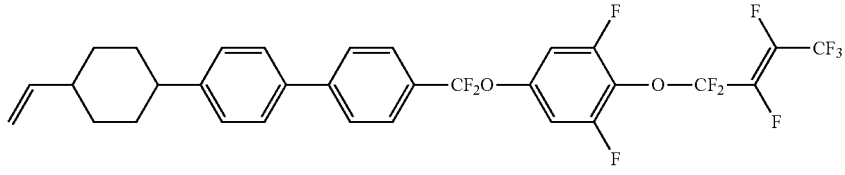
1-3-122

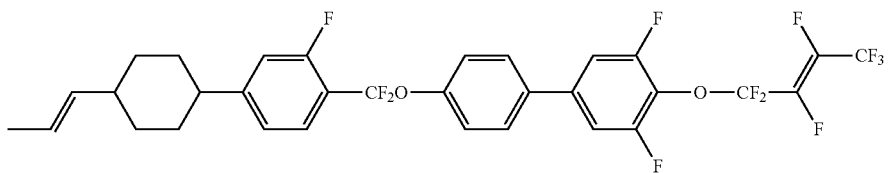
1-3-123
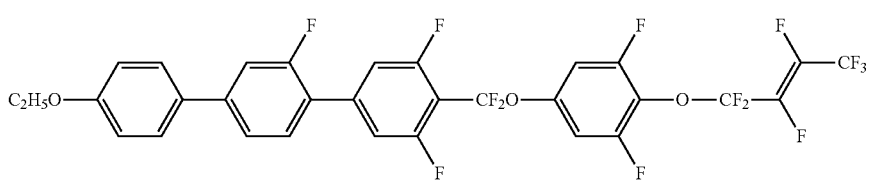
1-3-124
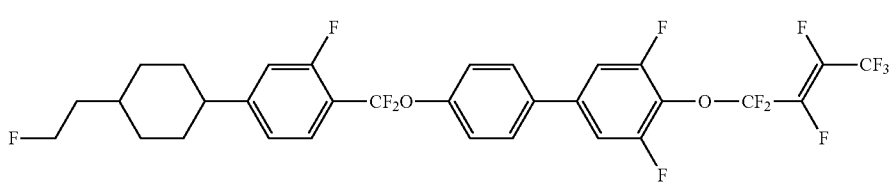
1-3-125
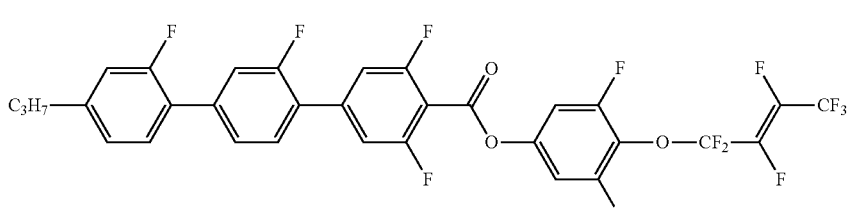
1-3-126
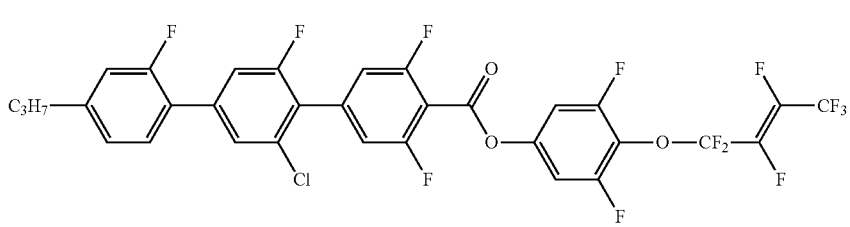
1-3-127
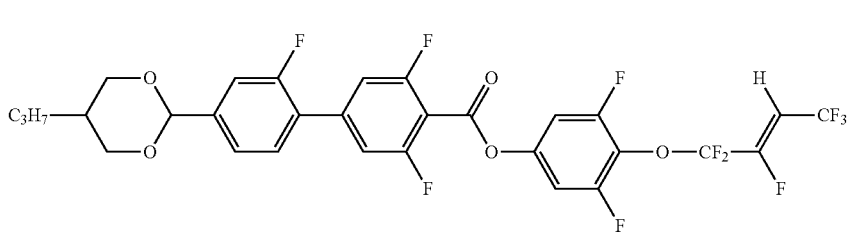
1-3-128
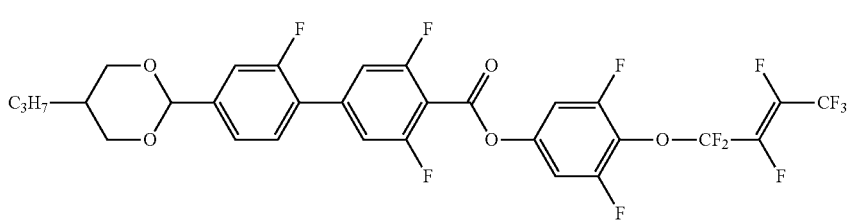
1-3-129
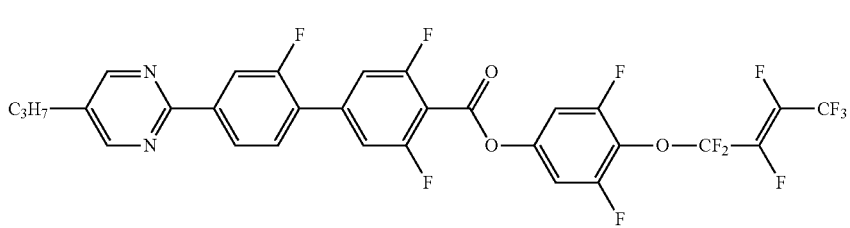
1-3-130

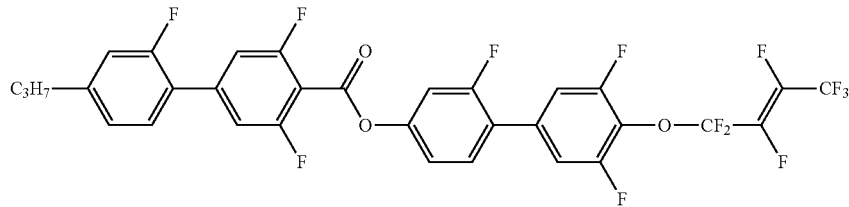
1-3-131
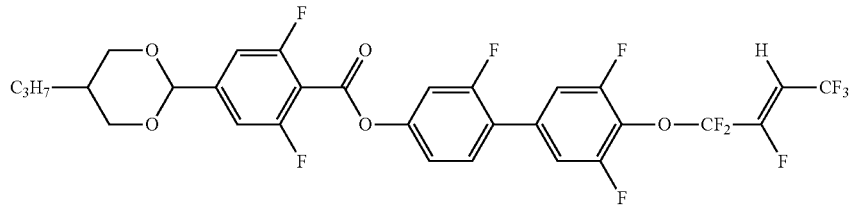
1-3-132
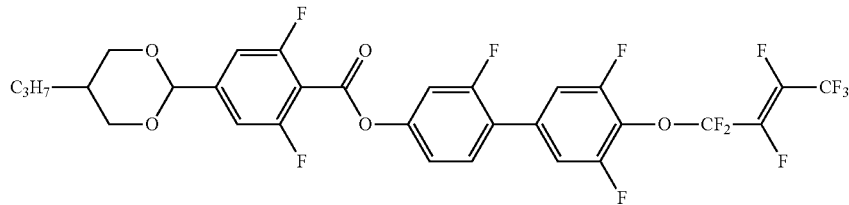
1-3-133
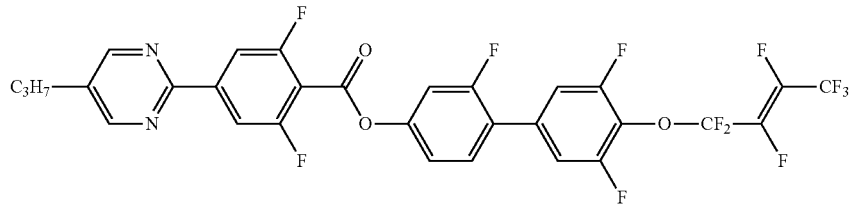
1-3-134
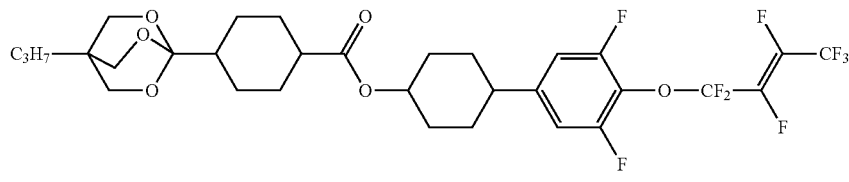
1-3-135
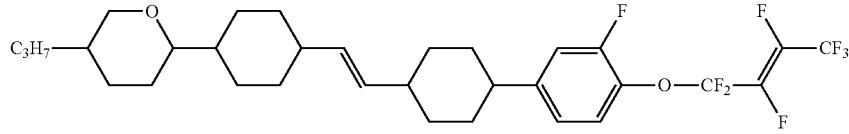
1-3-136
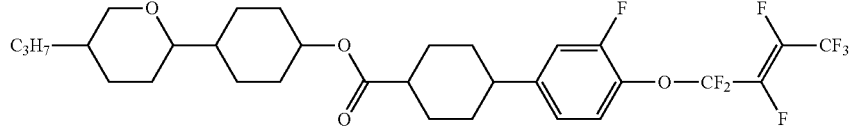
1-3-137
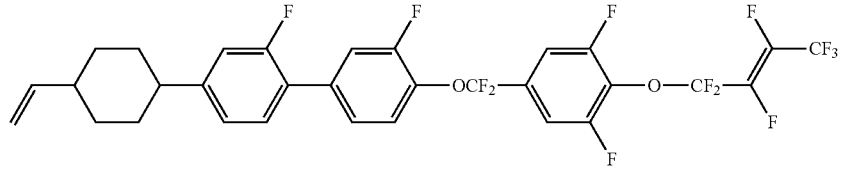
1-3-138

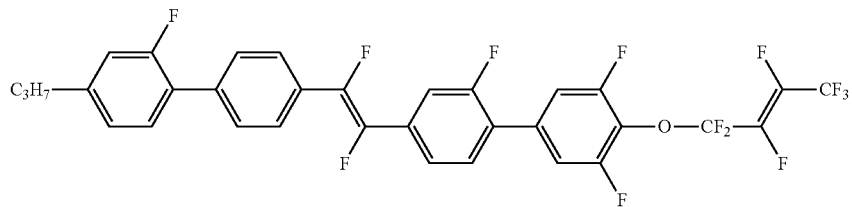
1-3-139
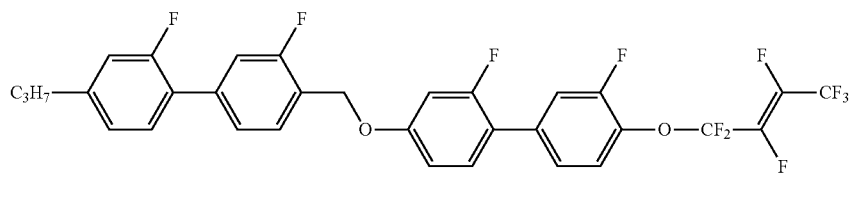
1-3-140
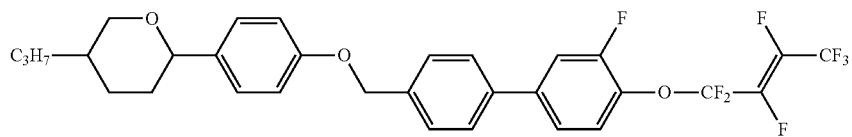
1-3-141
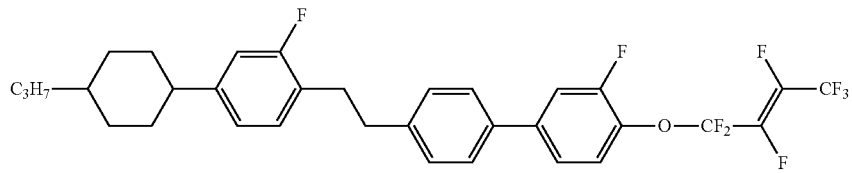
1-3-142
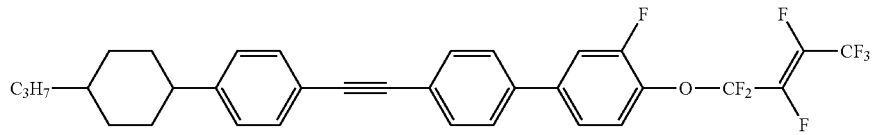
1-3-143
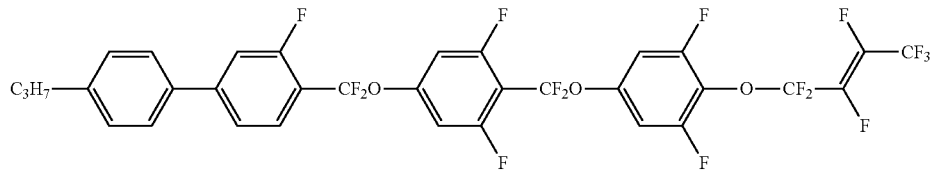
1-3-144
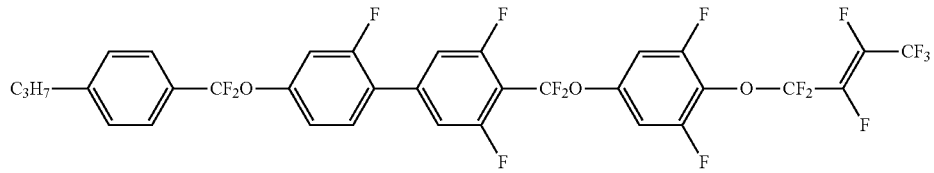
1-3-145
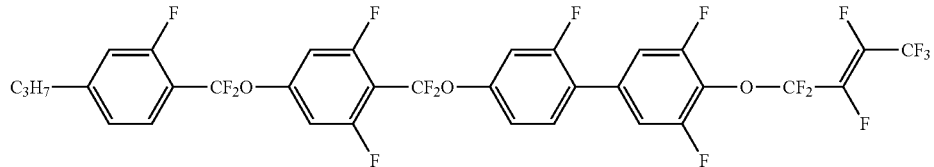
1-3-146
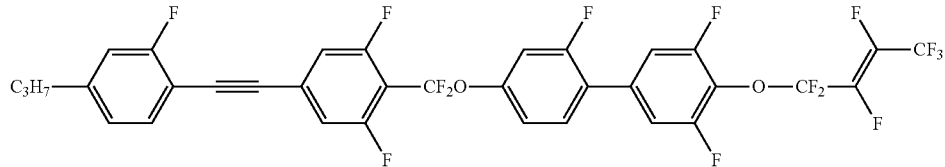
1-3-147

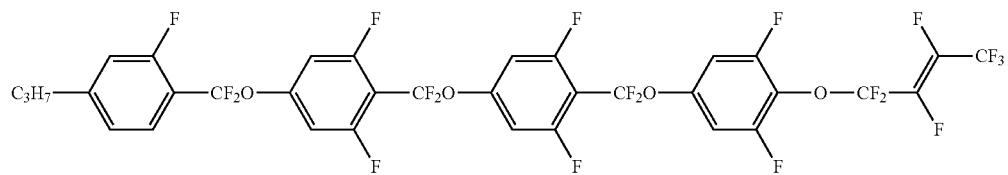
1-3-148
Formula 45
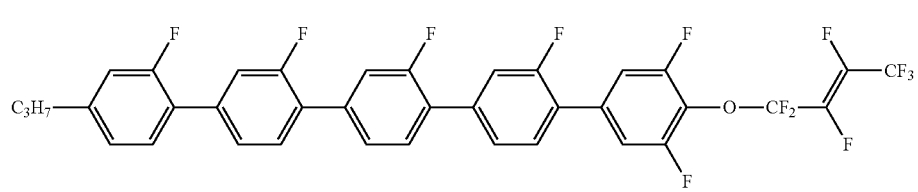
1-4-1
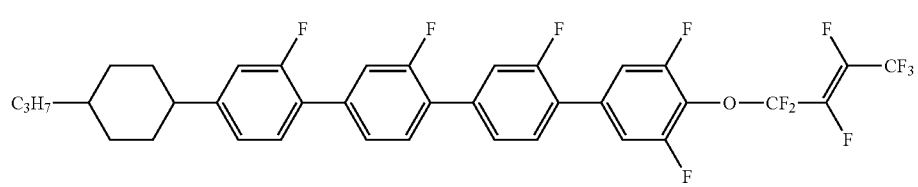
1-4-2
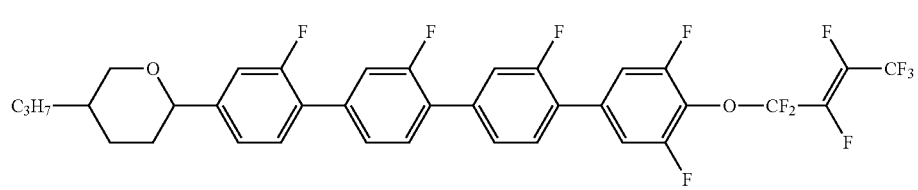
1-4-3
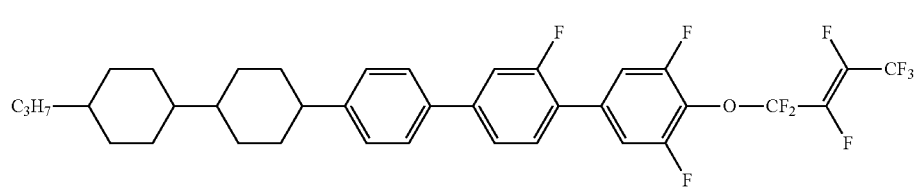
1-4-4
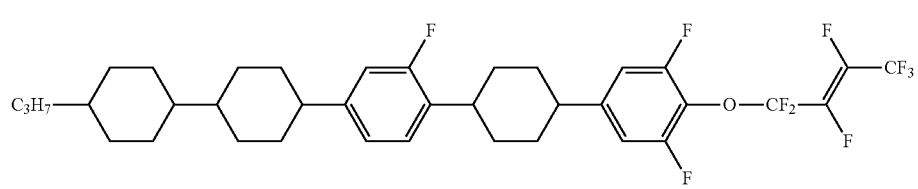
1-4-5
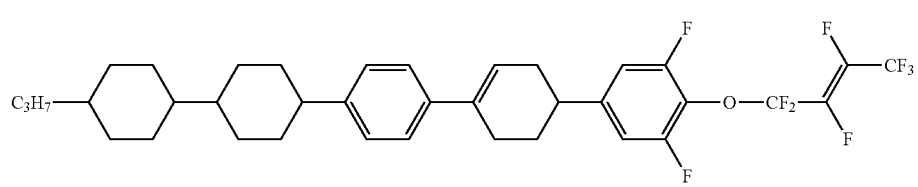
1-4-6
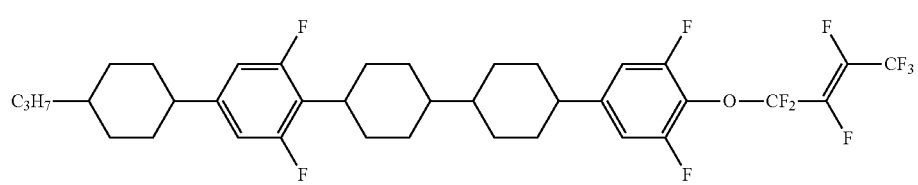
1-4-7

-continued
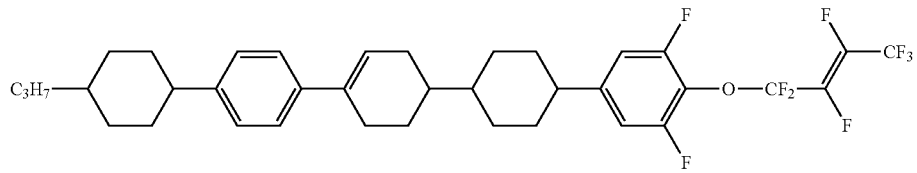
1-4-8
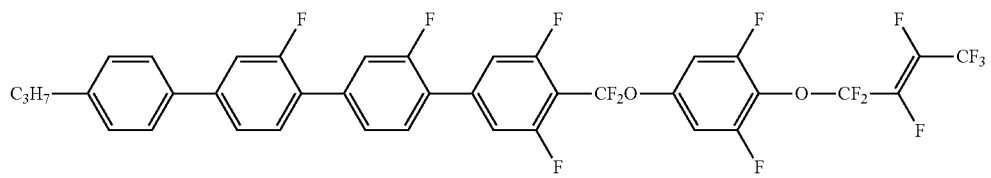
1-4-9
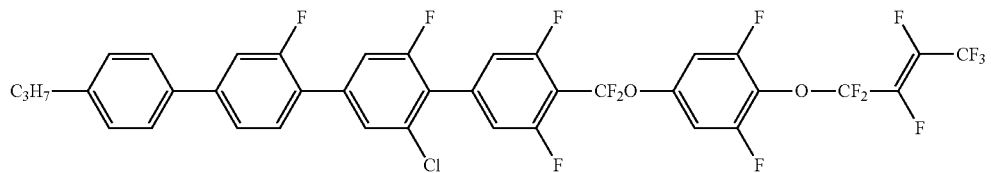
1-4-10
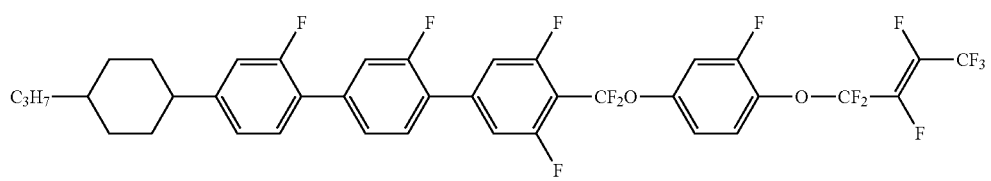
1-4-11
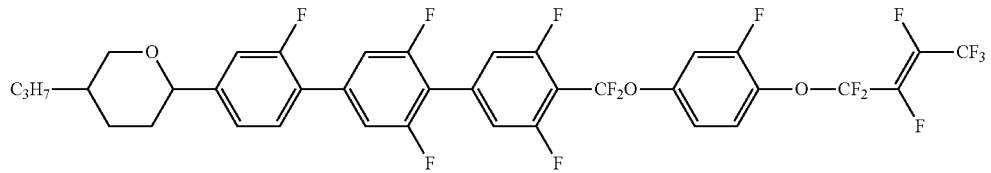
1-4-12
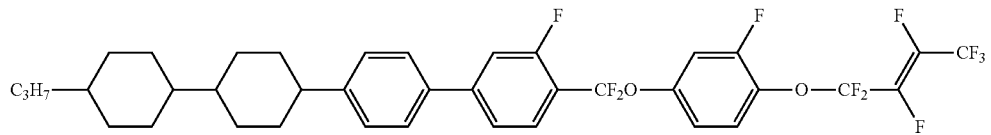
1-4-13
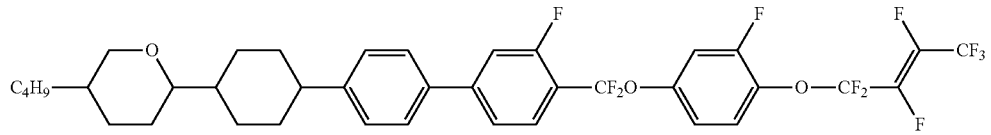
1-4-14
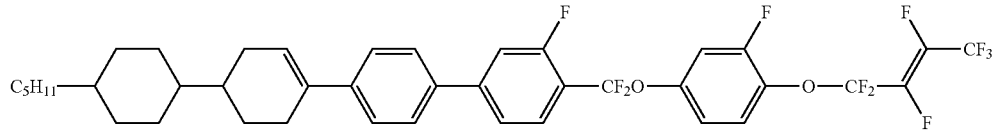
1-4-15
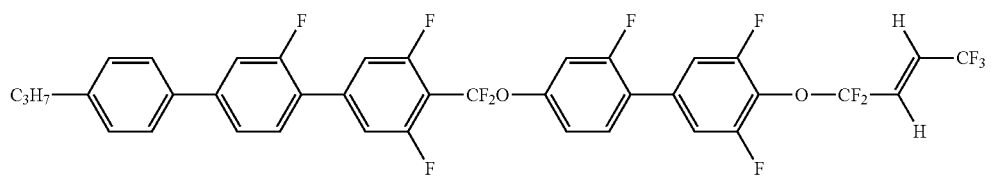
1-4-16

-continued
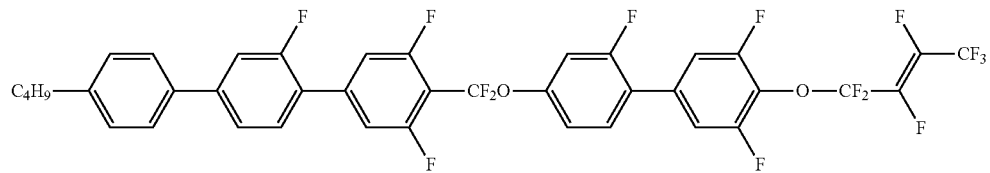
1-4-17
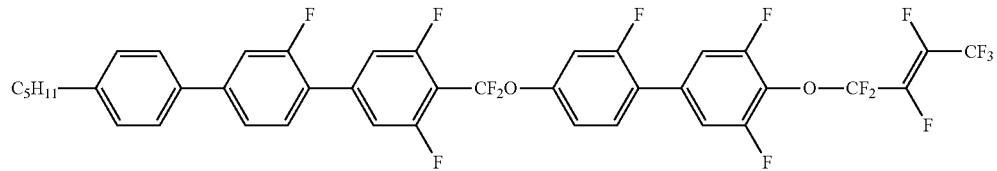
1-4-18
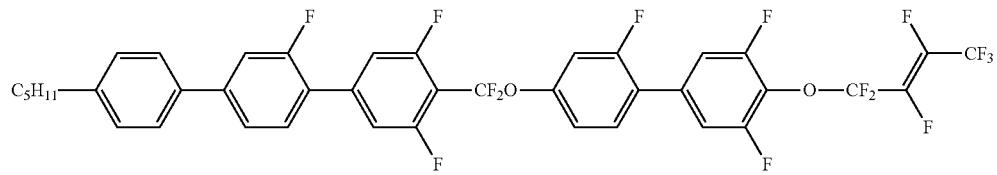
1-4-19
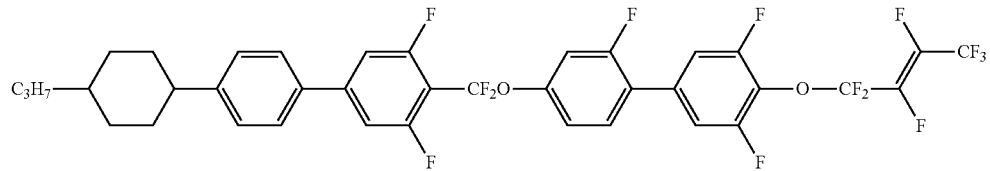
1-4-20
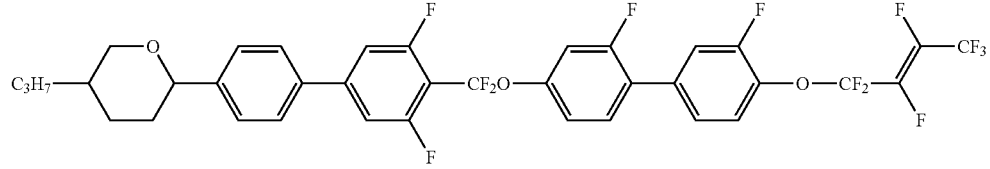
1-4-21
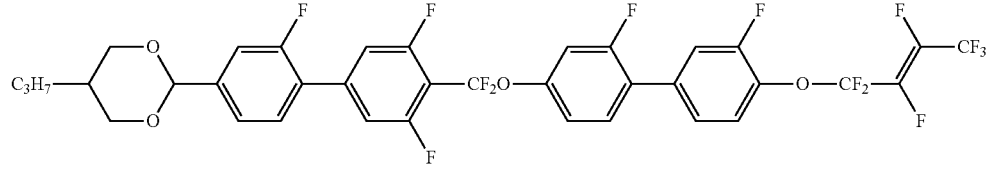
1-4-22
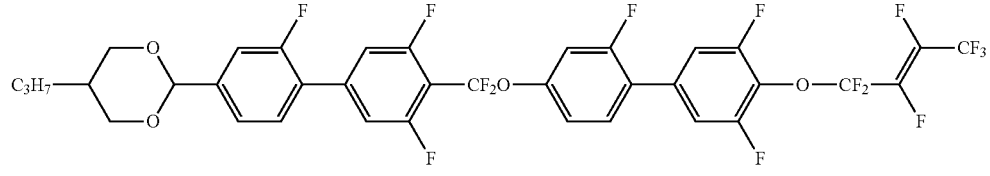
1-4-23
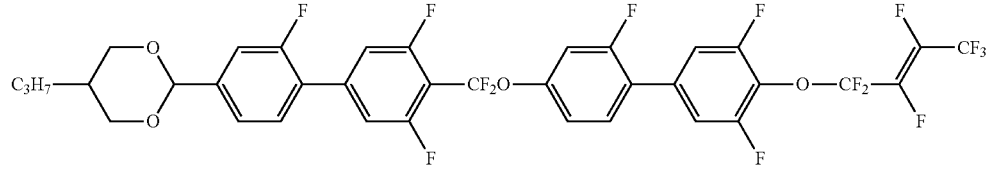
1-4-24
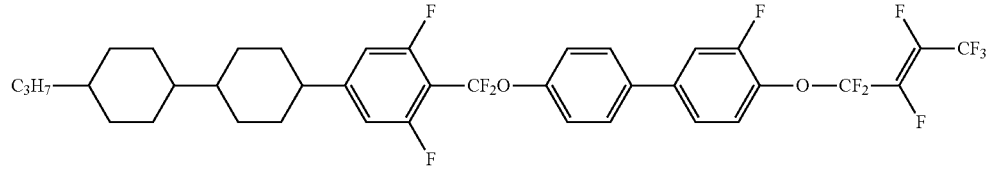
1-4-25

-continued
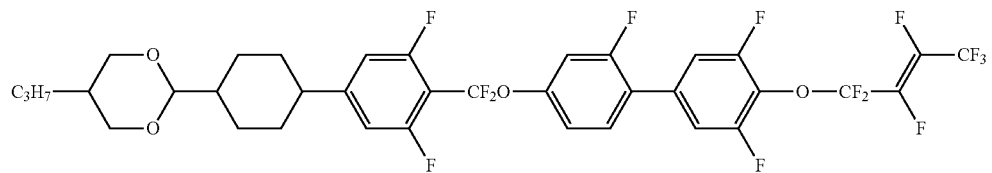
1-4-26
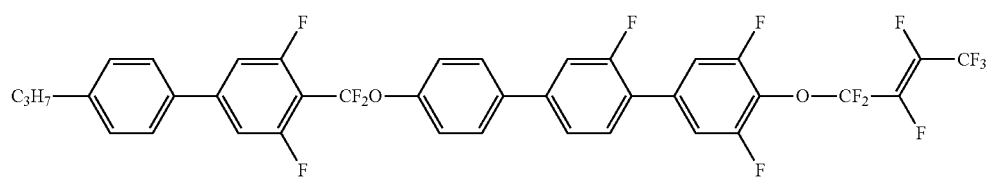
1-4-27
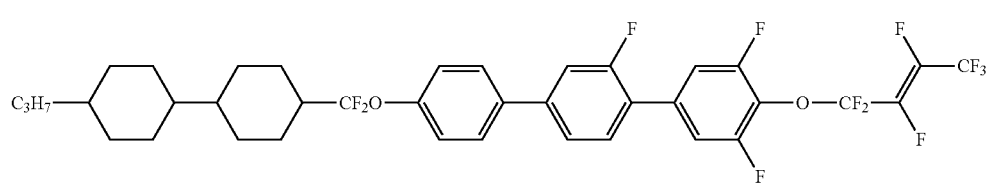
1-4-28
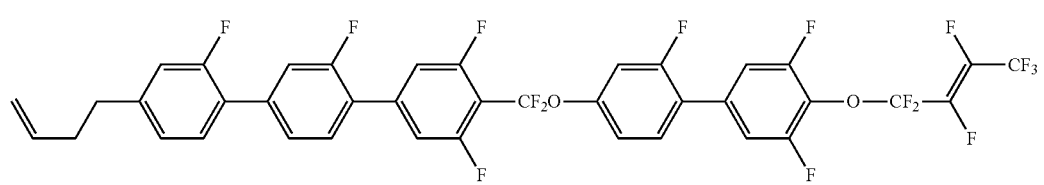
1-4-29
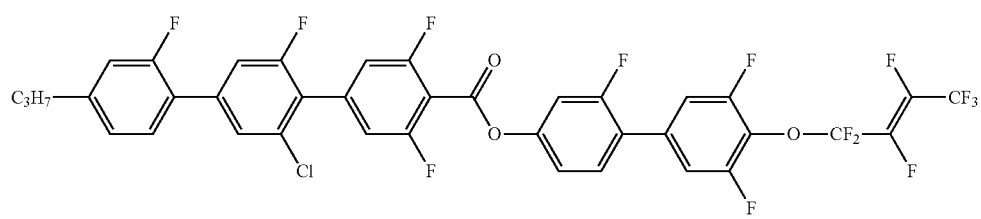
1-4-30
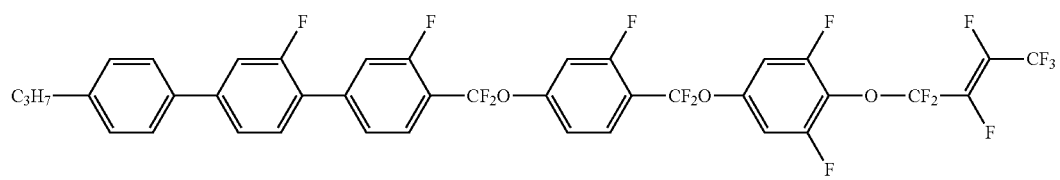
1-4-31
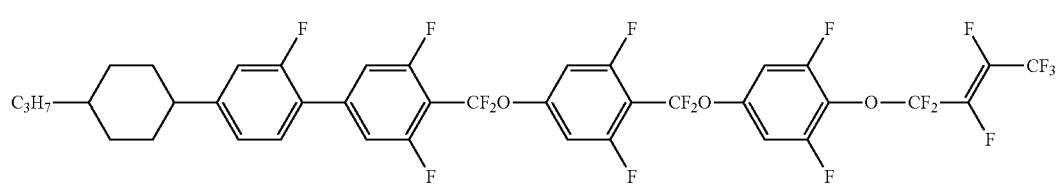
1-4-32
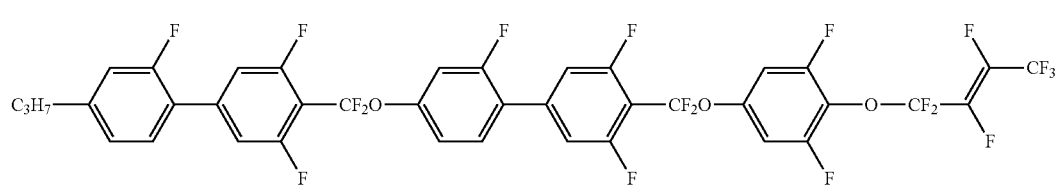
1-4-33

-continued

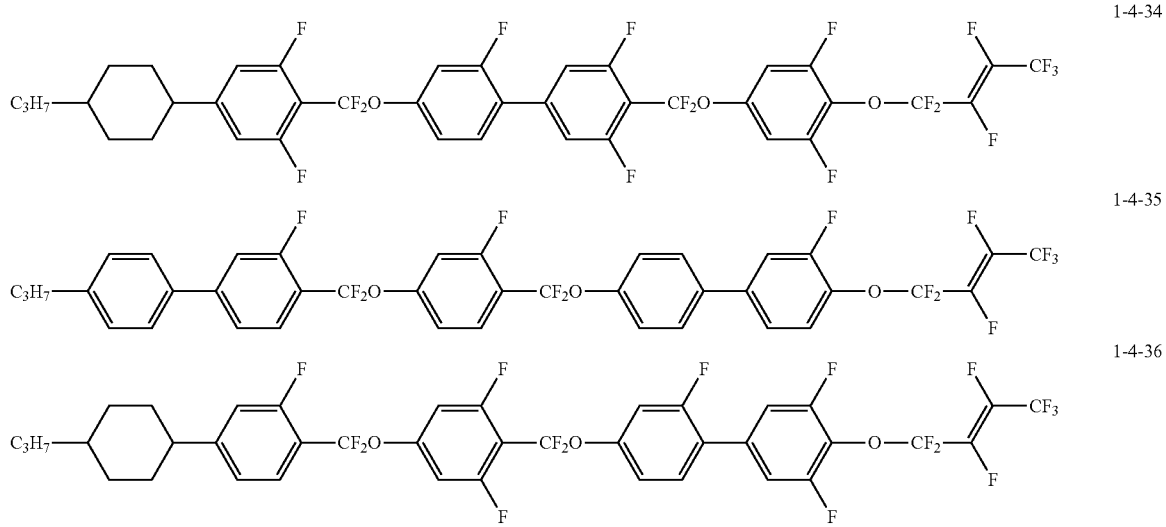

Comparative Example 1

As a comparative compound, compound (S-1) was prepared. Compound (S-1) is described in JP 2007-277127 A, and has a perfluoroallyloxy group.

Formula 46

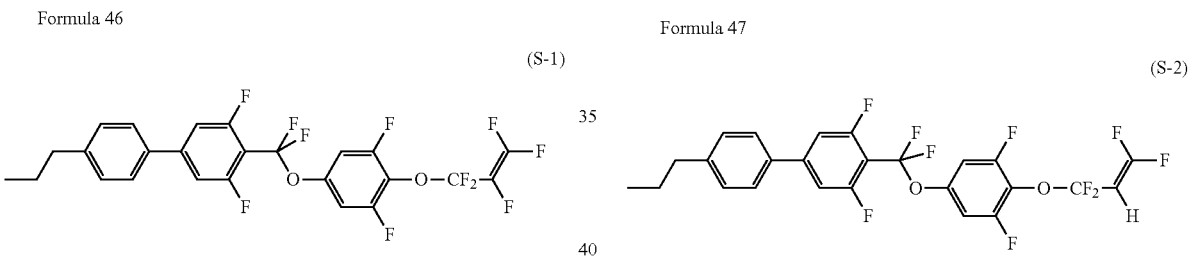

$^1$H-NMR (CDCl$_3$) δ 7.50-7.48 (m, 2H), 7.30-7.29 (m, 2H), 7.23-7.21 (m, 2H), 7.03-7.00 (m, 2H), 2.66-2.63 (m, 2H), 1.68 (sex, 2H), 0.97 (t, 3H).

$^{19}$F-NMR (CDCl$_3$) δ−62.10 (t, 2F), −72.34−−72.48 (m, 2F), −92.47−−92.70 (m, 1F), −105.16−−105.61 (m, 1F), −111.05−−111.19 (m, 2F), −122.43−−122.50 (m, 2F), −189.35−−189.74 (m, 1F).

Physical properties of compound (S-1) were as described below. Phase transition temperature: C 45.8 N 46.8 I; maximum temperature (NI)=38.4° C.; dielectric anisotropy (Δε)=22.8; optical anisotropy (Δn)=0.130; viscosity (η)=33.5 mPa·s.

Further, as another comparative compound, compound (S-2) was prepared. Compound (S-2) is described in JP 2015-129540 A, and has a 1,1,3,3-tetrafluoroallyloxy group.

Formula 47

$^1$H-NMR (CDCl$_3$) δ 7.50-7.48 (m, 2H), 7.30-7.29 (m, 2H), 7.22-7.20 (m, 2H), 6.99-6.98 (m, 2H), 5.00-4.93 (m, 1H), 2.66-2.63 (m, 2H), 1.68 (sex, 2H), 0.97 (t, 3H).

$^{19}$F-NMR (CDCl$_3$) δ−62.07 (t, 2F), −62.88−−63.01 (m, 2F), −71.77−−71.92 (m, 1F), −77.21−−77.28 (m, 1F), −111.08−−111.22 (m, 2F), −122.42−−122.49 (m, 2F).

Physical properties of compound (S-2) were as described below. Phase transition temperature: C 52.5 I; maximum temperature (NI)=39.0° C.; dielectric anisotropy (Δε)=16.2; optical anisotropy (Δn)=0.150; viscosity (η)=35.5 mPa·s.

TABLE 1

Table 1 Physical properties of compound (No. 1-2-57) and comparative compounds (S-1) and (S-2)

| | | Dielectric anisotropy (Δε) | Change in heating current values (dH) |
|---|---|---|---|
| | Compound (No. 1-2-57) | 26.1 | 0.10 |

TABLE 1-continued

Table 1 Physical properties of compound (No. 1-2-57) and comparative compounds (S-1) and (S-2)

| Structure | Compound | Dielectric anisotropy ($\Delta\epsilon$) | Change in heating current values (dH) |
|---|---|---|---|
| 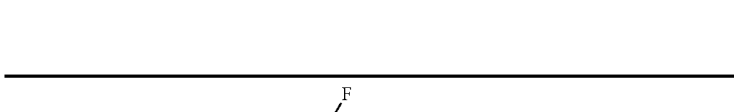 | Compound (S-1) | 22.8 | 5.53 |
| 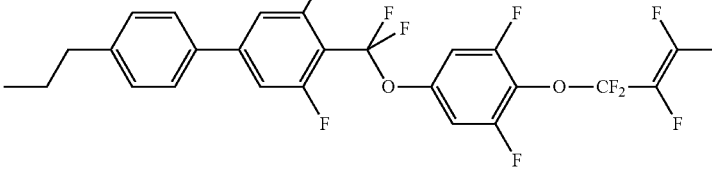 | Compound (S-2) | 16.2 | 0.09 |

Physical properties of compound (No. 1-2-57) in Example 1 and comparative compounds (S-1) and (S-2) were summarized in Table 1. Table 1 shows that compound (No. 1-2-57) is superb in larger dielectric anisotropy in comparison with comparative compounds (S-1) and (S-2), and also is superb in stability to heat in view of a smaller change in heating current values in comparison with comparative compound (S-1).

2. Examples of Compositions

The composition of the invention will be described in detail by way of Examples. The invention includes a mixture of a composition in Use Example 1 and a composition in Use Example 2. The invention also includes a mixture of at least two compositions in Use Examples 1 to 11. Compounds in Use Examples were expressed using symbols according to definitions described in Table 2 below. In Table 2, a configuration of 1,4-cyclohexylene is trans. Parenthesized numbers described after the symbols in Use Examples represent formulas to which the compounds belong. A symbol (-) means other liquid crystal compounds different from compounds (2) to (15). A proportion (percentage) of the liquid crystal compound is expressed in terms of weight percent (% by weight) based on the weight of the liquid crystal composition. Values of physical properties of the composition were summarized in a last part. The physical properties were measured in accordance with the methods described above, and measured values were directly described (without extrapolation).

TABLE 2

Table 2 Method for Description of Compounds using Symbols
R—(A$_1$)—Z$_1$— . . . —Z$_n$—(A$_n$)—R'

| 1) Left-terminal Group R— | Symbol |
|---|---|
| FC$_n$H$_{2n}$— | Fn— |
| C$_n$H$_{2n+1}$— | n— |
| C$_n$H$_{2n+1}$O— | nO— |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |
| CF$_2$=CH— | VFF— |
| CF$_2$=CH—C$_n$H$_{2n}$— | VFFn— |

| 2) Right-terminal Group —R' | Symbol |
|---|---|
| —C$_n$H$_{2n+1}$ | —n |
| —OC$_n$H$_{2n+1}$ | —On |
| —COOCH$_3$ | —EMe |
| —CH=CH$_2$ | —V |
| —CH=CH—C$_n$H$_{2n+1}$ | —Vn |
| —C$_n$H$_{2n}$—CH=CH$_2$ | —nV |
| —C$_m$H$_{2m}$—CH=CH—C$_n$H$_{2n+1}$ | —mVn |
| —CH=CF$_2$ | —VFF |
| —F | —F |
| —Cl | —CL |
| —OCF$_3$ | —OCF3 |

TABLE 2-continued
Table 2 Method for Description of Compounds using Symbols
R—(A$_1$)—Z$_1$— . . . —Z$_n$—(A$_n$)—R'
| | |
|---|---|
| —OCF$_2$H | —OCF2H |
| —CF$_3$ | —CF3 |
| —OCF$_2$—CF=CF—CF$_3$ | —OCF2FVFCF3 |
| —C≡N | —C |
| 3) Bonding Group —Z$_n$— | Symbol |
|---|---|
| —C$_n$H$_{2n}$— | n |
| —COO— | E |
| —CH=CH— | V |
| —CH$_2$O— | 1O |
| —OCH$_2$— | O1 |
| —CF$_2$O— | X |
| —C≡C— | T |
| 4) Ring Structure —A$_n$— | Symbol |
|---|---|
|  | H |
|  | B |
| 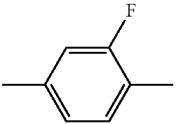 | B(F) |
| 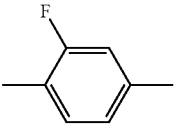 | B(2F) |
| 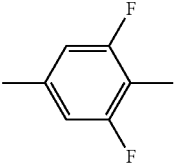 | B(F,F) |
| 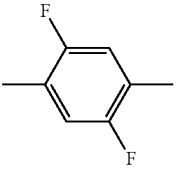 | B(2F,5F) |
|  | B(2F,3F) |
| 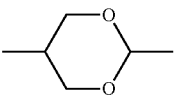 | G |
| 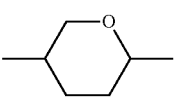 | dh |

TABLE 2-continued
Table 2 Method for Description of Compounds using Symbols
R—(A₁)—Z₁— . . . —Zₙ—(Aₙ)—R'
  Dh
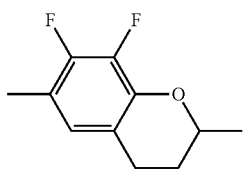  Cro
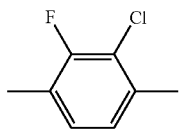  B(2F,3CL)
5) Examples of Description
Example 1. 3-BB(F,F)XB(F,F)—OCF2FVFCF3
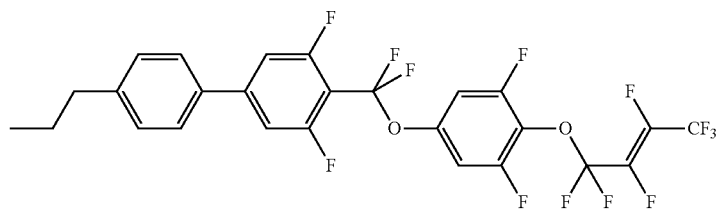 [SMILES: CCCc1ccc(-c2cc(F)c(C(F)(F)Oc3cc(F)c(OC(F)(F)/C(F)=C(\F)C(F)(F)F)c(F)c3)c(F)c2)cc1]
Example 2. 3-HBB(F,F)—F
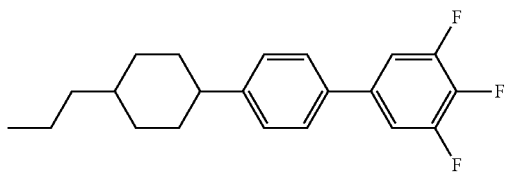 [SMILES: CCCC1CCC(c2ccc(-c3cc(F)c(F)c(F)c3)cc2)CC1]
Example 3. 3-HH-4
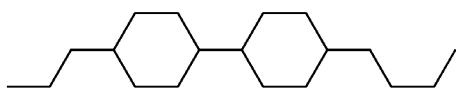 [SMILES: CCCCC1CCC(C2CCC(CCC)CC2)CC1]
Example 4. 3-HBB(2F,3F)—O2
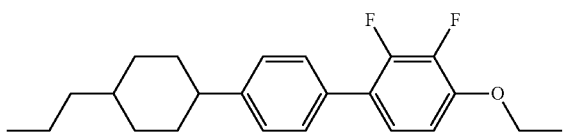 [SMILES: CCCC1CCC(c2ccc(-c3ccc(OCC)c(F)c3F)cc2)CC1]
Use Example 1
| | | |
|---|---|---|
| 3-BB(F,F)XB(F,F)-OCF2FVFCF3 | (1-2-57) | 5% |
| 2-HB-C | (8-1) | 5% |
| 3-HB-C | (8-1) | 12% |
| 3-HB-O2 | (2-5) | 10% |
| 2-BTB-1 | (2-10) | 3% |
| 3-HHB-F | (6-1) | 4% |
| 3-HHB-1 | (3-1) | 8% |
| 3-HHB-O1 | (3-1) | 5% |
-continued
| | | |
|---|---|---|
| 3-HHB-3 | (3-1) | 14% |
| 3-HHEB-F | (6-10) | 4% |
| 5-HHEB-F | (6-10) | 4% |
| 2-HHB(F)-F | (6-2) | 7% |
| 3-HHB(F)-F | (6-2) | 7% |
| 5-HHB(F)-F | (6-2) | 7% |
| 3-HHB(F,F)-F | (6-3) | 5% |
NI = 101.0° C.; η = 20.8 mPa · s; Δn = 0.103; Δε = 5.8.

Use Example 2

| | | |
|---|---|---|
| 3-BB(F)B(F,F)-OCF2FVFCF3 | (1-2-5) | 5% |
| 7-HB(F,F)-F | (5-4) | 4% |
| 3-HB-O2 | (2-5) | 6% |
| 2-HHB(F)-F | (6-3) | 10% |
| 3-HHB(F)-F | (6-3) | 10% |
| 5-HHB(F)-F | (6-3) | 10% |
| 2-HBB(F)-F | (6-23) | 9% |
| 3-HBB(F)-F | (6-23) | 8% |
| 5-HBB(F)-F | (6-23) | 14% |
| 2-HBB-F | (6-22) | 4% |
| 3-HBB-F | (6-22) | 4% |
| 5-HBB-F | (6-22) | 4% |
| 3-HBB(F,F)-F | (6-24) | 4% |
| 5-HBB(F,F)-F | (6-24) | 8% |

NI = 85.1° C.; η = 26.1 mPa · s; Δn = 0.118; Δε = 6.1.

Use Example 3

| | | |
|---|---|---|
| 3-HHB-OCF2FVFCF3 | (1-2-26) | 4% |
| 3-HHB(F,F)-F | (6-3) | 9% |
| 3-H2HB(F,F)-F | (6-15) | 8% |
| 4-H2HB(F,F)-F | (6-15) | 8% |
| 5-H2HB(F,F)-F | (6-15) | 10% |
| 3-HBB(F,F)-F | (6-24) | 18% |
| 5-HBB(F,F)-F | (6-24) | 20% |
| 3-H2BB(F,F)-F | (6-27) | 8% |
| 5-HHBB(F,F)-F | (7-6) | 3% |
| 5-HHEBB-F | (7-17) | 2% |
| 3-HH2BB(F,F)-F | (7-15) | 4% |
| 1O1-HBBH-4 | (4-1) | 3% |
| 1O1-HBBH-5 | (4-1) | 3% |

NI = 98.6° C.; η = 34.0 mPa · s; Δn = 0.114; Δε = 8.8.

A pitch when Op-05 was added to the composition in a proportion of 0.25% by weight was 63.5 μm.

Use Example 4

| | | |
|---|---|---|
| 5-BB(F)B(F,F)XB(F,F)-OCF2FVFC3 | (1-3-74) | 3% |
| 5-HB-F | (5-2) | 12% |
| 6-HB-F | (5-2) | 9% |
| 7-HB-F | (5-2) | 7% |
| 2-HHB-OCF3 | (6-1) | 6% |
| 3-HHB-OCF3 | (6-1) | 6% |
| 4-HHB-OCF3 | (6-1) | 7% |
| 5-HHB-OCF3 | (6-1) | 5% |
| 3-HH2B-OCF3 | (6-4) | 4% |
| 5-HH2B-OCF3 | (6-4) | 4% |
| 3-HHB(F,F)-OCF2H | (6-3) | 4% |
| 3-HHB(F,F)-OCF3 | (6-3) | 4% |
| 3-HH2B(F)-F | (6-5) | 3% |
| 3-HBB(F)-F | (6-23) | 10% |
| 5-HBB(F)-F | (6-23) | 10% |
| 5-HBBH-3 | (4-1) | 3% |
| 3-HB(F)BH-3 | (4-2) | 3% |

Use Example 5

| | | |
|---|---|---|
| 3-GB(F,F)XB(F,F)-OCF2FVFCF3 | (1-2-72) | 4% |
| 3-HB-CL | (5-2) | 6% |
| 5-HB-CL | (5-2) | 4% |
| 3-HHB-OCF3 | (6-1) | 5% |
| 3-H2HB-OCF3 | (6-13) | 4% |
| 5-H4HB-OCF3 | (6-19) | 15% |
| V-HHB(F)-F | (6-2) | 5% |
| 3-HHB(F)-F | (6-2) | 5% |
| 5-HHB(F)-F | (6-2) | 4% |
| 3-H4HB(F,F)-CF3 | (6-21) | 6% |
| 5-H4HB(F,F)-CF3 | (6-21) | 10% |
| 5-H2HB(F,F)-F | (6-15) | 5% |
| 5-H4HB(F,F)-F | (6-21) | 7% |
| 2-H2BB(F)-F | (6-26) | 5% |
| 3-H2BB(F)-F | (6-26) | 10% |
| 3-HBEB(F,F)-F | (6-39) | 5% |

Use Example 6

| | | |
|---|---|---|
| 3-dhB-OCF2FVFCF3 | (1-1-13) | 5% |
| 3-HB-O1 | (2-5) | 15% |
| 3-HH-4 | (2-1) | 5% |
| 3-HB(2F,3F)-O2 | (9-1) | 11% |
| 5-HB(2F,3F)-O2 | (9-1) | 11% |
| 2-HHB(2F,3F)-1 | (10-1) | 11% |
| 3-HHB(2F,3F)-1 | (10-1) | 11% |
| 3-HHB(2F,3F)-O2 | (10-1) | 11% |
| 5-HHB(2F,3F)-O2 | (10-1) | 13% |
| 3-HHB-1 | (3-1) | 7% |

Use Example 7

| | | |
|---|---|---|
| V-HHB-OCF2FVFCF3 | (1-2-41) | 5% |
| 2-HH-5 | (2-1) | 3% |
| 3-HH-4 | (2-1) | 14% |
| 3-HH-5 | (2-1) | 4% |
| 3-HB-O2 | (2-5) | 11% |
| 5-HB-O2 | (2-5) | 3% |
| 3-H2B(2F,3F)-O2 | (9-4) | 15% |
| 5-H2B(2F,3F)-O2 | (9-4) | 12% |
| 3-HHB(2F,3CL)-O2 | (10-12) | 4% |
| 2-HBB(2F,3F)-O2 | (10-7) | 3% |
| 3-HBB(2F,3F)-O2 | (10-7) | 8% |
| 5-HBB(2F,3F)-O2 | (10-7) | 9% |
| 3-HHB-1 | (3-1) | 3% |
| 3-HHB-3 | (3-1) | 3% |
| 3-HHB-O1 | (3-1) | 3% |

Use Example 8

| | | |
|---|---|---|
| 3-BB(F,F)XB(F,F)-OCF2FVFCF3 | (1-2-57) | 5% |
| 2-HH-3 | (2-1) | 21% |
| 3-HH-4 | (2-1) | 9% |
| 1-BB-3 | (2-8) | 9% |
| 3-HB-O2 | (2-5) | 2% |
| 3-BB(2F,3F)-O2 | (9-3) | 7% |
| 5-BB(2F,3F)-O2 | (9-3) | 6% |
| 2-HH1OB(2F,3F)-O2 | (10-5) | 13% |
| 3-HH1OB(2F,3F)-O2 | (10-5) | 20% |
| 3-HHB-1 | (3-1) | 3% |
| 3-HHB-O1 | (3-1) | 3% |
| 5-B(F)BB-2 | (3-8) | 2% |

NI = 71.4° C.; η = 16.3 mPa · s; Δn = 0.097; Δε = −3.0.

Use Example 9

| | | |
|---|---|---|
| 3-BB(F)B(F,F)-OCF2FVFCF3 | (1-2-5) | 5% |
| 3-HHB-OCF2FVFCF3 | (1-2-16) | 4% |
| 2-HH-3 | (2-1) | 13% |
| 7-HB-1 | (2-5) | 10% |
| 5-HB-O2 | (2-5) | 8% |
| 3-HB(2F,3F)-O2 | (9-1) | 16% |
| 5-HB(2F,3F)-O2 | (9-1) | 15% |
| 3-HHB(2F,3CL)-O2 | (10-12) | 3% |
| 4-HHB(2F,3CL)-O2 | (10-12) | 3% |
| 5-HHB(2F,3CL)-O2 | (10-12) | 3% |
| 3-HH1OCro(7F,8F)-5 | (13-6) | 3% |
| 3-HHB-1 | (3-1) | 3% |
| 5-HBB(F)B-2 | (4-5) | 6% |
| 5-HBB(F)B-3 | (4-5) | 8% |

NI = 72.3° C.; η = 21.8 mPa · s; Δn = 0.102; Δε = −2.3.

Use Example 10

| | | |
|---|---|---|
| 5-BB(F)B(F,F)XB(F,F)-OCF2FVFCF3 | (1-3-74) | 3% |
| 3-GB(F,F)XB(F,F)-OCF2FVFCF3 | (1-2-72) | 5% |
| 1-BB-3 | (2-8) | 10% |
| 3-HH-V | (2-1) | 24% |
| 3-BB(2F,3F)-O2 | (9-3) | 13% |
| 2-HH1OB(2F,3F)-O2 | (10-5) | 20% |
| 3-HH1OB(2F,3F)-O2 | (10-5) | 12% |
| 3-HHB-1 | (3-1) | 8% |
| 5-B(F)BB-2 | (3-8) | 5% |

Use Example 11

| | | |
|---|---|---|
| 3-dhB-OCF2FVFCF3 | (1-1-13) | 4% |
| 2-HH-3 | (2-1) | 6% |
| 3-HH-V1 | (2-1) | 10% |
| 1V2-HH-1 | (2-1) | 6% |
| 1V2-HH-3 | (2-1) | 6% |
| 3-BB(2F,3F)-O2 | (9-3) | 7% |
| 5-BB(2F,3F)-O2 | (9-3) | 4% |
| 3-H1OB(2F,3F)-O2 | (9-5) | 7% |
| 2-HH1OB(2F,3F)-O2 | (10-5) | 7% |
| 3-HH1OB(2F,3F)-O2 | (10-5) | 20% |
| 3-HDnB(2F,3F)-O2 | (10-3) | 7% |
| 3-HHB-1 | (3-1) | 3% |
| 3-HHB-3 | (3-1) | 2% |
| 2-BB(2F,3F)B-3 | (11-1) | 11% |

INDUSTRIAL APPLICABILITY

A liquid crystal compound according to the invention has larger dielectric anisotropy and superb heating reliability in comparison with a similar compound. A liquid crystal composition containing the compound can be widely utilized in a liquid crystal display device used in a personal computer, a television and so forth.

What is claimed is:

1. A liquid crystal compound, represented by formula (1):

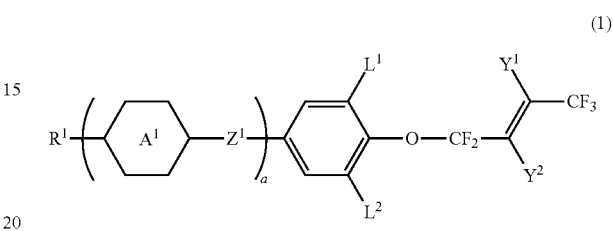

(1)

wherein, in formula (1),
$R^1$ is alkyl having 1 to 15 carbons, and in the $R^1$, at least one —$CH_2$— may be replaced by —O— or —S—, at least one —$CH_2CH_2$— may be replaced by —CH=CH— or —C≡C—, and at least one hydrogen may be replaced by halogen;

ring $A^1$ is 1,4-cyclohexylene, 1,4-cyclohexenylene, 1,4-phenylene, 1,4-phenylene in which at least one hydrogen is replaced by halogen, tetrahydropyran-2,5-diyl, 1,3-dioxane-2,5-diyl, 2,6,7-trioxabicyclo[2.2.2]octane-1,4-diyl, pyrimidine-2,5-diyl or pyridine-2,5-diyl, and at least one hydrogen directly bonded to the rings may be replaced by halogen;

$Z^1$ is a single bond, —$CH_2CH_2$—, —C≡C—, —CH=CH—, —CF=CF—, —$CF_2O$—, —$OCF_2$—, —$CH_2O$—, —$OCH_2$—, —COO— or —OCO—;

$L^1$ and $L^2$ are independently hydrogen or halogen;
$Y^1$ and $Y^2$ are independently hydrogen or halogen; and
a is 1, 2, 3 or 4.

2. The compound according to claim 1, wherein, in formula (1), $R^1$ is alkyl having 1 to 15 carbons, alkenyl having 2 to 15 carbons, alkoxy having 1 to 14 carbons or alkenyloxy having 2 to 14 carbons.

3. The compound according to claim 1, wherein, in formula (1), $Z^1$ is independently a single bond, —$CH_2CH_2$—, —C≡C—, —CH=CH—, —$CF_2O$— or —COO—.

4. The compound according to claim 1, represented by any one of formulas (1-1) to (1-4):

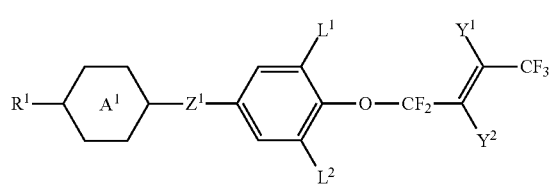

(1-1)

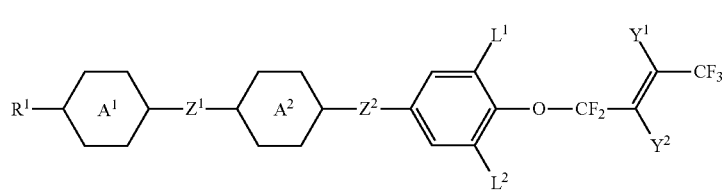

(1-2)

(1-3)
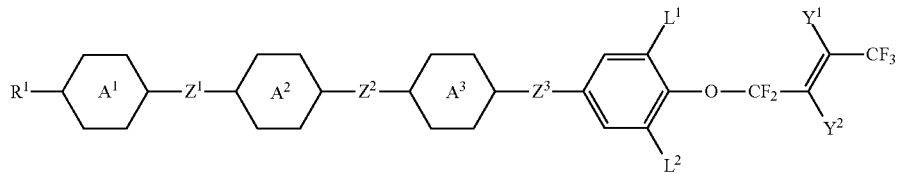

(1-4)
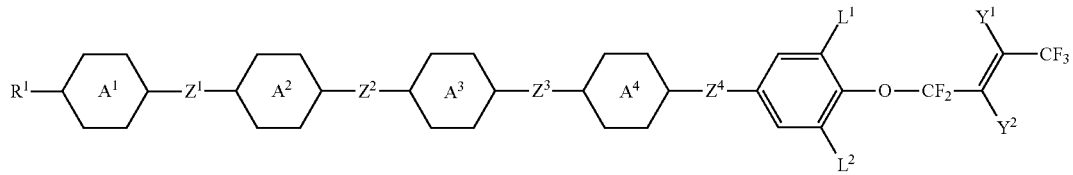

wherein, in formulas (1-1) to (1-4),
ring $A^1$, ring $A^2$, ring $A^3$ and ring $A^4$ are independently, 1,4-cyclohexylene, 1,4-phenylene, 1,4-phenylene in which at least one hydrogen is replaced by halogen, tetrahydropyran-2,5-diyl, 1,3-dioxane-2,5-diyl or 2,6,7-trioxabicyclo[2.2.2]octane-1,4-diyl;
$Z^1$, $Z^2$, $Z^3$ and $Z^4$ are independently a single bond, —CH$_2$CH$_2$—, —CH=CH—, —CF$_2$O— or —COO—;
$R^1$ is alkyl having 1 to 10 carbons or alkenyl having 2 to 10 carbons;
$L^1$ and $L^2$ are independently hydrogen, fluorine or chlorine; and
$Y^1$ and $Y^2$ are independently hydrogen, fluorine or chlorine.

5. The compound according to claim 4, wherein, in formulas (1-1) to (1-4),
ring $A^1$, ring $A^2$, ring $A^3$ and ring $A^4$ are independently 1,4-cyclohexylene, 1,4-phenylene, 1,4-phenylene in which at least one hydrogen is replaced by fluorine or chlorine, tetrahydropyran-2,5-diyl or 1,3-dioxane-2,5-diyl;
$Z^1$, $Z^2$, $Z^3$ and $Z^4$ are independently a single bond, —CH$_2$CH$_2$—, —CH=CH— or —CF$_2$O—;
$R^1$ is alkyl having 1 to 10 carbons or alkenyl having 2 to 10;
$L^1$ and $L^2$ are independently hydrogen or fluorine; and
$Y^1$ and $Y^2$ are independently hydrogen or fluorine.

6. The compound according to claim 1, represented by any one of formulas (1-5) to (1-12):

(1-5)
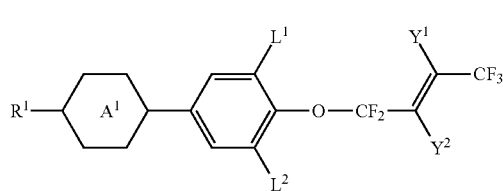

(1-6)
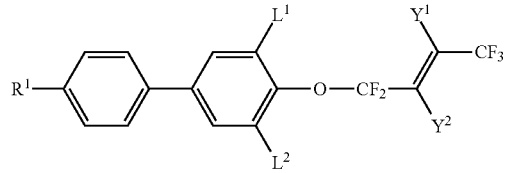

(1-7)
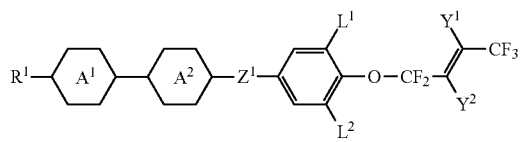

(1-8)
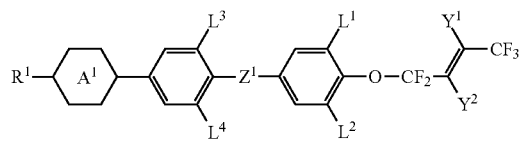

(1-9)
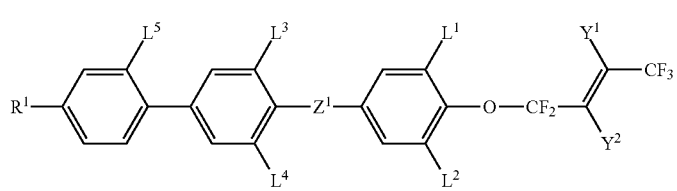

(1-10)
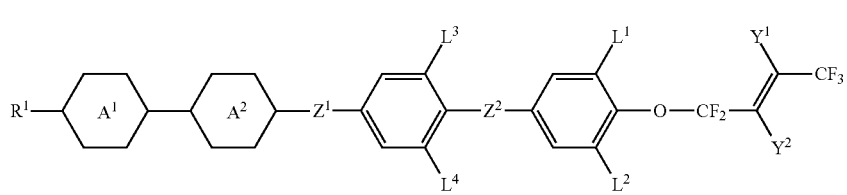

(1-11)

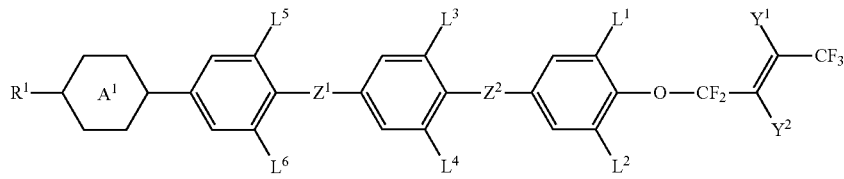

(1-12)

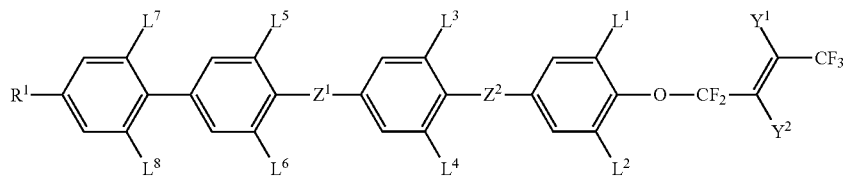

wherein, in formulas (1-5) to (1-12),
ring $A^1$ and ring $A^2$ are independently 1,4-cyclohexylene, tetrahydropyran-2,5-diyl or 1,3-dioxane-2,5-diyl;
$Z^1$ and $Z^2$ are independently a single bond or —$CF_2O$—;
$R^1$ is alkyl having 1 to 10 carbons or alkenyl having 2 to 10 carbons;

$L^1$, $L^2$, $L^3$, $L^4$, $L^5$, $L^6$, $L^7$ and $L^8$ are independently hydrogen or fluorine; and
$Y^1$ and $Y^2$ are independently hydrogen or fluorine.

7. The compound according to claim 1, represented by any one of formulas (1-13) to (1-23):

(1-13)

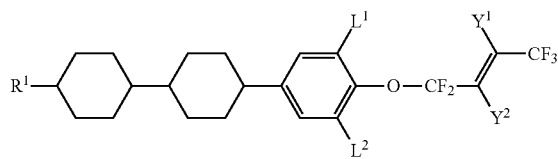

(1-14)

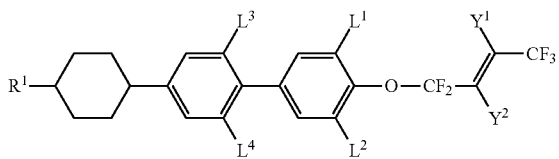

(1-15)

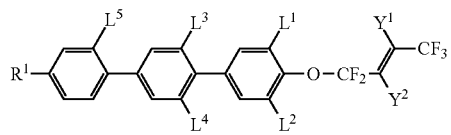

(1-16)

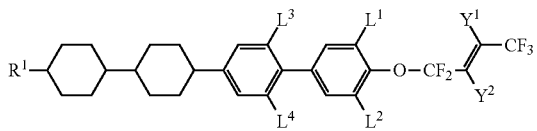

(1-17)

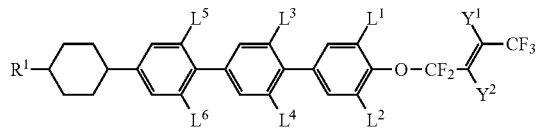

(1-18)

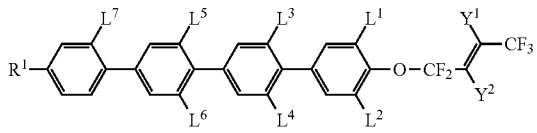

(1-19)

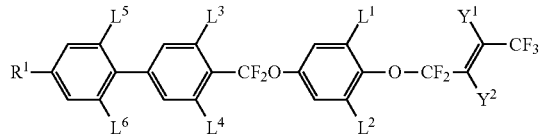

(1-20)

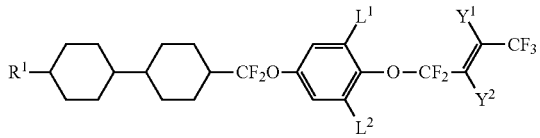

(1-21)

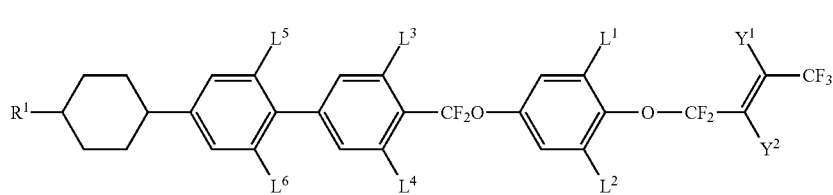

-continued

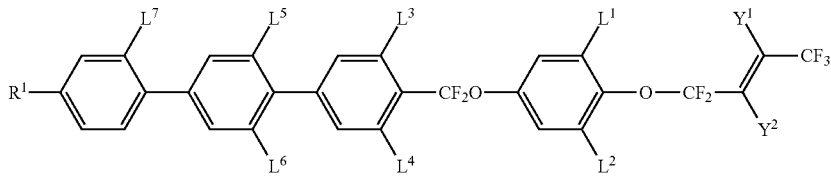

(1-22)

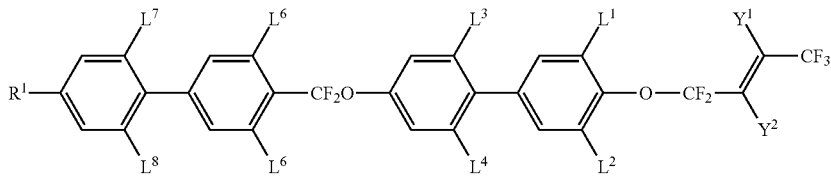

(1-23)

wherein, in formulas (1-13) to (1-23), $R^1$ is alkyl having 1 to 10 carbons or alkenyl having 2 to 10 carbons;

$L^1$, $L^2$, $L^3$, $L^4$, $L^5$, $L^6$, $L^7$ and $L^8$ are independently hydrogen or fluorine; and $Y^1$ and $Y^2$ are independently hydrogen or fluorine.

8. A liquid crystal composition, containing at least one compound according to claim 1.

9. The liquid crystal composition according to claim 8, further containing at least one compound selected from the group of compounds represented by formulas (2) to (4):

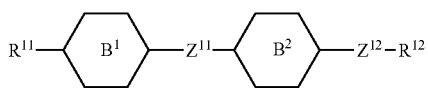

(2)

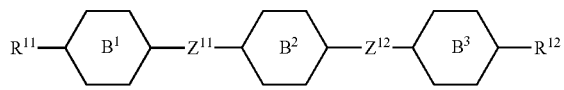

(3)

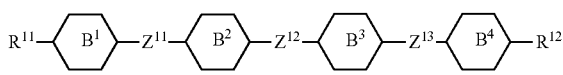

(4)

wherein, in formulas (2) to (4), $R^{11}$ and $R^{12}$ are independently alkyl having 1 to 10 carbons or alkenyl having 2 to 10 carbons, and in the groups, at least one —$CH_2$— may be replaced by —O—, and in the groups, at least one hydrogen may be replaced by fluorine;

ring $B^1$, ring $B^2$, ring $B^3$ and ring $B^4$ are independently 1,4-cyclohexylene, 1,4-phenylene, 2-fluoro-1,4-phenylene, 2,5-difluoro-1,4-phenylene or pyrimidine-2,5-diyl; and $Z^{11}$, $Z^{12}$ and $Z^{13}$ are independently a single bond, —COO—, —$CH_2CH_2$—, —CH=CH— or —C≡C—.

10. The liquid crystal composition according to claim 8, further containing at least one compound selected from the group of compounds represented by formulas (5) to (7):

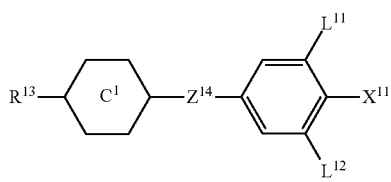

(5)

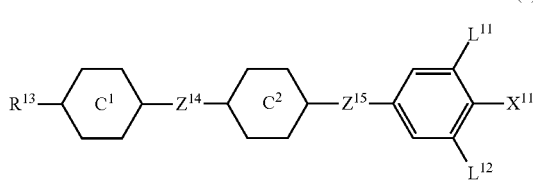

(6)

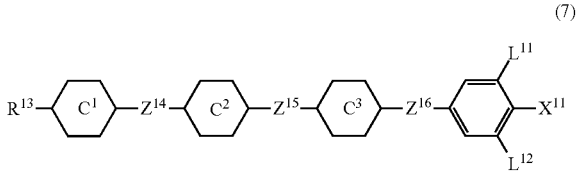

(7)

wherein, in formulas (5) to (7), $R^{13}$ is alkyl having 1 to 10 carbons or alkenyl having 2 to 10 carbons, and in the groups, at least one —$CH_2$— may be replaced by —O—, and at least one hydrogen may be replaced by fluorine;

$X^{11}$ is fluorine, chlorine, —$OCF_3$, —$OCHF_2$, —$CF_3$, —$CHF_2$, —$CH_2F$, —$OCF_2CHF_2$ or —$OCF_2CHFCF_3$;

ring $C^1$, ring $C^2$ and ring $C^3$ are independently 1,4-cyclohexylene, 1,4-phenylene, 1,4-phenylene in which at least one hydrogen is replaced by fluorine, tetrahydropyran-2,5-diyl, 1,3-dioxane-2,5-diyl or pyrimidine-2,5-diyl;

$Z^{14}$, $Z^{15}$ and $Z^{16}$ are independently a single bond, —COO—, —OCO—, —$CH_2O$—, —$OCH_2$—, —$CF_2O$—, —$OCF_2$—, —$CH_2CH_2$—, —CH=CH—, —C≡C— or —$(CH_2)_4$—; and $L^{11}$ and $L^{12}$ are independently hydrogen or fluorine.

11. The liquid crystal composition according to claim 8, further containing a compound represented by formulas (8):

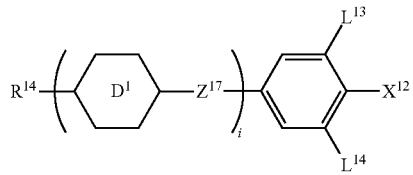

(8)

wherein, in formula (8), $R^{14}$ is alkyl having 1 to 10 carbons or alkenyl having 2 to 10 carbons, and in the groups, at least one —CH$_2$— may be replaced by —O—, and at least one hydrogen may be replaced by fluorine;

$X^{12}$ is —C≡N or —C≡C—C≡N;

ring $D^1$ is 1,4-cyclohexylene, 1,4-phenylene, 1,4-phenylene in which at least one hydrogen is replaced by fluorine, tetrahydropyran-2,5-diyl, 1,3-dioxane-2,5-diyl or pyrimidine-2,5-diyl;

$Z^{17}$ is a single bond, —COO—, —OCO—, —CH$_2$O—, —OCH$_2$—, —CF$_2$O—, —OCF$_2$—, —CH$_2$CH$_2$— or —C≡C—;

$L^{13}$ and $L^{14}$ are independently hydrogen or fluorine; and i is 1, 2, 3 or 4.

12. The liquid crystal composition according to claim 8, further containing at least one compound selected from the group of compounds represented by formulas (9) to (15):

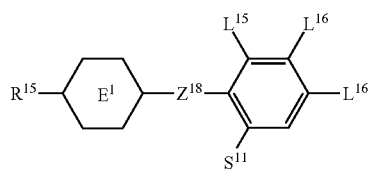

(9)

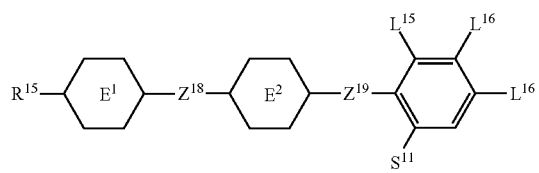

(10)

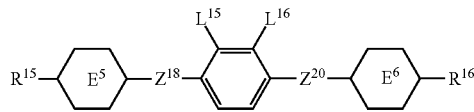

(11)

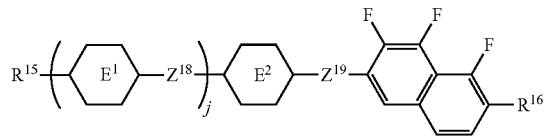

(12)

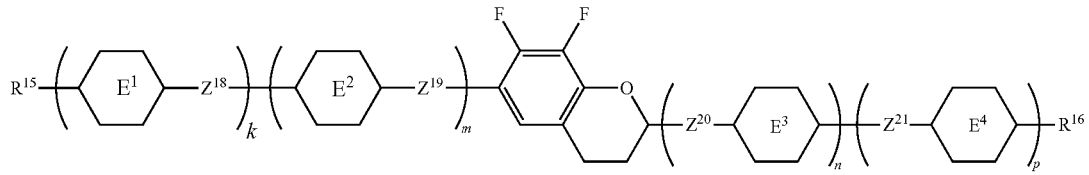

(13)

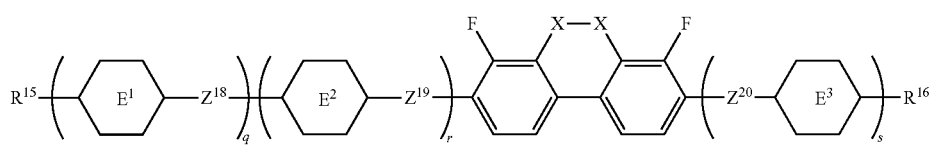

(14)

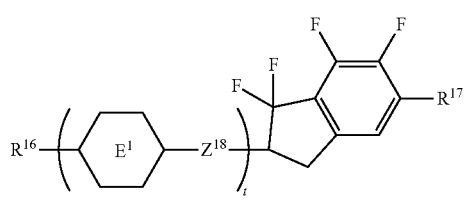

(15)

wherein, in formulas (9) to (15),

- $R^{15}$, $R^{16}$ and $R^{17}$ are independently alkyl having 1 to 10 carbons or alkenyl having 2 to 10 carbons, and in the groups, at least one —$CH_2$— may be replaced by —O—, and at least one hydrogen may be replaced by fluorine, and $R^{17}$ may be hydrogen or fluorine;
- ring $E^1$, ring $E^2$, ring $E^3$ and ring $E^4$ are independently 1,4-cyclohexylene, 1,4-cyclohexenylene, 1,4-phenylene, 1,4-phenylene in which at least one hydrogen is replaced by fluorine, tetrahydropyran-2,5-diyl or decahydronaphthalene-2,6-diyl;
- ring $E^5$ and ring $E^6$ are independently 1,4-cyclohexylene, 1,4-cyclohexenylene, 1,4-phenylene, tetrahydropyran-2,5-diyl, or decahydronaphthalene-2,6-diyl;
- $Z^{18}$, $Z^{19}$, $Z^{20}$ and $Z^{21}$ are independently a single bond, —COO—, —OCO—, —$CH_2O$—, —$OCH_2$—, —$CF_2O$—, —$OCF_2$—, —$CH_2CH_2$—, —$CF_2OCH_2CH_2$— or —$OCF_2CH_2CH_2$—;
- $L^{15}$ and $L^{16}$ are independently fluorine or chlorine;
- $S^{11}$ is hydrogen or methyl;
- X is —CHF— or —$CF_2$—; and
- j, k, m, n, p, q, r and s are independently 0 or 1, a sum of k, m, n and p is 1 or 2, a sum of q, r and s is 0, 1, 2 or 3, and t is 1, 2 or 3.

13. The liquid crystal composition according to claim 8, further containing at least one additive selected from a polymerizable compound, a polymerization initiator, a polymerization inhibitor, an optically active compound, an antioxidant, an ultraviolet light absorber, a light stabilizer, a heat stabilizer, a dye or an antifoaming agent.

14. A liquid crystal display device, including the liquid crystal composition according to claim 8.

* * * * *